United States Patent [19]

Albrow et al.

[11] Patent Number: 5,228,026

[45] Date of Patent: Jul. 13, 1993

[54] TECHNIQUE FOR TIME-DIVISION DUPLEX CORDLESS TELECOMMUNICATION

[75] Inventors: Richard Albrow, Linton; Nigel E. Barnes, Stapleford; Graham E. Beesley, Winchester; Chris Cant, Portsmouth; Malcolm Crisp, Over, all of Great Britain; Michael T. Dudek, Agoura, Calif.; Rupert Goodings, Cambridge, Great Britain; David C. Odhams, Epping, Great Britain; Peter N. Proctor, Basingstoke, Great Britain; Ian Rodgers, Southport, Great Britain

[73] Assignees: British Telecommunications Public Limited Company, London; Ferranti Creditphone Limited, Moston; GEC Plessey Telecommunications Limited, Coventry; Mercury Communications Limited, London; Orbitel Mobile Communications Limited, Basingstoke; Shaye Communications Limited, Winchester; Phonepoint Limited; STC PLC, both of London, all of Great Britain

[21] Appl. No.: 573,307

[22] PCT Filed: Jan. 26, 1990

[86] PCT No.: PCT/GB90/00117

§ 371 Date: Nov. 26, 1990

§ 102(e) Date: Nov. 26, 1990

[87] PCT Pub. No.: WO90/09071

PCT Pub. Date: Aug. 9, 1990

[30] Foreign Application Priority Data

Jan. 27, 1989 [GB] United Kingdom ............... 8901756
Jan. 27, 1989 [GB] United Kingdom ............... 8901823

[51] Int. Cl.⁵ .......................... H04B 1/56; H04M 1/72
[52] U.S. Cl. .................................. 370/29; 370/105.4; 370/110.1; 379/63
[58] Field of Search .................. 370/29, 110.1, 109, 370/105.4, 105.5, 105.6; 379/61, 63

[56] References Cited

U.S. PATENT DOCUMENTS 4,404,672  9/1983  Shimizu ................................. 370/29
4,630,257 12/1986  White ................................... 370/29

(List continued on next page.)

FOREIGN PATENT DOCUMENTS 2138652A 10/1984 United Kingdom .
WO87/01490 12/1987 World Int. Prop. O. .

Primary Examiner—Douglas W. Olms
Assistant Examiner—H. Kizou
Attorney, Agent, or Firm—Frishauf, Holtz, Goodman & Woodward

OTHER PUBLICATIONS

Eurocon 88—8th European Conference on Electronics, Conference on Electronics, Conference Proceedings on Area Communication, Stockholm, Sweden, Jun. 1988, IEEE (US), H. Ochsner: "Cordless Telecommunications: towards a digital standard", pp. 379-382.

[57] ABSTRACT

A communication procedure suitable for a cordless telephone system involves time division duplex radio communication between a handset 11 and a base station using alternating bursts of transmission over a single radio channel. Once a radio link has been set up, initial transmissions carry a synchronization logical channel S and a signalling logical channel D multiplexed together, but the link may switch to bursts carrying a communications logical channel B for the speech data and the signalling logical channel D. Burst synchronization is achieved by the asynchronous detection of words in a synchronization channel S. These words have bit patterns reducing the probability of incorrect asynchronous detection of them. If one part ceases to receive handset signals from the other, it transmits a special signal, informing the other part. This enables both parts to detect the failure of a link at substantially the same time, so that their actions to re-establish the link are synchronized.

31 Claims, 17 Drawing Sheets

U.S. PATENT DOCUMENTS

| | | | |
|---|---|---|---|
| 4,644,524 | 2/1987 | Emery | 370/29 |
| 4,644,525 | 2/1987 | Ellis et al. | 370/29 |
| 4,835,764 | 5/1989 | Sulzbacher et al. | 370/29 |
| 4,903,257 | 2/1990 | Takeda et al. | 370/29 |
| 4,949,335 | 8/1990 | Moore | 370/29 |
| 5,001,703 | 3/1991 | Johnson et al. | 370/29 |
| 5,020,051 | 5/1991 | Beesley et al. | 370/29 |

OTHER PUBLICATIONS

IEEE Conference on Communications Equipment and Systems, Apr. 20–22, 1982, Birmingham, B. J. Goatley et al. "Duplex Digital Transmission in the Subscribers Local Network", pp. 186–189.

GEC Telecommunications Journal No. 41, 1980 (Rugby, GB), D. J. Clothier: "A digital transmission system for multi-terminal applications", pp. 10–15.

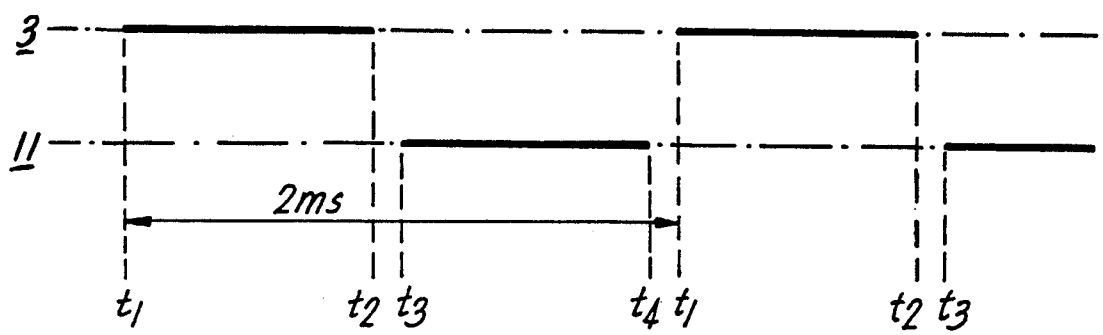
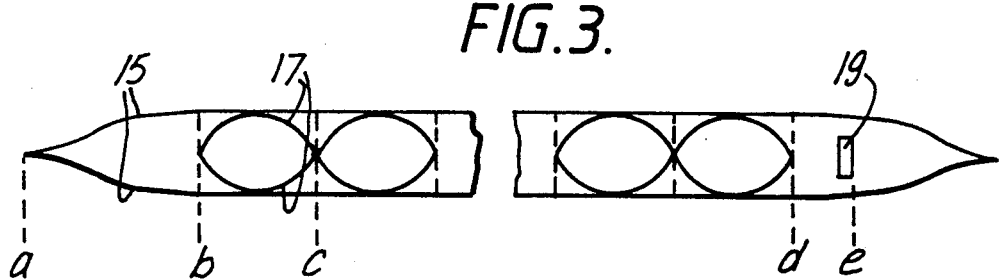
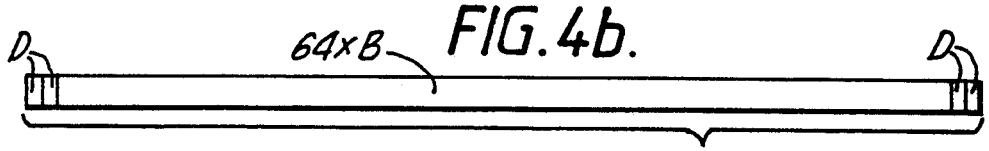
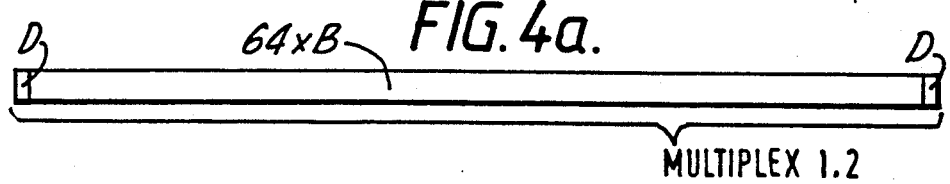

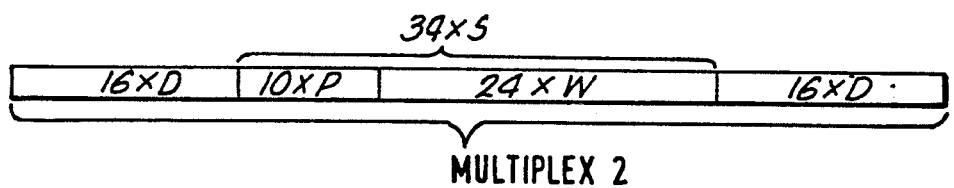
FIG.5.
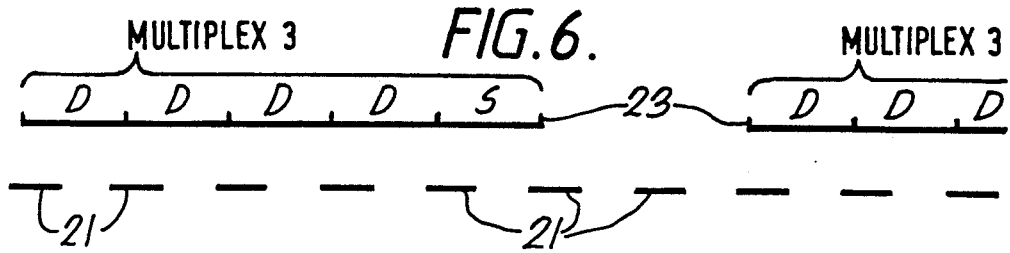
FIG.6.
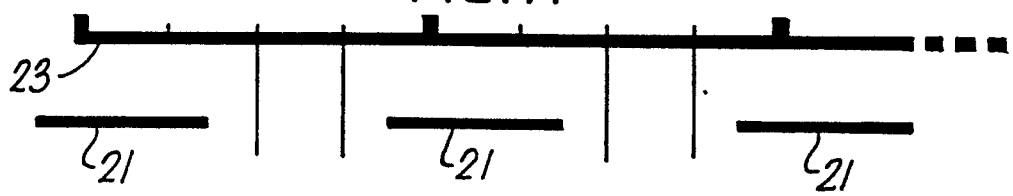
FIG.7.
FIG.8.
| 36D | 36D | 36D | 36D |
|-----|-----|-----|-----|
| 36D | 36D | 36D | 36D |
| 36D | 36D | 36D | 36D |
| 36D | 36D | 36D | 36D |
| 36S | 36S | 36S | 36S |

| 10D | 2P | 6P | 10D | 8P | 10D | 2P | 6P |
|-----|----|----|-----|----|-----|----|----|
| 10D | 2P | 6P | 10D | 8P | 10D | 2P | 6P |
| 10D | 2P | 6P | 10D | 8P | 10D | 2P | 6P |
| 10D | 2P | 6P | 10D | 8P | 10D | 2P | 6P |
| 24W | | | 12P | | 24W | | 12P |

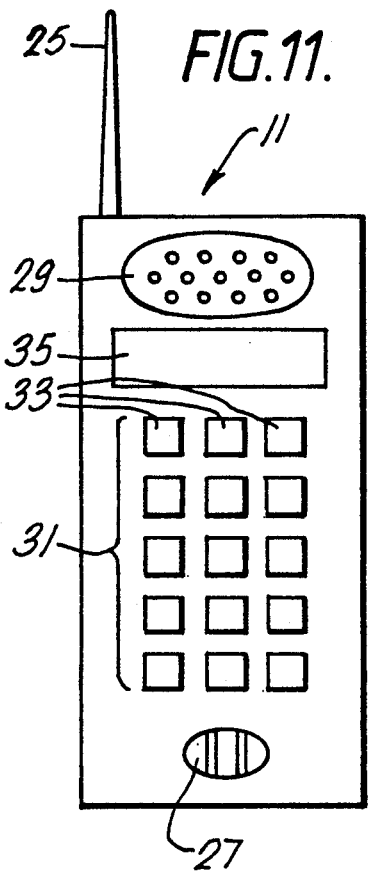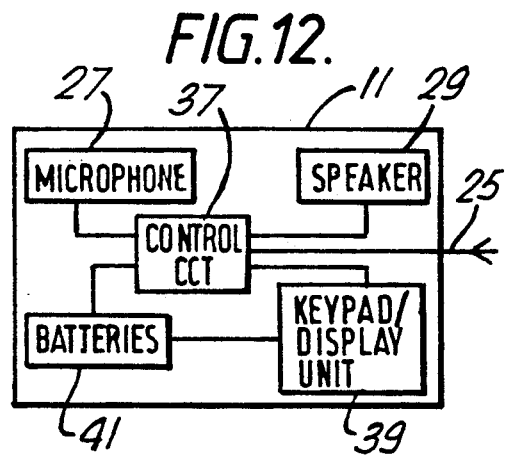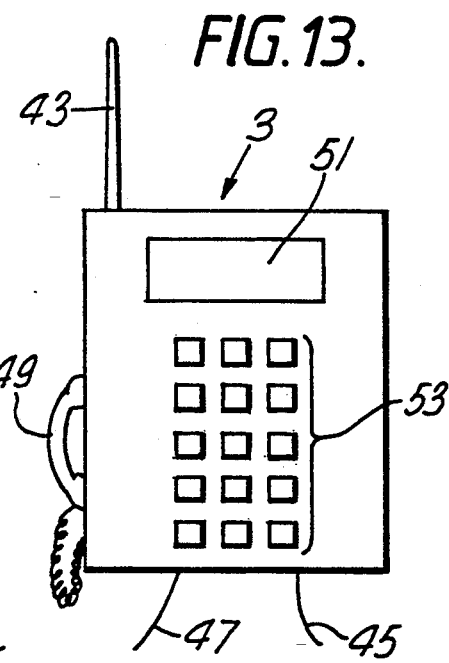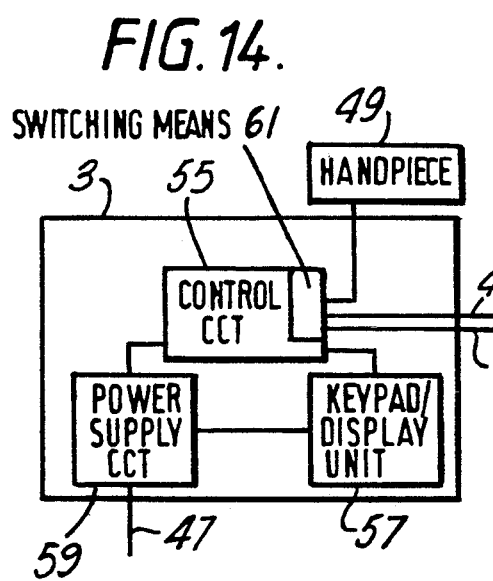

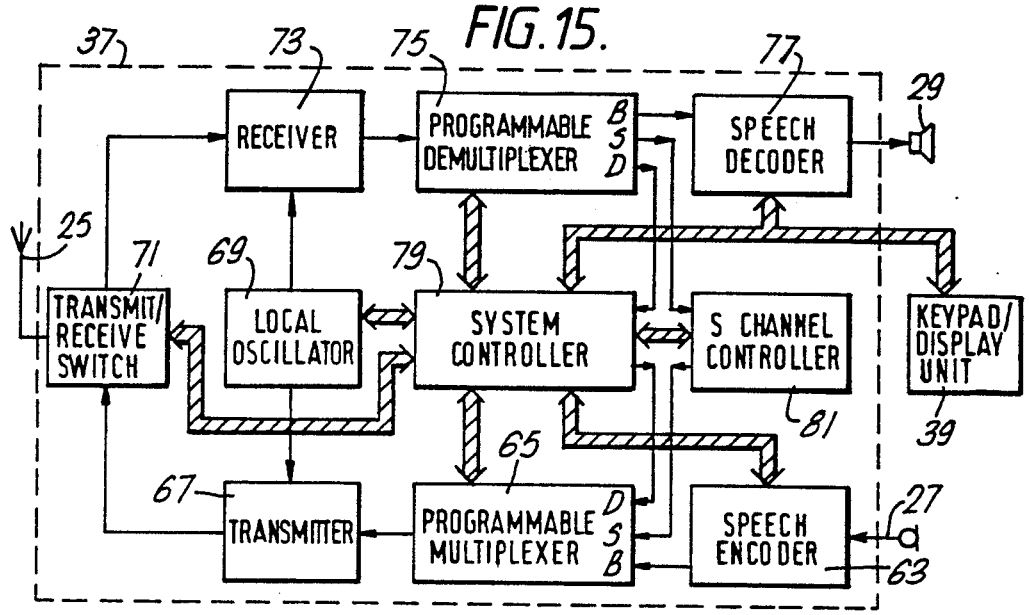
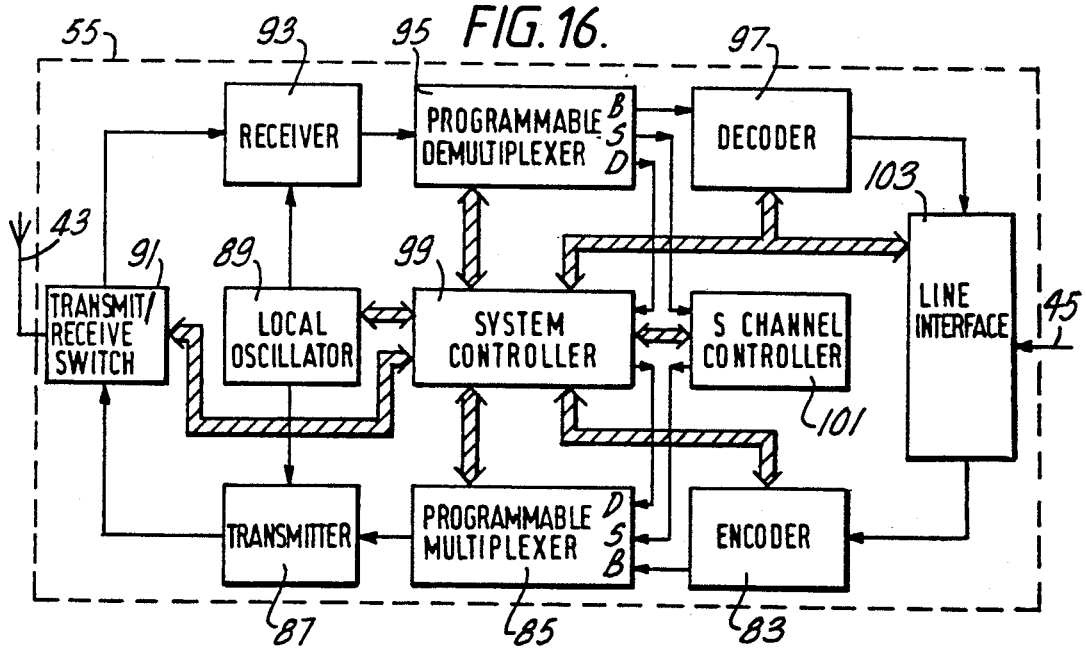

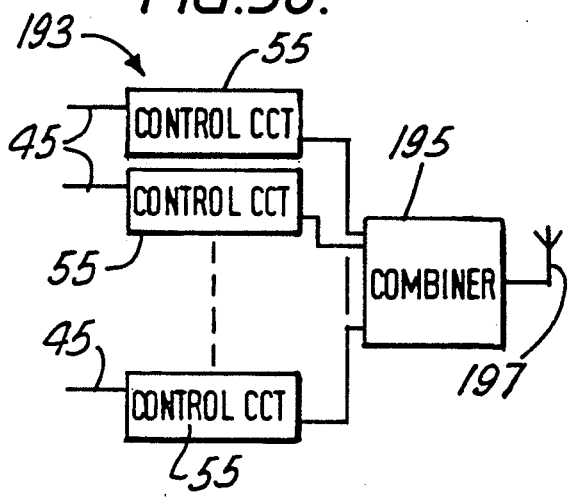
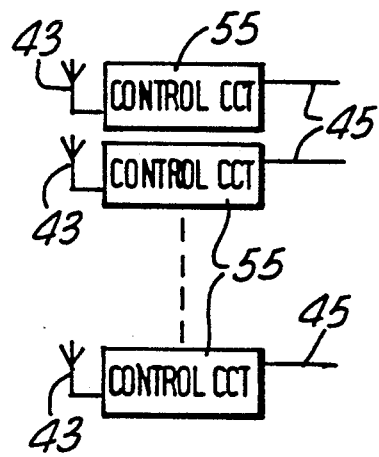
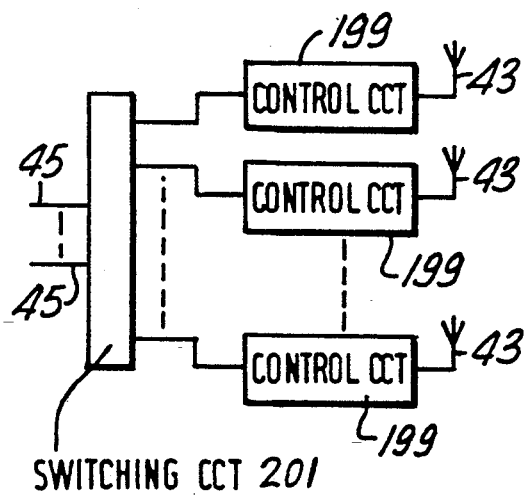

TECHNIQUE FOR TIME-DIVISION DUPLEX CORDLESS TELECOMMUNICATION

FIELD OF THE INVENTION

The present invention relates to telecommunications systems, and has particular application to cordless telephones. Aspects of the invention are useful in so called "CT2" cordless telephone systems, and systems in accordance with the British Department of Trade and Industry specification MPT 1375. The May 1989 version of specification MPT 1375 is incorporated herein by reference.

BACKGROUND

In a cordless telephone system, it is necessary to provide a way of carrying the signal for the contents of communication, normally speech, in both directions between parts of the system which are not connected by a cord or wire. Additionally, it will normally be necessary to pass other signals between the parts, which are used to control the operation of the parts or carry other control messages separate from the content of the communication In some known radio telephone systems, the requirement for two way communication is achieved by providing two radio channels between the parts, each channel being used for communication in one respective direction. In an embodiment of the present invention, multiplexed signal structures are provided enabling a plurality of logical channels to be carried with communication in both directions, over a single signal communications channel. In the embodiment, the use of different multiplex structures at different times permits differences in the logical channel structure of the cordless communication at different stages of the creation and use of the cordless communications link.

In a conventional radio telephone system, an arrangement must be provided enabling a link to be set up so that parts can communicate with each other. When one of the parts is operating in a manner synchronised to some routine, it may be difficult for another part to establish a link with the first part if the second part is not itself synchronised to the same routine.

In an embodiment of the present invention, an arrangement is provided allowing for asynchronous initiation of a link between two parts, even when one of the parts is operating in a synchronous manner.

In a radio telecommunication system, the ability of a radio link to carry useful signals will tend to vary in accordance with external factors, such as interference and transmission past obstructions. Accordingly, it is advantageous to encode transmitted signals for error detection and correction and/or monitor the link quality to enable remedial steps such as breaking and re-establishing the link, possibly on a different radio channel, if the link quality becomes unacceptably low. In an embodiment of the present invention, an arrangement is provided in which two logical channels are multiplexed together, with signals of one logical channel being encoded to enable error detection, and detected errors in this logical channel being monitored and used as a measure of the extent to which the other channel is exposed to errors.

In a system for radio telecommunications, there will typically be a large number of communication devices capable of communicating in the system, some of which may be more sophisticated and have greater communication abilities than others. In order for two devices to communicate with each other, they must communicate in a manner which is within the capabilities of both devices. Thus, when a relatively sophisticated device communicates with an unsophisticated device, they must communicate in a manner within the capabilities of the unsophisticated device. However, it is inefficient to force the sophisticated device also to communicate in this particular manner when it is communicating with another sophisticated device capable of communicating in a different manner. In an embodiment of the present invention, devices conduct an operation (sometimes referred to as a "negotiation" operation) during the creation of a cordless telecommunications link, so as to adopt a way of communicating which is within the capabilities of both devices.

When two devices are communicating over a cordless telecommunications link, it may be necessary for the operations of the devices to be synchronised with each other and this may be done by one device recognising a particular part of a signal transmitted by the other device, the signal part having a predetermined timing. In this case, incorrect synchronisation can arise if the receiving part incorrectly identifies a different part of the transmitted signal as the part to be recognised for synchronisation. In an embodiment of the present invention, a signal is transmitted having a data structure such that a portion used for synchronisation has a low correlation with other portions of the signal not containing the synchronisation part. Additionally, in the embodiment the synchronisation part has a low correlation with time-shifted versions of itself. Preferably, signal parts used for synchronisation are transmitted in both directions between the devices, and a signal part used for synchronisation and transmitted in one direction is arranged to have a low correlation with a signal part used for synchronisation and transmitted in the other direction.

When a plurality of devices capable of communicating over a cordless communications link are present in the same area, and several are scanning communication channels to detect another device seeking to set up a communications link, there is a possibility that two devices may detect the same request for a communications link on a channel and both respond to the request simultaneously. The resulting interference on the channel may result in neither device establishing the communications link. If the subsequent behaviour of the two devices in scanning the channels for requests for a communications link is identical, such a simultaneous response and interference is likely to occur with every subsequent detection of a communication request. In an embodiment of the present invention, some devices are arranged so as to have a behaviour following such a simultaneous response and interference which is different from each other, so as to reduce the likelihood of subsequent repetitions of the simultaneous response and interference.

Devices communicating with each other over a cordless telecommunications link may exchange "handshake" signals to confirm that communication between them over the link is still taking place successfully. If one of the devices fails to receive a handshake signal within a certain period, it may conclude that the link has been broken. However, the device which has ceased to receive handshake signals will typically still be transmitting them until the end of the period at which it concludes that the link has been broken. If these handshake signals are successfully received by the other device, then the other device will not become aware of the failure of the link until a further period after the first device ceases to transmit handshake signals. Thus, when a transmission link fails in one direction only, the reaction of the devices may be delayed and will typically not be synchronised with each other. In an embodiment of the present invention, if a device fails to receive a handshake signal within a first period of its most recent receipt of a handshake signal, it concludes that the link has been lost. In the meantime, it continues to transmit handshake signals, but if it has not received a handshake signal within a second, shorter, period since the most recent handshake signal, it transmits a signal indicating that it is failing to receive handshake signals. Thus, if a link breaks down in one direction only, the device which is continuing to receive transmissions is rapidly notified that the other device has ceased to receive transmissions, and the link re-establishment actions of the devices can be better co-ordinated.

Where two devices communicate with each other in a synchronised manner, it is possible for the transmission of information to become corrupted by a loss of synchronisation, even though the transmission quality of the communication link may be unimpaired. In an embodiment of the present invention, some of the transmitted information is coded to enable error detection, and the detection of errors in this data can be used as an indication that synchronisation between the devices has been lost.

When two devices are communicating with each other over a communications link, in a synchronised manner, one of them may be designated a synchronisation master, and the other a synchronisation slave, such that the slave is required to synchronise itself to the operations of the master. If the link fails, or for any other reason the devices are required to break and re-establish the link, re-establishment may be difficult if the slave device ceases to be synchronised to the master and therefore fails to detect link re-establishment signals from the master. In an embodiment of the present invention, when link re-establishment is required the initial signalling to carry out the re-establishment is always transmitted by the slave device.

If one of the devices in a link is portable or mobile, the link may be broken by the movement of that device. It may then be impossible to re-establish the link between the same two devices. If one of the devices is also an endpoint of a communications path, e.g. a handset, and the other is only a relay station, e.g. a base station linked to a communications network, it is preferable to re-establish the link using the same endpoint device, but possibly a different relay device, for the convenience of the user. However, it may be difficult for the communications network to monitor which relay device an endpoint device is near at any given time. In an embodiment of the present invention the endpoint device transmits the initial signals in link re-establishment, and the link can be re-established using any relay device which receives the transmissions. The endpoint device is typically the mobile device, e.g. a portable telephone handset.

When devices are communicating over a communications link using an alternating transmission burst arrangement, there may be a failure of communication if the timings of the transmissions of the two devices are not properly co-ordinated and their transmissions partially overlap instead of alternating correctly. In an embodiment of the present invention one device derives the timing for the transmission of a burst from the time at which it receives a burst from the other device.

When devices communicate over a telecommunications link, it may be necessary to transmit signals belonging to a logical channel for the purposes of link maintenance, even though there is no information to be transmitted in that channel at that time. If a random signal is sent in that logical channel under the circumstances, it may by chance resemble some meaningful signal transmitted over the communications link, resulting in incorrect operation of the device receiving the signal. In an embodiment of the present invention, a specified signal structure is provided for a logical channel which structure conveys no useful information in that channel, but which is chosen not to resemble a signal the reception of which could cause incorrect operation of the receiving device.

SUMMARY OF THE INVENTION

In accordance with an aspect of the present invention there is provided a telecommunication system in which first and second devices are capable of synchronous time-division two-way communication with each other over a radio channel by exchanging radio signals in alternating bursts carrying digital data, such that during the time-division two-way communication transmission of a said burst from one of the first and second devices is completed before transmission of the next burst by the other of the first and second devices is begun, characterised in that:

first and second formats of digital data in the said bursts are used in said time-division two-way communication, both of which formats include information for a first logical communication channel which carries signalling data such as device identification codes and instructions from one device to the other;

the first said format also includes information for a second logical communication channel which carries data, such as digitally encoded speech, which is to be communicated between the devices; and the second said format also includes a synchronisation pattern not included in the first format, the synchronisation pattern enabling a said device to determine the timing of the bursts received by it from the other said device.

In accordance with another aspect of the present invention there is provided a method of telecommunication in which first and second devices perform synchronous time-division two-way communication with each other over a radio channel by exchanging radio signals in alternating bursts carrying digital data, such that during the time-division two-way communication transmission of a said burst from one of the first and second devices is completed before transmission of the next burst by the other of the first and second devices is begun, · characterised in that:

first and second formats of digital data in the said bursts are used in said time-division two-way communication, both of which formats include information for a first logical communication channel which carries signalling data such as device identification codes and instructions from one device to the other;

the first said format also includes information for a second logical communication channel which carries data, such as digitally encoded speech, which is to be communicated between the devices; and the second said format also includes a synchronisation pattern not included in the first format, the synchronisation pattern enabling a said device to determine the timing of the bursts received by it from the other said device.

Preferably, in the said first format, information for the first logical communication channel is transmitted both before and after information for the second logical communication channel.

Preferably, in the said first format, the same number of bits of information for the first channel are transmitted before the information for the second channel as are transmitted after the information for the second channel.

Preferably, in the said second format, information for the first logical communication channel is transmitted both before and after the said synchronisation pattern.

Preferably, in the said second format, the same number of bits of information for the first channel are transmitted before the said synchronisation pattern as are transmitted after the said synchronisation pattern.

Preferably, more bits of information for the first channel are transmitted in a burst of the second format than in a burst of the first format.

Preferably, more bits of information for the second channel are transmitted in a burst of the first format than the number of bits of information for the first channel in a burst of either the first or the second format.

In accordance with another aspect of the present invention there is provided a telecommunication system in which first and second devices are capable of synchronous time-division two-way communication with each other over a radio channel by exchanging radio signals in alternating bursts carrying digital data, such that during the time-division two-way communication transmission of a said burst from one of the first and second devices is completed before transmission of the next burst by the other of the first and second devices is begun, characterised in that:

the said second device is also capable of transmitting asynchronously a burst comprising one or more portions of digital data for a logical communication channel, which carries signalling data such as device identification codes, followed by one or more further portions of digital data, after which the second device ceases transmission for a period to enable it to receive a reply from the first device, each respective said portion or further portion of digital data comprising a plurality of occurrences of a respective digital data sequence, and the digital data sequence for each said further portion of digital data providing a synchronisation pattern to enable the said first device to determine the timing of the burst when it receives it.

In accordance with another aspect of the present invention there is provided a method of telecommunication in which first and second devices perform time-division two-way communication with each other over a radio channel by exchanging radio signals in alternating bursts carrying digital data, such that during the time-division two-way communication transmission of a said burst from one of the first and second devices is completed before transmission of the next burst by the other of the first and second devices is begun, characterised in that:

at a time when the said first and second devices are not performing the time division two-way communication, the second device transmits asynchronously a burst comprising one or more portions of digital data for a logical communication channel, which carries signalling data such as device identification codes, followed by one or more further portions of digital data, after which the second device ceases transmission for a period to enable it to receive a reply from the first device, each respective said portion or further portion of digital data comprising a plurality of occurrences of a respective digital data sequence, and the digital data sequence for each said further portion of digital data providing a synchronisation pattern to enable the said first device to determine the timing of the burst when it receives it.

Preferably, the said bursts exchanged in the said time division two-way communication are exchanged in a succession of burst periods all of the same length, a burst being transmitted from the first device to the second device and a burst being transmitted from the second device to the first device at different times in a burst period, and each said portion or further portion of digital data in a said asynchronously transmitted burst lasting for at least the length of a said burst period, and each said digital data sequence lasting for no more than half the length of a part of a said burst period in which part the first device does not transmit a burst.

In accordance with another aspect of the present invention there is provided a telecommunication system in which first and second devices are capable of time-division two-way communication with each other over a radio channel by exchanging radio signals in alternating bursts carrying digital data, such that during the time-division two-way communication transmission of a said burst from one of the first and second devices is completed before transmission of the next burst by the other of the first and second devices is begun, characterised in that:

in bursts of a first type information is transmitted for both a first logical communication channel, which carries signalling data such as device identification codes and instructions from one device to the other, and a second logical communication channel, which carries data to be communicated between the devices such as digitally encoded speech, and the first and second devices conduct an operation to select, in accordance with their capabilities, a format for bursts of the first type from a predefined set of formats comprising first and second formats which differ in the amount of information for the first logical communication channel carried in each burst.

In accordance with another aspect of the present invention there is provided a method of telecommunication in which first and second devices perform time-division two-way communication with each other over a radio channel by exchanging radio signals in alternating bursts carrying digital data, such that during the time-division two-way communication transmission of a said burst from one of the first and second devices is completed before transmission of the next burst by the other of the first and second devices is begun, characterised in that:

in bursts of a first type information is transmitted for both a first logical communication channel, which carries signalling data such as device identification codes and instructions from one device to the other, and a second logical communication channel, which carries data to be communicated between the devices such as digitally encoded speech, and the first and second devices conduct an operation to select, in accordance with their capabilities, a format for bursts of the first type from a predefined set of formats comprising first and second formats which differ in the amount of information for the first logical communication channel carried in each burst.

Preferably, the said alternating bursts are transmitted in burst periods, one burst being transmitted in each direction at different times in a burst period, and the said first and second formats require different lengths of time for transmission of a burst but the same length of time for a burst period.

Preferably, the said first and second formats carry the same amount of the second logical communication channel per burst as each other.

In accordance with another aspect of the present invention there is provided a telecommunication system in which first and second devices are capable of time-division two-way communication with each other over a radio channel by exchanging radio signals in alternating bursts carrying digital data, such that during the time-division two-way communication transmission of a said burst from one of the first and second devices is completed before transmission of the next burst by the other of the first and second devices is begun,
   characterised in that:
at least some bursts comprise information for a first logical channel and information for second logical channel at different times in the burst, the data of the first logical channel being structured so as to enable the detection of transmission errors, and each said device using detected errors in the first logical channel in bursts received by it as an indication of the quality of transmission of the second logical channel.

In accordance with another aspect of the present invention there is provided a method of telecommunication in which first and second devices perform time-division two-way communication with each other over a radio channel by exchanging radio signals in alternating bursts carrying digital data, such that during the time-division two-way communication transmission of a said burst from one of the first and second devices is completed before transmission of the next burst by the other of the first and second devices is begun,
   characterised in that:
at least some bursts comprise information for a first logical channel and information for second logical channel at different times in the burst, the data of the first logical channel being structured so as to enable the detection of transmission errors, and each said device using detected errors in the first logical channel in bursts received by it as an indication of the quality of transmission of the second logical channel.

Preferably, information for the first logical channel is provided in a said burst both before and after information for the second logical channel.

Preferably, if the quality of transmission of the second logical channel, as determined by a said device using detected errors in the first logical channel, fails to meet a predetermined criterion, the device enters a mode to re-establish the said time-division two-way communication.

-Preferably, the device which determines the failure of the quality of transmission of the second logical channel to meet the predetermined criterion sends a message to the other device before it enters the said mode, to inform the other device that it is about to enter the said mode.

Preferably, the said devices do not structure the data of the second logical channel to enable the detection of transmission errors.

In accordance with another aspect of the present invention there is provided a telecommunication system in which first and second devices are capable of time-division two-way communication with each other over a radio channel by exchanging radio signals in alternating bursts carrying digital data, such that during the time-division two-way communication transmission of a said burst from one of the first and second devices is completed before transmission of the next burst by the other of the first and second devices is begun,
   characterised in that:
each of the first and second devices sends repeatedly one of a pre-set group of signal codes while they are exchanging the said radio signals, at a rate such that the period between successive transmissions by the same device of one of the pre-set group of codes does not exceed a first predetermined length of time, a first code of said group of codes normally being sent if the sending device has received any of said group of codes within the first predetermined length of time before the time it sends the code, and a second code of said group of codes normally being sent otherwise, and each of the first and second devices entering a mode for re-establishing the time-division two-way communication if it has not received the said first code for a second predetermined length of time greater than the first.

In accordance with another aspect of the present invention there is provided a method of telecommunication in which first and second devices perform time-division two-way communication with each other over a radio channel by exchanging radio signals in alternating bursts carrying digital data, such that during the time-division two-way communication transmission of a said burst from one of the first and second devices is completed before transmission of the next burst by the other of the first and second devices is begun,
   characterised in that:
each of the first and second devices sends repeatedly one of a pre-set group of signal codes while they are exchanging the said radio signals, at a rate such that the period between successive transmissions by the same device of one of the pre-set group of codes does not exceed a first predetermined length of time, a first code of said group of codes normally being sent if the sending device has received any of said group of codes within the first predetermined length of time before the time it sends the code, and a second code of said group of codes normally being sent otherwise, and each of the first and second devices entering a mode for re-establishing the time-division two-way communication if it has not received the said first code for a second predetermined length of time greater than the first.

In accordance with another aspect of the present invention there is provided a telecommunication system in which a remote unit is capable of time-division two-way communication with a base station over a radio channel by exchanging radio signals in alternating bursts carrying digital data, such that during the time-division two-way communication transmission of a said burst from one of the remote unit and the base station is completed before transmission of the next burst by the other of the remote unit and the base station is begun, to enable the remote unit to communicate via the base station with a further device,
   characterised in that:

if either the remote unit or the base station with which it is in said time-division two-way communication decides that re-establishment of the time-division two-way communication is required, it takes steps to cause the remote unit to transmit radio signals to initiate the said re-establishment.

In accordance with another aspect of the present invention there is provided a method of telecommunication in which a remote unit and a base station perform time-division two-way communication with each other over a radio channel by exchanging radio signals in alternating bursts carrying digital data, such that during the time-division two-way communication transmission of a said burst from one of the remote unit and the base station is completed before transmission of the next burst by the other of the remote unit and the base station is begun, to enable the remote unit to communicate via the base station with a further device, characterised in that:

if either the remote unit or the base station with which it is in said time-division two-way communication decides that re-establishment of the time-division two-way communication is required, it takes steps to cause the remote unit to transmit radio signals to initiate the said re-establishment.

Preferably, the handset is capable of the time-division two-way communication with a plurality of base stations, so that the said re-establishment takes place between the said remote unit and a said base station which is not necessarily the same base station as the remote unit was previously in said communication with.

Preferably, the said radio signals transmitted by the remote unit to initiate the said re-establishment comprise the radio signals transmitted by the remote unit to initiate the establishment of said communication when the remote unit has not been in said communication immediately beforehand, modified so as to convey an identification of the time-division two-way communication to be re-established.

In accordance with another aspect of the present invention there is provided a telecommunication system in which first and second devices are capable of time-division two-way communication with each other over a radio channel by exchanging radio signals in alternating bursts carrying digital data, such that during the time-division two-way communication transmission of a said burst from one of the first and second devices is completed before transmission of the next burst by the other of the first and second devices is begun, characterised in that:

at least some of the information communicated between the devices over a first logical channel is structured in words which include an error detection code, and a predetermined word is defined for communication between the devices which includes a said error detection code but carries substantially no messages from the transmitting device to the receiving device.

In accordance with another aspect of the present invention there is provided a method of telecommunication in which first and second devices perform time-division two-way communication with each other over a radio channel by exchanging radio signals in alternating bursts carrying digital data, such that during the time-division two-way communication transmission of a said burst from one of the first and second devices is completed before transmission of the next burst by the other of the first and second devices is begun, characterised in that:

at least some of the information communicated between the devices over a first logical channel is structured in words which include an error detection code, and a predetermined word is defined for communication between the devices which includes a said error detection code but carries substantially no messages from the transmitting device to the receiving device.

Preferably, the transmission of a first type of said words is preceded by the transmission over the first logical channel of a set pattern indicating the timing of the following word, and no part of the predetermined word includes data in the same sequence as the said set pattern.

In accordance with another aspect of the present invention there is provided a telecommunication system in which first and second devices are capable of time-division two-way communication with each other over a radio channel by exchanging radio signals in alternating bursts carrying digital data, such that during the time-division two-way communication transmission of a said burst from one of the first and second devices is completed before transmission of the next burst by the other of the first and second devices is begun, characterised in that:

at least some of the information communicated between the devices over a first logical channel is structured in words, and transmission of a first type of said words is preceded by transmission over the first logical channel of a set pattern indicating the timing of the following word, and in between repetitions of words of the first type carrying the same messages or parts of messages and having the same data sequence there is transmitted over the first logical channel either a different word of the first type or a predefined sequence which does not include the said set pattern, whereby if the data sequence of a repeated said word of the first type includes the said set pattern it is repeated sufficiently infrequently to allow the receiving device to identify the said set pattern correctly in the transmission of the set pattern before the next transmission of the repeated word even if the receiving device incorrectly identifies the set pattern in the data sequence of the previous transmission of the repeated word as an occurrence of the set pattern preceding a word of the first type.

In accordance with another aspect of the present invention there is provided a method of telecommunication in which first and second devices perform time-division two-way communication with each other over a radio channel by exchanging radio signals in alternating bursts carrying digital data, such that during the time-division two-way communication transmission of a said burst from one of the first and second devices is completed before transmission of the next burst by the other of the first and second devices is begun, characterised in that:

at least some of the information communicated between the devices over a first logical channel is structured in words, and transmission of a first type of said words is preceded by transmission over the first logical channel of a set pattern indicating the timing of the following word, and in between repetitions of words of the first type carrying the same messages or parts of messages and having the same data sequence there is transmitted over the first logical channel either a different word of the first type or a predefined sequence which does not include the said set pattern, whereby if the data sequence of a repeated said word of the first type includes the said set pattern it is repeated sufficiently infrequently to allow the receiving device to identify the said set pattern correctly in the transmission of the set pattern before the next transmission of the repeated word even if the receiving device incorrectly identifies the set pattern in the data sequence of the previous transmission of the repeated word as an occurrence of the set pattern preceding a word of the first type.

In accordance with another aspect of the present invention there is provided a telecommunication system in which a device of a first type is capable of time-division two-way communication with any one of a plurality of devices of a second type over a radio channel by exchanging radio signals in alternating bursts carrying digital data, such that during the time-division two-way communication transmission of a said burst from one of the devices is completed before transmission of the next burst by the other of the devices is begun, characterised in that:

at least some of the bursts contain a synchronisation pattern which may be detected asynchronously by the receiving device to enable it to discover the timing of the received burst, the device of the first type transmitting a first synchronisation pattern or one of a group of first synchronisation patterns and the devices of the second type transmitting a second synchronisation pattern or one of a group of second synchronisation patterns, the first synchronisation pattern or patterns being different from the second synchronisation pattern or patterns and the devices of the second type not responding to reception of the or a second synchronisation pattern, whereby devices of the second type do not respond to reception of transmissions by other devices of the second type.

In accordance with another aspect of the present invention there is provided a method of telecommunication in which a device of a first type and any one of a plurality of devices of a second type perform time-division two-way communication with each other over a radio channel by exchanging radio signals in alternating bursts carrying digital data, such that during the time-division two-way communication transmission of a said burst from one of the devices is completed before transmission of the next burst by the other of the devices is begun, characterised in that:

at least some of the bursts contain a synchronisation pattern which may be detected asynchronously by the receiving device to enable it to discover the timing of the received burst, the device of the first type transmitting a first synchronisation pattern or one of a group of first synchronisation patterns and the devices of the second type transmitting a second synchronisation pattern or one of a group of second synchronisation patterns, the first synchronisation pattern or patterns being different from the second synchronisation pattern or patterns and the devices of the second type not responding to reception of the or a second synchronisation pattern, whereby devices of the second type do not respond to reception of transmissions by other devices of the second type.

Preferably, the said time-division two-way communication may be performed by any one of a plurality of devices of the first type, and the devices of the first type do not respond to reception of the or a first synchronisation pattern, whereby devices of the first type do not respond to transmissions by other devices of the first type.

Preferably, each said device transmits a predetermined synchronisation pattern while attempting to initiate communication by said radio signals with a device of the other type, and subsequently transmits a different predetermined synchronisation pattern after said communication has been initiated.

In accordance with another aspect of the present invention there is provided a telecommunication system in which first and second devices are capable of time-division two-way communication with each other over a radio channel by exchanging radio signals in alternating bursts carrying digital data, such that during the time-division two-way communication transmission of a said burst from one of the first and second devices is completed before transmission of the next burst by the other of the first and second devices is begun, characterised in that: at least some of the bursts transmitted by a said device contain a synchronisation pattern of bits of data, which may be detected asynchronously by the receiving device to enable it to discover the timing of the transmitted burst, and also contain bits of variable data, and the receiving device deems the synchronisation pattern to be present in the received data when a comparison operation between the received data and a stored copy of the synchronisation pattern results in no more than K bits of the received data failing the comparison, where K is zero or a positive integer, and the arrangement of bits in each said burst being such that in any consecutive string of L bits of data in the burst, there are less than L−K bits of variable data.

In accordance with another aspect of the present invention there is provided a method of telecommunication in which first and second devices perform time-division two-way communication with each other over a radio channel by exchanging radio signals in alternating bursts carrying digital data, such that during the time-division two-way communication transmission of a said burst from one of the first and second devices is completed before transmission of the next burst by the other of the first and second devices is begun, characterised in that: at least some of the bursts transmitted by a said device contain a synchronisation pattern of bits of data, which may be detected asynchronously by the receiving device to enable it to discover the timing of the transmitted burst, and also contain bits of variable data, and the receiving device deems the synchronisation pattern to be present in the received data when a comparison operation between the received data and a stored copy of the synchronisation pattern results in no more than K bits of the received data failing the comparison, where K is zero or a positive integer, and the arrangement of bits in each said burst being such that in any consecutive string of L bits of data in the burst, there are less than L−K bits of variable data.

Preferably, the arrangement of bits in each said burst is such that in any consecutive string of L bits of data in the burst, there are no more than L−K−6 bits of variable data.

In accordance with another aspect of the present invention there is provided a telecommunication system in which first and second devices are capable of time-division two-way communication with each other over a radio channel by exchanging radio signals in alternating bursts carrying digital data, such that during the time-division two-way communication transmission of a said burst from one of the first and second devices is completed before transmission of the next burst by the other of the first and second devices is begun, characterised in that:

at least one format of digital data in a burst comprises a first portion having a repeating pattern of fixed value and variable bits and a second portion comprising an L-bit synchronisation pattern which may be detected asynchronously by the receiving device to enable it to discover the timing of the burst, and the receiving device deems the synchronisation pattern to be present in the received data when a comparison operation between the received data and a stored copy of the synchronisation pattern results in no more than K bits of the received data failing the comparison, where K is zero or a positive integer, the L-bit synchronisation pattern and the repeating pattern of fixed value and variable bits being selected such that a string of L successive bits of the repeating pattern, starting at any position in a repeat of the pattern, matches less than $L-K$ bits of the synchronisation pattern even if it is assumed that every variable bit in the string provides a match.

In accordance with another aspect of the present invention there is provided a method of telecommunication in which first and second devices perform time-division two-way communication with each other over a radio channel by exchanging radio signals in alternating bursts carrying digital data, such that during the time-division two-way communication transmission of a said burst from one of the first and second devices is completed before transmission of the next burst by the other of the first and second devices is begun, characterised in that:

at least one format of digital data in a burst comprises a first portion having a repeating pattern of fixed value and variable bits and a second portion comprising an L-bit synchronisation pattern which may be detected asynchronously by the receiving device to enable it to discover the timing of the burst, and the receiving device deems the synchronisation pattern to be present in the received data when a comparison operation between the received data and a stored copy of the synchronisation pattern results in no more than K bits of the received data failing the comparison, where K is zero or a positive integer, the L-bit synchronisation pattern and the repeating pattern of fixed value and variable bits being selected such that a string of L successive bits of the repeating pattern, starting at any position in a repeat of the pattern, matches less than $L-K$ bits of the synchronisation pattern even if it is assumed that every variable bit in the string provides a match.

Preferably, any said string of L successive bits of the said repeating pattern matches no more than $L-K-2$ bits of the synchronisation pattern even if it is assumed that every variable bit of the string provides a match.

In accordance with another aspect of the present invention there is provided a telecommunication system in which first and second devices are capable of time-division two-way communication with each other over a radio channel by exchanging radio signals in alternating bursts carrying digital data, such that during the time-division two-way communication transmission of a said burst from one of the first and second devices is completed before transmission of the next burst by the other of the first and second devices is begun, characterised in that:

at least one format of digital data in a burst comprises an L-bit synchronisation pattern which may be detected asynchronously by a receiving device to enable it to discover the timing of the burst, and the receiving device deems the synchronisation pattern to be present in the received data when a comparison operation between the received data and a stored copy of the synchronisation pattern results in no more than K bits of the received data failing the comparison, where K is zero or a positive integer, the synchronisation pattern being adjacent a portion of the burst made up of fixed value bits, and the number of matches between the synchronisation pattern and any string of L successive bits of the burst composed only of least a part of the said portion of fixed value bits and an adjacent part of the synchronisation pattern being less than $L-K$.

In accordance with another aspect of the present invention there is provided a method of telecommunication in which first and second devices perform time-division two-way communication with each other over a radio channel by exchanging radio signals in alternating bursts carrying digital data, such that during the time-division two-way communication transmission of a said burst from one of the first and second devices is completed before transmission of the next burst by the other of the first and second devices is begun, characterised in that:

at least one format of digital data in a burst comprises an L-bit synchronisation pattern which may be detected asynchronously by a receiving device to enable it to discover the timing of the burst, and the receiving device deems the synchronisation pattern to be present in the received data when a comparison operation between the received data and a stored copy of the synchronisation pattern results in no more than K bits of the received data failing the comparison, where K is zero or a positive integer, the synchronisation pattern being adjacent a portion of the burst made up of fixed value bits, and the number of matches between the synchronisation pattern and any string of L successive bits of the burst composed only of least a part of the said portion of fixed value bits and an adjacent part of the synchronisation pattern being less than $L-K$.

Preferably, different said L-bit synchronisation patterns are used under different circumstances, and the number of matches between any said synchronisation pattern and any string of L successive bits of the burst composed only of any other said synchronisation pattern or at least a part of the said portion of fixed value bits and an adjacent part of any other said synchronisation pattern is less than $L-K$.

Preferably, for at least some of the said synchronisation patterns, the said number of matches does not exceed $L-K-8$.

Preferably, for all of the said synchronisation patterns, the said number of matches does not exceed $L-K-7$.

Preferably, K is not zero and more preferably, K is two.

In accordance with another aspect of the present invention there is provided a telecommunication system in which first and second devices are capable of time-division two-way communication with each other over a radio channel by exchanging radio signals in alternating bursts carrying digital data, such that during the time-division two-way communication transmission of a said burst from one of the first and second devices is completed before transmission of the next burst by the other of the first and second devices is begun, characterised in that:

at least one format of digital data in a burst comprises an L-bit synchronisation pattern which may be detected asynchronously by a receiving device to enable it to discover the timing of the burst, the synchronisation pattern having a peak self-correlation side lobe value of not more than +2, for any amount of offset, where the self-correlation side lobe value at an amount of offset is defined as the number of matches between bits of the pattern and itself offset by the amount, minus the number of mismatches between the bits of the pattern and itself at the same amount of offset.

In accordance with another aspect of the present invention there is provided a method of telecommunication in which first and second devices perform time-division two-way communication with each other over a radio channel by exchanging radio signals in alternating bursts carrying digital data, such that during the time-division two-way communication transmission of a said burst from one of the first and second devices is completed before transmission of the next burst by the other of the first and second devices is begun, characterised in that:

at least one format of digital data in a burst comprises an L-bit synchronisation pattern which may be detected asynchronously by a receiving device to enable it to discover the timing of the burst, the synchronisation pattern having a peak self-correlation side lobe value of not more than +2, for any amount of offset, where the self-correlation side lobe value at an amount of offset is defined as the number of matches between bits of the pattern and itself offset by the amount, minus the number of mismatches between the bits of the pattern and itself at the same amount of offset.

In accordance with another aspect of the present invention there is provided a telecommunication system in which first and second devices are capable of time-division two-way communication with each other over a radio channel by exchanging radio signals in alternating bursts carrying digital data, such that during the time-division two-way communication transmission of a said burst from one of the first and second devices is completed before transmission of the next burst by the other of the first and second devices is begun, characterised in that:

at least one format of digital data in a burst comprises a 24-bit synchronisation pattern which may be detected asynchronously by a receiving device to enable it to discover the timing of the burst, the synchronisation pattern, when given in hexadecimal format, being one of: BE4E50; 41B1AF; EB1B05; 14E4FA; 0A727D; F58D82; A0D8D7; and 5F2728.

In accordance with another aspect of the present invention there is provided a method of telecommunication in which first and second devices perform time-division two-way communication with each other over a radio channel by exchanging radio signals in alternating bursts carrying digital data, such that during the time-division two-way communication transmission of a said burst from one of the first and second devices is completed before transmission of the next burst by the other of the first and second devices is begun, characterised in that:

at least one format of digital data in a burst comprises a 24-bit synchronisation pattern which may be detected asynchronously by a receiving device to enable it to discover the timing of the burst, the synchronisation pattern, when given in hexadecimal format, being one of: BE4E50; 41B1AF; EB1B05; 14E4FA; 0A727D; F58D82; A0D8D7; and 5F2728.

The present invention also includes a communication device usable in any of the above systems, and in particular a communication device usable as the first device and a communication device usable as the second device.

BRIEF DESCRIPTION OF THE DRAWINGS

Embodiments of the present invention, given by way of example, will now be described with reference to the accompanying drawings in which:

FIG. 2 is a schematic illustration of the pattern of burst transmissions in an embodiment of the present invention;

FIG. 3 is a schematic representation of the frequency and amplitude variation of the radio frequency signal in a burst in an embodiment of the present invention;

FIGS. 4a and 4b illustrate schematically first and second versions of a first type of data structure in a signal burst used in an embodiment of the present invention;

FIG. 5 illustrates schematically a second type of data structure in a signal burst used in an embodiment of the present invention;

FIG. 6 illustrates schematically the relative timing of a third type of data structure, transmitted by the handset in an embodiment of the present invention, relative to the transmission cycle of a base station in the embodiment of the present invention;

FIG. 7 illustrates in more detail a portion of FIG. 6;

FIG. 8 illustrates schematically the arrangement of data in the data structure of FIG. 6;

FIG. 11 illustrates a second version of a handset used in an embodiment of the present invention;

FIG. 12 illustrates schematically the parts of a handset in an embodiment of the present invention;

FIG. 13 illustrates schematically a version of a base station for use in an embodiment of the present invention;

FIG. 14 illustrates schematically the parts of a base station for use in an embodiment of the present invention;

FIG. 15 is a schematic block diagram of the control circuit of a handset;

FIG. 16 is a schematic block diagram of the control circuit of the base station;

FIG. 38 illustrates in more detail a first alternative structure for a base station embodying the present invention;

FIG. 39 illustrates in more detail a second alternative structure for a base station embodying the present invention;

FIG. 40 illustrates a third alternative structure for a base station embodying the present invention.

DESCRIPTION OF THE PREFERRED EMBODIMENTS

In this specification, "kbit" and "kword" will be used as abbreviations for "kilobits" and "kilowords", meaning "thousand bits" and "thousand words" respectively, in accordance with normal practice in the digital signalling art.

Overview

Figure 1:
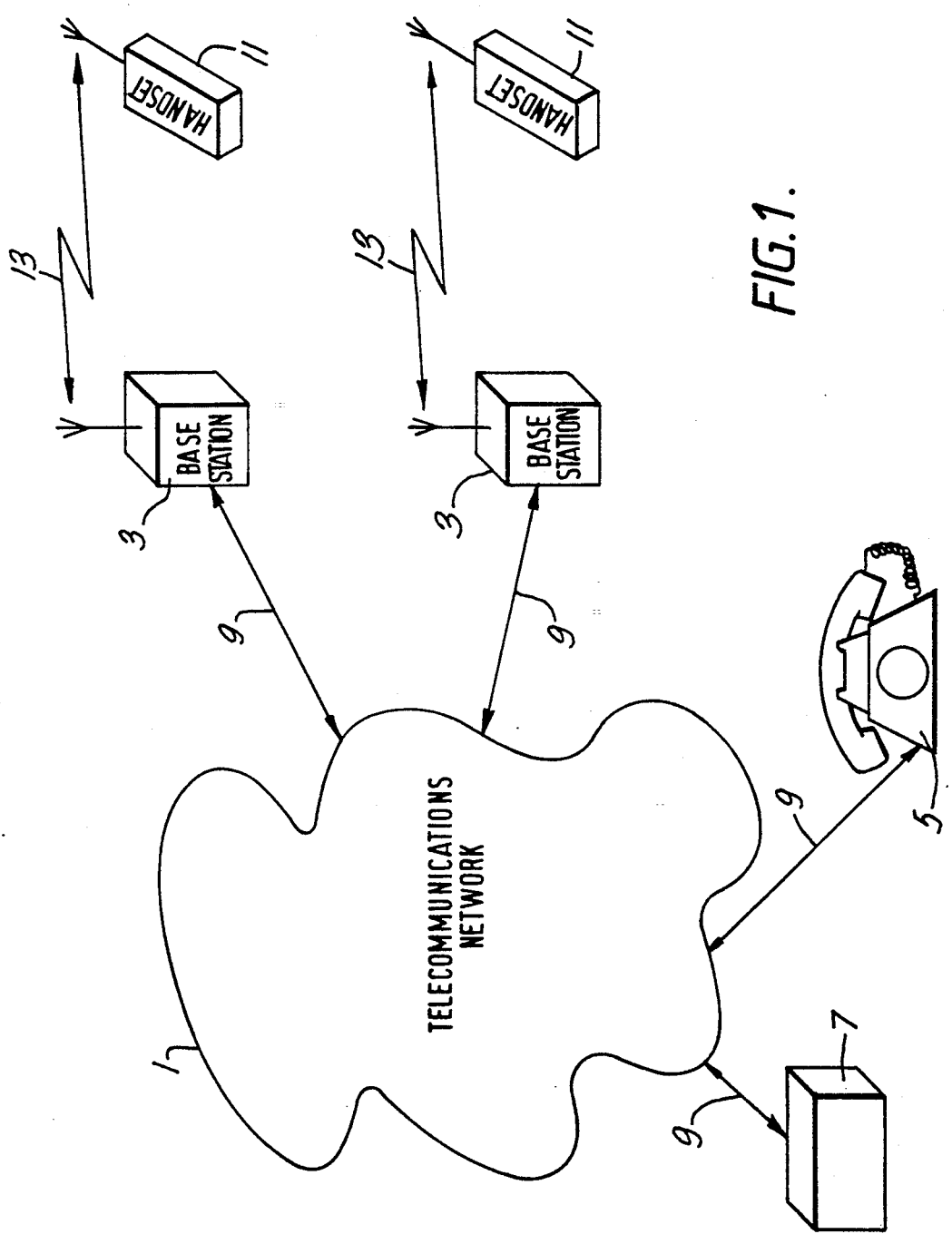
FIG. 1 is a schematic view of a telecommunications system connected to a base station of a system embodying the present invention.

FIG. 1 shows schematically a number of telecommunications devices connected to a telecommunications network 1. The telecommunications network 1 is typically a PSTN (Public Switched Telephone Network), although in the future an ISDN (Integrated Services Digital Network) may be more common. The telecommunications network 1 is connected to a variety of devices, and as examples of these FIG. 1 shows base stations 3 of a cordless telephone apparatus embodying the present invention, a telephone 5 and other telecommunications apparatus 7 such as a facsimile machine or a modem for a computer. Each of these communications devices is connected to the telecommunications network 1 by a network link 9, which will typically include some or all of a wired link, an optical fibre link and a long distance radio link.

As shown in FIG. 1, the cordless telephone apparatus embodying the present invention comprises a base station 3 and a remote unit 11. The remote unit will typically be a telephone handset for speech communication, and will be referred to hereinafter as a handset. The handset 11 communicates with the base station 3 over a radio link, diagrammatically represented at 13 in FIG. 1, and this provides access for the user of the handset 11 to the telecommunications network 1.

Although FIG. 1 shows only one handset 11 per base station 3, alternative embodiments will be referred to with respect to other figures, in which a plurality of handsets 11 are associated with one base station 3, either so that the base station 3 can communicate with any chosen one of the handsets 11, or in some cases so that the base station 3 can communicate simultaneously with different handsets 11 on different radio channels. The typical uses of such cordless telephone systems include:

the provision of public telepoint services, in which carriers of handsets 11 can go to the vicinity of a publicly available base station 3, set up a radio link with the base station 3, and thereby access the telecommunications network 1;

the provision of an office private branch exchange and/or intercom system, having separately numbered extensions; and the provision of a domestic or office extension and/or intercom system in which extensions are not individually numbered. For purely intercom use, there would, of course, be no need for the base station 3 to be connected to a telecommunications network 1.

The construction and operation of the cordless telephone system comprising the base station 3 and the handset 11 will now be described. The system is in accordance with the British Department of Trade and Industry specification MPT 1375, incorporated herein by reference, to which reference may be had for further details and regulatory restrictions. In MPT 1375, the base station 3 is normally referred to as "the cordless fixed part" or "the CFP", and the handset 11 is normally referred to as "the cordless portable part" or "the CPP", and where appropriate similar terminology will be used herein. The terms "fixed" and "portable" refer to the nature of the typical connections made between the parts and the telecommunications network 1, and do not necessarily mean that the base station 3 cannot move from place to place.

Burst Mode Transmission and Timing

The base station 3 and the handset 11 communicate with each other over a single radio channel, using time division duplex burst mode transmission. The pattern of transmissions in an established radio link is illustrated in FIG. 2. The top line in FIG. 2 represents transmissions by the base station 3, and the lower line represents transmissions by the handset 11.

A complete period in the burst mode transmission system lasts for two milliseconds. Two bursts of data, one in each direction, are transmitted in each burst period. Each two millisecond burst period begins at the time t1 in FIG. 2, when the base station 3 begins to transmit a burst. The burst transmission from the base station 3 ends at time t2, which is slightly less than 1 millisecond after time t1. After a slight gap, the handset 11 begins a transmission burst at time t3, and this transmission burst also lasts for slightly less than 1 millisecond and ends at time t4. After another slight gap, the next 2 millisecond transmission period begins.

The length of the transmission periods is controlled by the base station 3, which ensures that successive times t1, at which it begins transmitting a burst, are 2 milliseconds apart. The base station 3 and the handset 11 both transmit digital data at 72 kilobits per second. Therefore each 2 ms burst period is equivalent to 144 bit periods. Depending on the burst structure being used, as will be described later, each burst comprises either 68 bits or 66 bits. Thus, the period from t1 to t2 (and also the period from t3 to t4) is either about 0.9167 ms or about 0.9444 ms.

The gap between time t2 and time t3, and the gap between time t4 and the following time t1, are present to give the base station 3 and the handset 11 time to switch between transmitting and receiving modes, and also to allow for RF propagation delay of the signals. The size of the gap between time t2 and time t3 is determined by the handset 11. If the two bursts in the burst period are each 66 bits long, the handset 11 will begin transmitting the first bit of its burst 5.5 bit periods after the end of the last bit of the received burst from the base station 3. If the two bursts are each 68 bits, the handset waits for only 3.5 bit periods. Assuming that there is no RF propagation delay of the signals, the gap between time t4 and the following time t1 will be 1 bit period greater than the gap between time t2 and time t3. If there is an RF propagation delay in the transmission of the signals, the handset 11 will receive the transmission from the base 3 slightly later, and accordingly the transmission from the handset 11 will begin slightly later, and the gap between time t4 and the following time t1 is accordingly reduced. The system can cope with a cumulative propagation delay of 2 bit periods in each burst period (typically up to 1 bit period in each direction), while still allowing the base station 3 at least 2.5 bit periods to switch from receiving to transmitting, even when 68-bit bursts are being used. The base station 3 is assumed to be able to switch faster than the handset 11 (which is allowed at least 3.5 bit periods ), to allow simpler and lower cost circuitry to be used in the handset 11.

As will be explained later, communication between the base station 3 and the handset 11 may use more than one data structure for the bursts. 68-bit bursts can only occur in one data structure, known as multiplex 1, whereas a second data structure known as multiplex 2 always uses 66-bit bursts. During a change communication using multiplex 1 and communication using multiplex 2, it is possible for there to be a brief period during which one part is transmitting 68-bit multiplex 1 bursts while the other is transmitting 66-bit multiplex 2 bursts. In this case, the gaps between times t2 and t3 and between times t4 and the next t1 will alter correspondingly.

In addition to radio signal (RF) propagation delays, there may be signal delays through the circuitry of the base station 3 and the handset 11. As these are internal to the devices, they can be compensated for in the design of the devices. These delays are not included in FIG. 2 which is concerned only with the timing of signals at the aerials of the devices.

The digital bits are transmitted in each data burst by frequency modulation, known as frequency shift keying (FSK), of the radio carrier frequency.

The overall structure of a data burst is illustrated in FIG. 3. In the gap between the time when one of the base station 3 and the handset 11 stops transmitting and the time when the other starts transmitting, the radio frequency will have zero amplitude. In order to transmit the digital data of a burst, the radio frequency signal must be transmitted at a suitable amplitude. In order to avoid an amplitude modulation splash of interference on other channels, the part which is about to transmit a burst begins to transmit the radio frequency signal before the beginning of the data burst, and slowly increases the amplitude of the signal. This is the period from a to b in FIG. 3. The RF amplitude envelope is shown at 15 in FIG. 3.

At instant b in FIG. 3, the first bit period of the data burst begins. One binary bit of data is transmitted in each bit period, by frequency modulation, with the transmitted frequency being greater than the carrier freqency for the logical "1", and being less than the carrier frequency for a logical "0". In order to avoid a frequency modulation splash on other channels, the transmitted frequency cannot be varied instantaneously, and therefore it varies gradually as shown by the RF frequency envelope 17 in FIG. 3. Instant c in FIG. 3 represents the end of the first bit period and the beginning of the second bit period. Instant d represents the end of the last bit period.

Because of the delay dispersion introduced by some types of filter used in the base station 3 and the handset 11, it is necessary to maintain the amplitude of the RF signal at no more than 6 dB below its amplitude during the data burst, for half a bit period until instant e, to ensure that all data is correctly received and processed at the receiving end. This half bit period is known as a suffix, and is represented at reference numeral 19. Following the end of the suffix 19 at instant e, the radio frequency is reduced in amplitude gradually to avoid amplitude modulation splash, and that ends the transmission by that part.

Data Structure of Bursts - MUX 1 and MUX 2

Communication between the base station 3 and the handset 11 takes place over three logical channels. Since there is only one radio channel between the two parts of the system, the three logical channels are combined by time division multiplexing. At any given time during an established link, the base station 3 and the handset 11 will be communicating with each other using bursts as described above, having a pre-selected data structure for providing time division multiplexing between the channels. In each of the available data structures, each burst carries two of three logical channels, multiplexed together. Each of these data structures is known as a multiplex, abbreviated as "MUX".

Once a link has been set up, and the bursts between the base station 3 and the handset 11 are carrying the information which the user wishes to exchange with the person or device he is connected to through the telecommunications network 1, the data structure of bursts will be a form called multiplex 1 (or MUX 1). This is shown in FIG. 4. Two forms of multiplex 1 are possible: multiplex 1.2 as shown in FIG. 4a and multiplex 1.4 as shown in FIG. 4b.

In multiplex 1.2, each burst is 66 bits long. The first bit and the last bit are defined as belonging to the D logical channel and the central 64 bits are defined as belonging to the B logical channel. The B channel carries the data which the user is transmitting or receiving. In the normal case, where the handset 11 is being used to hold a telephone conversation, the B channel will be carrying digitally encoded speech sound data.

The D channel carries signalling data. This data may represent various things, as will be described later, but most data carried by the D channel can be assigned to one of two general types. First, there is data communicated between the base station 3 and the handset 11 purely for the purpose of establishing or maintaining the radio link between the parts. This data includes handshake signals, identification and authorisation codes which enable one part to recognise the other and permit or refuse to permit a communication link between them to be established, etc.. The second kind of data instructs the receiving part to take some action or informs the receiving part that some action has occured at the transmitting part. For instance, if the user presses a key on the handset 11, this fact will be transmitted to the base station 3 by the D channel, and if the base station 3 instructs the handset 11 to display a symbol or flash the display, this will be transmitted in the D channel.

D channel data is transmitted in code words having a defined format, which will be discussed later. Because each burst in multiplex 1.2, as shown in FIG. 4a, contains only two bits of D channel data, it requires a large number of bursts to transmit a single code word of the D channel. In multiplex 1.4, as illustrated in FIG. 4b, D channel data can be transmitted at twice the rate. Each burst in this multiplex structure is 68 bits long. The first two bits and the last two bits are defined as D channel bits, and the central 64 bits are defined as B channel bits. It should be noted that in both multiplex 1.2 and multiplex 1.4, each burst carries the same number of B channel bits and the difference between them is only in the number of D channel bits carried per burst.

Although multiplex 1.4 is advantageous because it permits transmission of the D channel at twice the rate permitted by multiplex 1.2, this is achieved by making each burst in multiplex 1.4 two bits longer (i.e. 68 bits instead of 66 bits) than each burst of multiplex 1.2. With reference to FIG. 2, this means that when the two parts are communicating using multiplex 1.4, the gap between times t2 and t3, during which each part can switch between transmission mode and reception mode, is reduced by two bit periods from 5.5 bit periods to 3.5 bit periods. The gap between time t4 and time t1 is similarly reduced by two bit periods. Thus, communication using multiplex 1.4 can only take place if both the base station 3 and the handset 11 are capable of switching between transmission and reception modes in the reduced time available. A device which cannot make this switch sufficiently quickly will only be able to use multiplex 1.2.

All base stations 3 and handsets 11 in the preferred embodiment are capable of communicating using multiplex 1.2, even if they are also capable of communicating using multiplex 1.4. In any particular radio link between a base station 3 and a handset 11, both parts must use the same version of multiplex 1. During the initial setting up of a link the two parts will communicate with a different data structure, known as multiplex 2 (or MUX 2), before switching to multiplex 1, and before switching to multiplex 1 the two parts will perform an operation (sometimes known as a "negotiation" operation) to determine which version of multiplex 1 will be used. If both parts can communicate using multiplex 1.4, this will be done. If either or both of the parts can only use multiplex 1.2, then this version of multiplex 1 must be adopted for this radio link.

The structure of multiplex 2 is shown in FIG. 5. This data structure is used in setting up a link before communication using the B channel begins. In the multiplex 2 data structure, no B channel is transmitted. Each multiplex 2 data burst is 66 bits long. The first 16 bits and the last 16 bits are defined as belonging to the D channel, and the central 34 bits are defined as belonging to the third logical channel called the S channel. The first 10 bits of the S channel are P bits, which form a preamble, and simply comprise an alternation between "1" and "0". The remaining 24 bits of the S channel are W bits, and define an S channel synchronisation word.

The S channel is used to synchronise the two parts when a radio link between them is being established. Two levels of synchronisation are required. First, the parts must enter bit synchronisation, so that the receiving part when decoding a received signal divides the received signal into bits with the correct timing. Second, the two parts must enter burst synchronisation, so that one part transmits while the other is in reception mode, and then the other transmits while the first is in reception mode, to provide the alternating burst transmission structure illustrated in FIG. 2.

When a link is being established in either direction the first radio signals which a handset 11 receives from a base station 3 will be in the multiplex 2 format, and if the base station 3 is initiating the creation of a link with a handset 11, the first signals which the base station 3 receives from the handset 11 will also be in the multiplex 2 format. (When the handset 11 is initiating the link, it first transmits in a further data structure, called multiplex 3 (or MUX 3), which will be described later.) Therefore, multiplex 2 has been designed to permit rapid synchronisation between the two parts.

Most base stations 3 and handsets 11 will contain automatic frequency control or automatic gain control circuits, or both. These circuits require an initial period, during which the radio signal is received, to perform their control operations and establish satisfactory radio reception by the part concerned. The first 16 bits of D channel in the multiplex 2 structure provide such a period of radio transmission, permitting the automatic gain control and automatic frequency control circuits to settle before the 34 bits of S channel are received.

The successive bit value reversals in the "1010 . . ." preamble pattern of the P bits of the S channel provide a clear definition of the timing of the bit periods, enabling the receiving part to enter bit synchronisation with the transmitting part before the 24 bit synchronisation word of the S channel is received. The synchronisation word has a predetermined pattern, which the receiving part is searching for in the received data burst. When this bit pattern is recognised, the receiving part knows that the 24 bits under consideration form the synchronisation word of the S channel. Since the position of this word in the multiplex 2 structure is defined, the receiving part can then determine the burst timing of the received multiplex 2 data burst, and therefore burst synchronisation can be attained.

D channel data can vary, and it is possible that by chance 24 successive D channel bits could have the same pattern as an S channel synchronisation word. If this was mis-identified as the S channel synchronisation word, the receiving part would select an incorrect burst timing. To prevent this, the D channel is split in multiplex 2 into two 16 bit portions, so that the burst does not contain 24 D channel bits as an unbroken string.

As described above with reference to FIG. 2, the base station 3 determines the 2 millisecond burst period by beginning the transmission of successive data bursts from it at 2 millisecond intervals. The handset 11 has to adapt its reception and transmission timing to match the timing of the base station 3, and thus create the time division duplex structure of FIG. 2. Thus, in determining burst synchronisation timing the base station 3 acts as a master and handset 11 acts as a slave. Since the base station 3 will typically contain more accurate clocks than handset 11, this is convenient for maximising the accuracy of the burst mode timing. Additionally, if a base station 3 is capable of communicating simultaneously with different handsets 11 using different radio channels, it will normally be impractical or even impossible for the base station 3 to maintain two such links unless the transmission and reception timing for the two links is synchronised. Therefore, the timing of the handset 11 must be slaved to the timing of the base station 3.

Link Initiation and MUX 3

If the base station 3 wishes to initiate a link, it will begin transmitting in multiplex 2. If a handset 11 is switched on but is not communicating in a link, it will be scanning radio channels looking for a channel on which transmission is taking place. If the handset 11 detects radio transmission, it will attempt to decode it on the assumption that it is multiplex 2. The handset 11 performs these operations asynchronously, and if the received signal is in the multiplex 2 format the preamble portion and the synchronisation word of the S channel will enable the handset 11 to obtain bit and burst synchronisation with the transmitted signals. Once this synchronisation has been obtained, the contents of the D channel can be decoded and the process of link initiation can begin.

A problem may arise if a handset 11 wishes to initiate a communications link with a base station 3. The operation of an idle base station 3, i.e. one which is waiting for a call from a handset, may be synchronised to the operation of an active base station, i.e. one which is already in communication with a handset. Thus the idle base station will only have a listening window during which it can receive transmissions from a handset 11 during the times in which the active base station is in the reception mode. This restriction on the ability of an idle base station to listen will almost inevitably be the case if the two base stations share a common aerial, because RF power leaking from the transmitter of the base station already in communication will probably swamp the received power from a calling handset, so that the idle base station would be unable to detect any handset during these periods, even if it was in reception mode. Therefore, it must be assumed by the handset 11 that a base station has a listening window of only about 1 millisecond (72 bits) in every 2 millisecond (144 bit) burst period.

A handset 11 which is not already in communication with a base station 3 will not be synchronised with the base station 3, and therefore it cannot send out a link request signal having a timing synchronised to the listening periods of the base station 3 it is trying to reach. Therefore, the handset 11 makes a link request by transmitting asynchronously in a further data structure called multiplex 3 (or MUX 3). The asynchronous nature of multiplex 3 is shown in FIG. 6.

The lower line in FIG. 6 represents the timing of the operations of the base station 3. The base station 3 will divide time into a plurality of transmit periods 21, and will only be able to receive signals from the handset 11 in between these transmit periods 21. The top line in FIG. 6 shows the activity of a handset 11 transmitting in multiplex 3. Each multiplex transmission, indicated at 23 in FIG. 6, is 720 bits long, and lasts for a period of 10 milliseconds. Successive multiplex 3 transmissions 23 are separated by 288 bit periods, lasting 4 milliseconds, during which the handset switches from transmission mode to reception mode and listens for a reply in multiplex 2 from the base station 3. Thus, the total burst period of multiplex 3 transmissions is 1008 bit periods or 14 milliseconds. The multiplex 3 burst period is seven times as long as the burst period for multiplex 1 and multiplex 2, and the multiplex 3 transmission lasts for five multiplex 1 or multiplex 2 burst periods.

As shown in FIG. 6, each multiplex 3 transmission 23 is divided into five equal sub-multiplex sections. Each is 144 bits long, and lasts for 2 milliseconds. Thus, each sub-multiplex lasts for the same length of time as a period of operation of the base station 3 including a transmission period and a reception period.

FIG. 7 shows a portion of FIG. 6 on an enlarged scale. Each sub-multiplex of multiplex 3 is in turn divided into four equal repetition periods. The data transmitted in one sub-multiplex is repeated in each 10 repetition period. Each repetition period contains 36 bits and lasts for 0.5 milliseconds. Because the hand set 11 is not synchronised with the base station 3, the timing of the signal reception windows in the operation of the base station 3 with respect to the multiplex 3 structure cannot be predicted. However, each 36 bit repetition period of a sub-multiplex is sufficiently short that the base station 3 must receive at least one complete repetition period of a sub-multiplex in the period between successive base station transmission periods 21. In FIG. 7, the relative timings of the operation of the base station 3 and the handset 11 are such that the third repetition period of each sub-multiplex falls entirely within a base station reception period, and will therefore be received by the base station 3.

Because each repetition period contains a complete copy of the data being transmitted in one sub-multiplex period of a multiplex 3 burst, it is only necessary for the base station 3 to receive one repetition period of each sub-multiplex to receive the data transmitted by the handset 11. As shown in FIG. 6, the first four sub-multiplex periods of multiplex 3 are defined as carrying the D channel, while the final sub-multiplex period of multiplex 3 is defined as carrying the S channel. This maximises the likelihood that the base station 3 will receive and decode a repetition period of the S channel.

Each repetition period of the S channel sub-multiplex of multiplex 3 contains an S channel synchronisation word. When the base station 3 detects this, it knows that there should be no multiplex 3 transmissions during the next two reception periods, and then in successive reception periods it should receive four portions of D channel and then an S channel portion including the synchronisation word again. In this way, the base station 3 can be temporarily synchronised with the multiplex 3 timing from the hand set 11, without altering its own burst synchronisation for multiplex 1 and multiplex 2 signals.

Following decoding of the multiplex 3 signals received from the handset 11, the base station can reply in multiplex 2 during the 288 bit space between successive multiplex 3 transmissions. This space is sufficiently long that it can be guaranteed to include at least one complete base station transmit period 21, as can be seen in FIG. 6. Once the handset 11 receives a reply in multiplex 2 from the base station 3, it ceases to transmit in multiplex 3 and transmits instead in multiplex 2, synchronised to the timing of the base station 3.

Figures 9, 10:
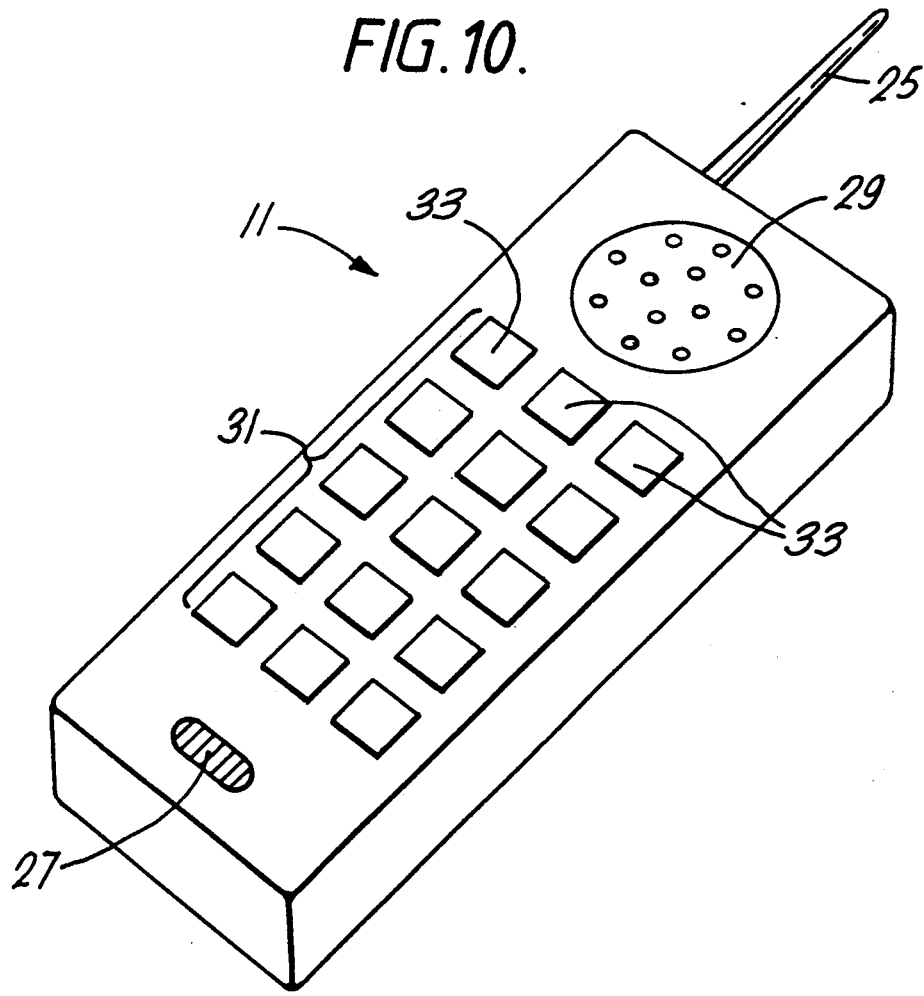
FIG. 9 illustrates in more detail part of FIG. 8.
FIG. 10 illustrates a first version of a handset for use in an embodiment of the present invention.

The arrangement of data in the multiplex 3 structure is shown in more detail in FIGS. 8 and 9. In FIG. 8 each line represents one sub-multiplex period. The first four lines represent the four D channel sub-multiplex periods, and the fifth line represents the S channel sub-multiplex period. The sixth and seventh lines represent the period (equal to two sub-multiplex periods) which follow one multiplex 3 transmission before the next multiplex 3 transmission. The handset 11 listens for a reply in multiplex 2 during this period.

The five lines of the multiplex 3 transmission are each divided into the four repetition periods. In the first four lines, each repetition period contains 36 D channel bits. Successive repetition periods of the same sub-multiplex are identical, but successive sub-multiplexes carry different D channel information. Each repetition period of the fifth line in FIG. 8, representing the fifth sub-multiplex, contains 36 bits of S channel. The S channel data in each repetition period is identical. Thus, the entirety of the data transmitted in a multiplex 3 burst is contained in a single column in FIG. 8.

FIG. 9 shows in more detail the arrangement of data in a single column of FIG. 8. In the D channel, only some of the bits carry useful data. Each 36 bit repetition period begins with 6 P bits forming a preamble portion of alternating logic "1" and "0". Then there are 10 data carrying bits, then a further 8 P bits, then a further 10 data carrying bits and finally 2 further P bits. In this way, each repetition period contains 20 data carrying bits of the D channel, divided into two stretches of 10 bits separated by 8 bits of preamble. The data carrying bits can adopt any values, depending on the data being transmitted in the D channel, and therefore it is theoretically possible that the pattern of data bits in the D channel may be identical to or may closely resemble the synchronisation word of the S channel. If the D channel data was transmitted continuously and this pattern of bits arose in it by chance, the base station 3 would misidentify the received D channel repetition period as belonging to the S channel, and therefore it would decode multiplex 3 incorrectly. By splitting the data carrying bits of the D channel into sections of 10 bits, separated by 8 bits of preamble, the D channel in multiplex 3 can never contain a pattern of successive bits resembling the pattern of the S channel synchronisation word.

As shown in FIG. 9, each repetition period of the S channel sub-multiplex of multiplex 3 begins with a preamble of 12 P bits, alternating between logic "1" and logic "0". This is followed by 24 W bits making the S channel sychronisation word. This arrangement of the S channel in multiplex 3 maximises the opportunity for the receiving base station 3 to obtain bit synchronisation with the multiplex 3 signal before it receives the synchronisation word.

S Channel Structure

The structure of the S channel is very simple. It consists of 10 bits of preamble followed by 24 bits of synchronisation word in multiplex 2, as shown in FIG. 5, or 12 bits of preamble followed by a 24 bit synchronisation word in multiplex 3, as shown in FIG. 9. The preamble is always made up of alternating logic "1" and "0".

In the system of the preferred embodiment, there are four possible S channel synchronisation words. Two of these are used only by base stations 3, and the other two are used only by handsets 11. When a part wishes to initiate a link, it uses an S channel synchronisation word known as a channel marker, abbreviated CHM. When the other part receives the signals, it replies using a normal synchronisation word, abbreviated SYNC. When the link between the two parts is established, following reception of this reply, the first part changes the synchronisation word in the S channel in its transmissions from CHM to its version of SYNC. The version of CHM for the base station 3 is called the fixed part channel marker, abbreviated CHMF, and the channel marker for the hand set 11 is called the portable part channel marker, abbreviated CHMP. Similarly, the base station 3 version of SYNC is referred to as SYNCF and the handset 11 version of SYNC is referred to as SYNCP. CHMF and CHMP are bit inverses of each other, and SYNCF and SYNCP are bit inverses of each other.

Thus, if a base station 3 wishes to initiate a link it will transmit a link request using multiplex 2, with CHMF as the S channel synchronisation word. A handset 11 receiving this transmission will reply in multiplex 2, using SYNCP as the S channel synchronisation word. Once the link is established the base station 3 will change its multiplex 2 bursts to use SYNCF as the S channel synchronisation word instead of CHMF.

If a handset 11 wishes to initiate a link, it will transmit a link request in multiplex 3, using CHMP as the S channel synchronisation word. When this is detected by a base station 3, it will reply in multiplex 2 using SYNCF as the S channel synchronisation word. Once the link is established, the handset 11 will change its transmissions to multiplex 2, using SYNCP as the synchronisation word.

When a base station 3 or a handset 11 is scanning channels to determine whether another part is requesting a link with it, it will only react to a CHM synchronisation word, since this indicates that there is another part wishing to set up a link. If a SYNC synchronisation word is detected, this indicates that the channel contains a link which has already been set up, and therefore the part which is scanning channels should not react.

Base stations 3 are arranged to be capable of recognising CHMP and SYNCP, i.e. the S channel synchronisation words transmitted by a handset 11, but are not capable of recognising CHMF or SYNCF. Therefore, a base station 3 will never decode and respond to a multiplex 2 transmission from another base station, even if it is received. Similarly, handsets 11 can only recognise CHMF and SYNCF, and not CHMP and SYNCP, so that handsets cannot recognise multiplex 2 and multiplex 3 transmissions from each other and therefore handsets can never initiate links directly between themselves but only with base stations.

Hardware

Following the above description of the manner in which the base station 3 and the handset 11 exchange signals, the base station 3 and the handset 11 themselves will now be described.

FIG. 10 shows an example of a handset 11. It has an aerial 25 for transmitting and receiving signals in the radio link with the base station 3. The aerial 25 may alternatively be provided out of sight inside the casing of the handset 11. The handset 11 has a microphone 27 and a speaker 29 for use in telephone voice communication, and has a keypad 31 for controlling its operations. The bottom four rows of the keypad provide a convention telephone keypad, allowing numbers to be dialled etc., including 0 to 9 numeric keys, a "hash" key and a "*" key. The keys 33 of the top row allow the user to control the radio link with a base station 3. By pressing an appropriate key 33 the user can accept a call to the handset 11 from a base station 3, or request access to the telecommunications network 1 through a nearby base station 3.

The handset 11 may be provided with other conventional features, such as memories for pre-storing telephone numbers, and a display. An example of a handset 11 having a display 35 is shown in FIG. 11. Apart from the presence of the display 35, this handset is the same as the handset of FIG. 10.

FIG. 12 is a schematic diagram of the handset construction. The handset is controlled by a control circuit 37, which is connected to the aerial 25, the microphone 27, the speaker 29 and a keypad/display unit 39 which provides the keypad 31, and also the display 35 if it is provided. One or more batteries 41 provide power to the control circuit 37 and the key pad/display unit 39.

FIG. 13 shows an example of a base station 3. This has an aerial 43 for communication with cordless telephone handsets 11, and is also connected through a conventional telephone connection 45 to the telecommunications network 1 and though a power connection 47 to a conventional electricity power source.

The base station 3 is also provided with a conventional wired telephone handset 49, a display 51 and a keypad 53, which enable the base station 3 to be used as a conventional telephone connected to the telecommunications network 1 and also as an intercom station which can communicate with a cordless telephone handset 11 without involving the telecommunications network 1. FIG. 14 provides a schematic view of the construction of the base station 3. It is controlled by a base station control circuit 55, which is connected to the wired handset 49, to the telephone connection 45 and to a keypad/display unit 57 which provides the keypad 53 and display 51 in a conventional manner. A power supply circuit 59 receives electricity from the power connection 47, and supplies power to the control circuit 55 and the key pad/display unit 57. The power supply circuit 59 may include power storage means such as batteries or capacitors, enabling the base station to operate for a limited period even when disconnected from an external electricity supply.

The base station control circuit 55 includes a switching means 61, connected to the wired handset 49, the telephone connection 45 and the aerial 43. In one state of the switching means 61, it connects the wired handset 49 to the telephone connection 45 to permit normal telephone operation without the speech signals being processed by the control circuit 55 in the manner required for transmission over the radio link. In another state, the switching means 61 connects the wired handset 49 and the aerial 43 to the remainder of the control circuit 55 so that speech signals pass between the wired handset 49 and the aerial 43 having been processed as required to permit communication over the radio link with a cordless handset 11. In a third state the switching means 61 connects the telephone connection 45 to the remainder of the control circuit 55 in place of the wired handset 49, enabling the base station 3 to act simply as a base for the radio link between the remote handset 11 and the telecommunications network 1.

Where the functions of the wired handset 49 are not required, the base station 3 may not include any of the wired handset 49, the display 51, the keypad 53 the keypad/display unit 57 and the switching means 61. The base station control circuit 55 would be permanently connected to both the aerial 43 and the telephone connection 45.

As with the cordless handset 11, the base station aerial 43 may be contained within the casing of the base station 3.

FIG. 15 is a block diagram of the circuitry of the handset 11. Speech sounds received by the microphone 27 are converted into an electrical signal which is provided to a speech encoder 63. The speech encoder 63 includes an analogue-to-digital converter which converts the analogue electrical signal from the microphone 27 into 8-bit digital signals with a sampling rate of 8 kHz. This results in a total bit rate of 64 kbit per second. The analogue-to-digital conversion is non-linear, and has the effect of performing Pulse Code Modulation (PCM) on the input.

The 8-bit data words are then compressed to 4-bit data words, thereby reducing the bit rate of the digital data to 32 kbit per second. The compression is done by Adaptive Differential Pulse Code Modulation (ADPCM). In this coding system, each 4-bit word represents the change in value between the successive samples, rather than the absolute sample values themselves. This is an effective data compression technique for signals which change relatively slowly, such as speech signals. The 32 kbit per second data stream provides the contents of the B channel, and is provided to a B channel input to a programmable multiplexer 65 as 4-bit parallel words at 8 kword per second.

The speech encoder 63 may also reverse the values of some bits in the B channel data, according to a predetermined pattern, in order to increase the probability of changes of bit value between adjacent bits of the data. This is for the benefit of the radio transmitting and receiving systems, which may work better if the data value of transmitted and received signal bits changes frequently.

The programmable multiplexer 65 also receives D channel data and S channel data at respective inputs. While the handset 11 is operating in multiplex 1, the programmable multiplexer stores the continuously received 32 kbit per second data stream from the speech encoder 63. The programmable multiplexer 65 outputs data in bursts, in accordance with the burst 35 mode operation of the radio link, at 72 kbit per second in accordance with the data rate of the radio link. Thus, once in each 2 ms burst period, the programmable multiplexer will output 64 bits of B channel data previously received from speech encoder 63 and stored, and will sandwich the B channel data between 2 or 4 bits of D channel data to form the multiplex 1.2 or multiplex 1.4 data streams.

The data stream burst from the programmable multiplexer 65 is provided to a transmitter 67, which modulates the radio carrier frequency, received from a local oscillator 69, in accordance with the received data stream. The resulting radio frequency burst is provided to the aerial 25 via a transmit/receive switch 71. The transmit/receive switch 71 connects the transmitter 67 to the aerial 25 during the transmit part of each burst period and connects the aerial 25 to a radio receiver 73 during the receive part of each burst period.

During the receive part of each burst period, the receiver 73 demodulates the received signal from the aerial 25, using a carrier frequency signal from the local oscillator 69. The demodulated 72 kbit per second data stream burst is provided by the receiver 73 to a programmable demultiplexer 75.

The programmable demultiplexer 75 allocates the received data bits between the B channel, the S channel and the D channel in accordance with the multiplex structure in which the handset 11 is currently operating. When the handset is operating in multiplex 1, the 64 B channel bits received in each data burst are stored in the programmable demultiplexer 75, and are then output to a speech decoder 77 as a continuous stream of 4-bit parallel words at 8 kword per second.

The speech decoder 77 repeats the pattern of bit reversals applied t the B channel data by the encoder in the base station 3, to obtain the correct data values, and then performs the inverse of the ADPCM algorithm used to encode the speech data, so as to obtain 8-bit Pulse Code Modulated words at a rate of 8 kword per second. The speech decoder then converts this digital data to analogue data in a PCM digital-to-analogue converter, and provides the output analogue signal to the speaker 29. The speaker 29 converts the analogue electric signal to sound to be heard by the user.

During multiplex 1 operation, the speech encoder 63 provides B channel data to the programmable multiplexer 65 at 32 kbit per second. Thus in each 2 ms burst period, the programmable multiplexer 65 receives 64 B channel bits. Since each multiplex 1 burst carries 64 B channel bits, the radio link carries the B channel at an effective average bit rate equal to the bit rate provided by the speech encoder 63. Similarly, the effective average bit rate of received B channel data matches the bit rate of the continuous data transmission from the programmable demultiplexer 75 to the speech decoder 77. Thus, there is an effective continuous bidirectional B channel communication, in spite of the time division duplex burst mode nature of the radio link.

As will be well known to those skilled in the art, the speech encoder 63 and the speech decoder 77 can conveniently be provided by a single circuitry unit known as a coder/decoder or codec.

The operation of the handset 11 is controlled by a system controller 79, and the timing of operations is controlled, in order to ensure burst synchronisation, in response to signals from an S channel controller 81. The system controller 79 is typically a microprocessor-based or microcomputer-based control system, including a processor, a program memory and a random access memory. The S channel controller 81 may be implemented as a separate microprocessor or may be implemented in software for the same processor as the system controller 79. However, in view of the simple nature of the operations carried out by the S channel controller 81, and the need for high speed in its operations, it is preferably implemented as dedicated hardware.

The system controller 79 sends control signals to the programmable multiplexer 65 and the programmable demultiplexer 75, to instruct them which multiplex structure to adopt, and also to give them timing signals so that they are properly synchronised with the radio link burst structure. The programmable multiplexer 65 and programmable demultiplexer 75 may also send signals to the system controller 79 to inform it if a buffer used to store the data signals in the multiplexer or demultiplexer is approaching overflow or is empty.

Control signals from the system controller 79 control the transmit/receive switch 71, so that it connects the transmitter 67 and the receiver 73 to the aerial 25 alternately with the correct timing.

The system controller 79 selects the radio channel on which the handset 11 is operating at any given moment, and instructs the local oscillator 69 to generate a signal for the transmitter 67 and receiver 73 at the appropriate frequency. In a system intended for use issued by the Department of Trade and Industry, the handset 11 may operate on any one of forty channels having carrier frequencies at 100 kHz spacings in the range 864.15 MHz to 868.05 MHz. The system controller 79 will inform the local oscillator 69 which channel has been selected, and the local oscillator 69 will inform the system controller 79 when its output signal has reached the selected frequency.

The system controller 79 may also send control signals to the speech encoder 63 and speech decoder 77 to mute the B channel at certain times. It is advantageous to mute the B channel during link set up and also if it becomes necessary to re-establish a link during conversation, in order to prevent the user from receiving unpleasant noises at these times.

The system controller 79 also controls the D channel. It receives incoming D channel data from the programmable D multiplexer 75 and provides outgoing D channel data for transmission to the programmable multiplexer 65. Some received D channel data is used purely to control the operation of the system controller 79, and some transmitted D channel data is generated within the system controller 79. Such data includes transmitted and received handshake signals and various identification signals which are exchanged between the handset 11 and a base station 3 during the establishment of a radio link. However, other types of transmitted D channel data will result from actions taken by the user, and other types of received D channel data must be passed on to the user. For this reason, the system controller 79 also has a control signal connection with the keypad and display unit 39.

When a user is initiating a telephone call from the handset 11 the telephone number to be dialled will be entered through the keypad 31. The key depressions will be notified by the keypad/display unit 39 to the system controller 79, which will encode them for transmission in the D channel. In this way, the base station 3 is informed of the telephone number dialled by the user, and can transmit the appropriate dialling signal to the telecommunications network 1.

If a base station 3 initiates a radio link with the handset 11, because a telephone call has been received, the user must be alerted to the presence of the incoming call. To do this, the system contoller may control a tone caller (not separately illustrated) to give an audible notification. Additionally, the system controller 79 may instruct the keypad/display unit to provide a visual indication e.g. with a light. If the user wishes to accept the call, this can be done by pressing a "line" key 33. This is notified by the keypad/display unit 39 to the system controller 79, which in turn notifies the base station 3 through the D channel.

If the handset 11 includes a display 35, information may be displayed on it in accordance with instructions from the system controller 79, both before a user has accepted a call and during a conversation. The data to be displayed will typically have been received by the system controller 79 from the base station 3 over the D channel.

The S channel controller 81 receives S channel data from the programmable demultiplexer 75, and provides S channel data for transmission to the programmable multiplexer 65. When the handset 11 is idle, and scanning radio channels to see whether a base station 3 is calling it, the system controller 79 controls the transmit/receive switch 71 to connect the aerial 25 permanently to the receiver 73. When a radio signal is received, bit synchronisation is achieved in the programmable demultiplexer 75, but the S channel controller 81 is responsible for recognising the S channel synchronisation word and enabling burst synchronisation. Until burst synchronisation is achieved all received data is treated as potentially belonging to the S channel and is passed by the programmable demultiplexer 75 to the S channel controller 81. The S channel controller 81 searches the incoming data for the S channel synchronisation word CHMF, which is used by a base station 3 when it is wishing to set up a link.

When the S channel controller 81 recognises CHMF, it notifies the system controller 79 that the base station channel marker has been received and also provides a frame clock synchronised to the timing of the received burst. The system controller 79 uses the burst timing information from the S channel controller 81 to control the timing of the operation of the programmable demultiplexer 75, so that further transmissions from the base station 3 are decoded into the correct logical channels. At this stage, the programmable demultiplexer 75 will be operating in multiplex 2. The programmable demultiplexer 75 divides the received data between the S and D channels according to the multiplex 2 data structure. Provided that the S channel data sent to the S channel controller 81 continues to include the synchronisation word CHMF, the S channel controller will continue to confirm the burst synchronisation to the system controller 79.

The system controller 79 decodes the data received on the D channel. If this leads it to reply to the received transmission, it will instruct the programmable multiplexer 65 to begin operations in multiplex 2, with the appropriate burst timing, and will control the transmit/receive switch 71 to alternate between connecting the aerial 25 to the receiver 73 and the transmitter 67. At the same time, the system controller 79 will instruct the S channel controller 81 to provide the SYNCP synchronisation word to the programmable multiplexer 65 as S channel input.

If the user of the handset 11 wishes to initiate a call, and therefore presses one of the keys 33 on the keypad 31, the keypad/display unit 39 will notify this to the system controller 79. The system controller 79 searches through the RF channels, by changing the frequency of the local oscillator 69, until an empty channel is found. An empty channel is defined as one on which the received radio frequency energy is below a threshold value. If the received radio frequency energy is above the threshold value on all channels, the channel on which the least radio frequency energy is received is defined as an empty channel.

The system controller 79 then instructs the programmable multiplexer 65 to operate in multiplex 3, and instructs the S channel controller 81 to provide the portable part channel marker CHMP to the programmable multiplexer 65 as the S channel synchronisation word. The transmit/receive switch 71 is controlled to connect the aerial 25 to the transmitter 67 and the receiver 63 in the pattern required for multiplex 3 operation, and the system controller 79 ensures that the switching of the transmit/receive switch 71 is synchronised with the multiplex 3 operation of the programmable multiplexer 65.

During receive periods, the programmable demultiplexer 75 passes any received data to the S channel controller 81. The received data should include SYNCF. When this synchronisation word is identified, the S channel controller 81 provides the system controller 79 with the burst timing of the received signals. The system controller 79 then instructs the programmable demultiplexer 75 to decode received data as multiplex 2, in accordance with the received burst timing. Once the received channel data has been decoded by the system controller 79, it will instruct the programmable multiplexer 65 to switch to multiplex 2 with timing synchronised with the burst timing information from the S channel controller 81. It will also change the timing of the control signals to the transmit/receive switch 71 appropriately, and will instruct the S channel controller 81 to provide SYNCP to the programmable multiplexer 65 in place of CHMP.

A modified handset 11 may be used to communicate digital data e.g. to and from a portable personal computer or computer terminal, rather than communicate speech. In this case, the microphone 27, speaker 29 and keypad/display unit 39 are replaced by an interface to the computer or terminal, and modification of the speech encoder 63 and speech decoder 77 may be required. In particular, the computer or terminal will normally provide and receive digital data, so that the analogue-to-digital converter of the speech encoder 63 and the digital-to-analogue converter of the speech decoder 77 will not be required. Additionally, computer data is not normally suitable for data compression using Adaptive Diffential Pulse Code Modulation. Therefore, the data coding and decoding operations of the speech encoder 63 and speech decoder 77 may need to be modified. Alternatively, if the computer or terminal can be set to operate at the data rate of 32 kbit per second, the encoder and decoder can be omitted entirely.

FIG. 16 shows a schematic block diagram of a base station 3. This is a simple base station, not including a wired handset 49, a display 51 and a key pad 53.

As can be seen, the general construction of the base station control circuit 55 is similar to that of the handset control circuit 37. The programmable multiplexer 85, the transmitter 87, the local oscillator 89, the transmit/receive switch 91, the receiver 93 and the programmable demultiplexer 95 are substantially identical with the corresponding parts in the transmitter 11. The S channel controller 101 of the base station 3 is also similar to the S channel controller 81 of the transmitter 11, except that the base station S channel controller 101 is designed to recognise CHMP and SYNCP in the incoming S channel data, and to provide CHMF and SYNCF to the programmable multiplexer for transmission, instead of the other way round.

The operation of the system controller 99 is generally similar to the operation of the system controller 79 of the transmitter 11, but there are some differences. First, when the base station 3 is trying to set up a radio link with a handset 11, it transmits in multiplex 2 rather than multiplex 3, and so the instructions to the programmable multiplexer 85 and the timing signals to the transmit/receive switch 91 in these circumstances is different.

Similarly, when the base station 3 is scanning the radio channels to detect whether a handset 11 is calling it, it expects the handset 11 to be calling using multiplex 3. Accordingly, once the S channel controller 101 has notified the system controller 99 that the handset channel marker CHMP has been received, the system controller 99 will instruct the programmable demultiplexer 95 to treat incoming signals as having the data structure of multiplex 3. Once the base station 3 has sent a reply to a received multiplex 3 signal, it expects the handset 11 to change to multiplex 2, and therefore it will instruct the programmable demultiplexer 95 accordingly at this time.

Since the burst timing of the handset 11 is slaved to the timing of the base station 3, except during multiplex 3 transmissions, the timing information received by the system controller 99 from the S channel controller 101 is not used to control the timing of the operations of the programmable multiplexer 85. The timing of the programmable multiplexer 85 and the transmit/receive switch 91 is determined by an internal clock of the system controller 99. However the programmable demultiplexer 95 is controlled in accordance with the received burst timing, both to enable correct decoding of multiplex 3 transmissions from a handset 11 and to compensate for the effect of RF transmission delays on transmissions from the handset 11. The system controller 99 may also use synchronisation timing information from the S channel controller 101 as one way of determining that a communication link with a handset 11 has broken down through loss of burst synchronisation.

A second area in which the operations of the system controller 99 in the base station 3 are different from the operation of the system controller 79 in the hand set 11 is in its processing of D channel data. The signalling data received by the base station 3 from the telecommunications network 1 will be different from the signalling data input to the handset 11 by a user, and there will be corresponding differences in the D channel data received by each part over the radio link. Accordingly, the programming of the system controller 99 in the details of its handling of D channel data will be different.

Also, the actions taken by the base station 3 during link initiation are different from the actions of the handset 11, as will be described in detail later, and so the respective system controllers 99, 79 will be programmed differently in this respect.

The base station control circuit 55 includes a line interface 103, to which the telephone connection 45 is connected. The line interface 103 replaces the microphone 27, the loud speaker 29 and the keyboard/display unit 39 in the arrangement of the control circuit. Signalling data output by the system controller 99, typically in response to received D channel data, is conditioned by the line interface 103 and placed on the telephone connection 45. Signals received from the telecommuniciations network 1 over the telephone connection 45 are similarly interpreted by the line interface 103 and provided to the system controller 99 as required. The line interface 103 also receives the decoded B channel data stream from the decoder 97 and places this on the telephone connection 45, and receives the speech or other communication signals from the telephone connection 45 and provides these to the encoder 83.

The manner of operation of the line interface 103 will be chosen in accordance with the nature of the telecommunications network 1 to which the base station 3 is connected. In particular, if the base station 3 is connected to a conventional PSTN, the line interface 103 will send and receive analogue signals over the telephone connection 45, whereas if the base station 3 is connected to an ISDN, the line interface 103 will normally be required to send and receive 64 kbit per second pulse mode modulated signals.

In order to allow the base station 3 to communicate with various different types of handset 11, the encoder 83 and decoder 97 are enabled to carry out various encoding and decoding operations. They may be able to use a plurality of different adaptive differential pulse code modulation algorithms. They may also be able to use a digital data processing algorithm or to pass signals through unaltered to enable the base station 3 to be usable with portable computer and computer terminal type handsets 11 as mentioned above. During the link set up procedure, while the base station 3 and the handset 11 are communicating in multiplex 2, the handset 11 can indicate through the D channel the type of coding and decoding it requires, and the system controller 99 of the base station 3 will then control the encoder 83 and decoder 97 to operate accordingly once multiplex 1 transmissions have begun.

Figure 17:
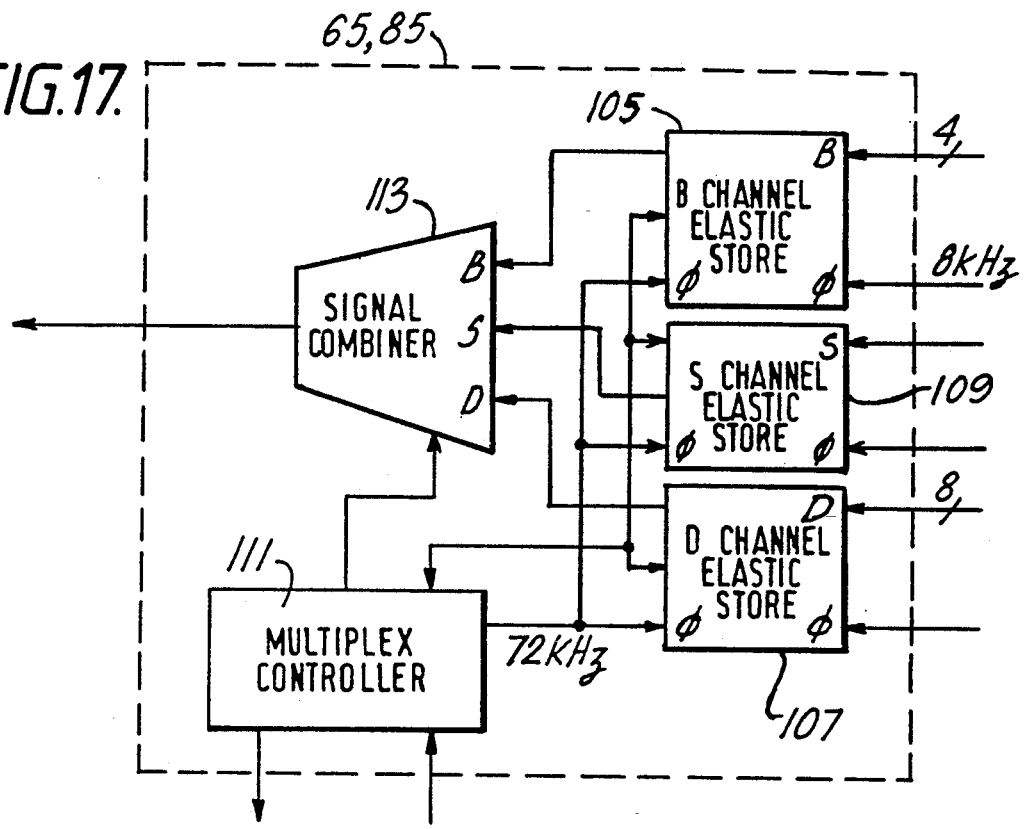
FIG. 17 is a schematic block diagram of the programmable multiplexer of FIGS. 15 and 16.

FIG. 17 illustrates in block form the programmable multiplexers 65, 85. B channel data is output by the encoder 63, 83 as 4 bit parallel words at a rate of 8 kword per second. The 4 bits of each word are received in parallel, and they are stored in a B channel elastic store 105 in the programmable multiplexer under the control of an 8 kHz read clock which is synchronised with the operations of the encoder 63, 83.

The D channel data is provided in 8 bit parallel words by the system controller 99. This data may be provided intermittently, and the average rate of D channel data will vary depending on the multiplex data structure being used. The D channel data is received by a D channel elastic store 107, and is clocked into the elastic store by a clock signal provided by the system controller 99.

In a similar manner, the S channel data is provided to an S channel elastic store 109, and is clocked into it by a clock signal synchronised with the operation of the S channel controller 81, 101. It would be possible to eliminate the S channel elastic store 109, and provide the S channel data from the S channel controller 81, 101 to the programmable multiplexer 65, 85 with the correct timing for it to be slotted into the data burst. However, this would require the operations of the S channel controller to be precisely synchronised with the operations of the programmable multiplexer, and the data structure of the burst would be disrupted if there was any variation in bit or burst synchronisation between them. The use of the S channel elastic store 109 enables the programmable multiplexer to ensure that the S channel data is placed in the data burst with the correct timing, regardless of any slight differences in timing of the S channel controller. Additionally, since the contents of the S channel will typically be the same from one data burst to the next, the S channel data can be stored in the S channel elastic store 109 and read out repeatedly, and the S channel controller only needs to provide new S channel data to the programmable multiplexer if the S channel synchronisation word is being changed. The S channel preamble may be stored permanently in the S channel elastic store 109.

The multiplexing operation of the programmable multiplexer is controlled by a multiplex controller 111. This receives signals from the system controller 79, 99, informing it which multiplex structure is being used, and also giving it the correct burst timing. The multiplex controller 111 may also receive a clock signal from the system controller, or alternatively it may have an internal clock generator, which is synchronised to the burst timing signal from the system controller.

Signals are read out from the B channel elastic store 105, the D channel elastic store 107 and the S channel elastic store 109 under the control of the multiplex contoller 111, and the multiplexing of the signals takes place in a signal combiner 113. The signal combiner 113 receives input from each of the elastic stores 105, 107, 109, and it selects the signal received at one of these inputs to be passed on to the output under the control of an input select signal provided to the signal combiner 113 by the multiplex controller 111. Simultaneously, the multiplex controller 111 provides control signals to the elastic stores 105, 107, 109, so that each elastic store reads out one or more bits of its contents as a serial bit stream, when its input to the signal combiner 113 is connected to the output. The multiplex controller 111 provides a 72 kHz clock to each of the elastic stores 105, 107, 109, so that the signals are read out from these stores at the correct bit rate for the data burst being assembled by the programmable multiplexer.

The B channel elastic store 105 and the D channel elastic store 107 provide control signals to the multiplex controller 111, indicating the amount of data currently stored in the stores. The multiplex controller 111 notifies the system controller 79, 99, if either of these stores is about to overflow or alternatively if either of these stores contains no data when the multiplex structure being transmitted requires data to be sent in the relevant channel.

Figure 18:
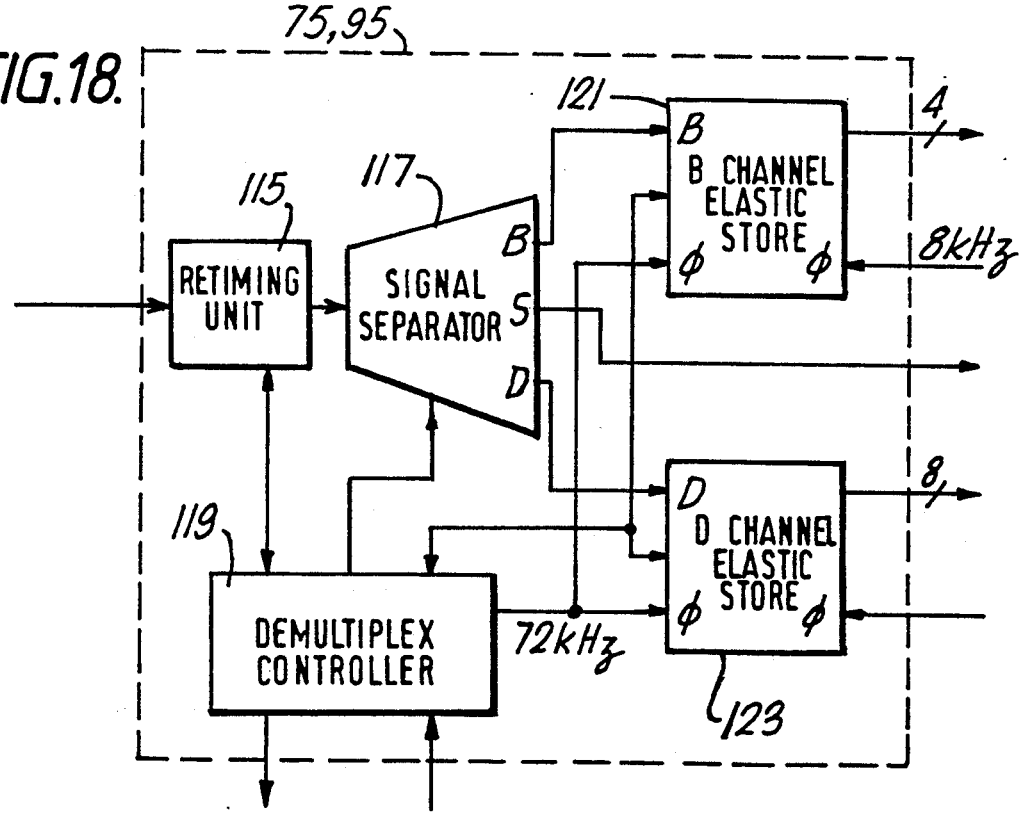
FIG. 18 is a schematic block diagram of the programmable demultiplexer of FIGS. 15 and 16.

FIG. 18 is a block diagram of the programmable demultiplexers 75, 95. The incoming demodulated signal from the receiver 73, 93, is provided first to a re-timing unit 115. This continuously monitors changes in the level of the signal provided by the receiver, in order to maintain bit synchronisation of the demultiplexer with the received signal. The incoming data signal is then passed to a signal separator 117, while data on the received signal bit timing is provided to a demultiplex controller 119. The demultiplex controller provides a data distribution signal to the signal separator 117, which controls the manner in which the signal separator 117 distributes the data received at its input between three outputs, one for each of the B channel, the S channel and the D channel.

The demultiplex controller 119 receives control signals from the system controller 79, 99, informing it which multiplex structure the incoming data should be treated as having. If the handset 11 or base station 3 is scanning the radio channels looking for a signal indicating that another part wishes to set up a link with it, the demultiplex controller 119 will direct the signal separator 117 to pass all data received by the programmable demultiplexer to the S channel. The S channel data is provided directly to the S channel controller 81, 101. No elastic store is used for the S channel in the progammable demultiplexer, as delays to the S channel data in such an elastic store could prevent the S channel controller from detecting the burst synchronisation of the received signal correctly.

Once the burst synchronisation of the incoming signal has been detected, the system controller 81, 101 will instruct the demultiplex controller 119 to treat incoming data as having a specified multiplex structure, and it will also provide the demultiplex controller 119 with burst synchronisation timing. In accordance with the instructions from the system controller, the demultiplex controller 119 will control the signal separator 117 to distribute the incoming data between the three channels.

The B channel data is provided to a B channel elastic store 121 and the D channel data is provided to a D channel elastic store 123. In all cases, the received data will be in the form of a serial bit stream at 72 kbit per second. The data is clocked into the elastic stores 121, 123 in accordance with a 2 kHz clock signal provided to the stores by the demultiplex controller 119. The received signal bit timing information provided by the re-timing unit 115 to the demultiplex controller 119 is used by the demultiplex controller 119 to ensure that the 72 kHz clock is correctly synchronised with the data received by the elastic stores 121, 123.

The demultiplex controller 119 controls the operation of the elastic stores 121, 123 so that they only store data while data for that store is being provided by the signal separator 117. The stores provide the demultiplex controller 119 with information on how much data they contain, and the demultiplex controller 19 warns the system controller 79, 99 if either store is empty or is about to overflow.

B channel data is read out of the B channel elastic store 121 as 4 bit parallel words, which are passed to the decoder 77, 97. The 4 bit words are read out at 8 kword per second in accordance with an 8 kHz clock provided to the B channel elastic store 121 and synchronised with the operations of the decoder.

The D channel information is read out of the D channel elastic store 123 as required by the system controller 79, 99, as 8 bit wide parallel words. This operation is performed in accordance with a read clock signal provided to the D channel elastic store 123 by the system controller.

Figure 19:
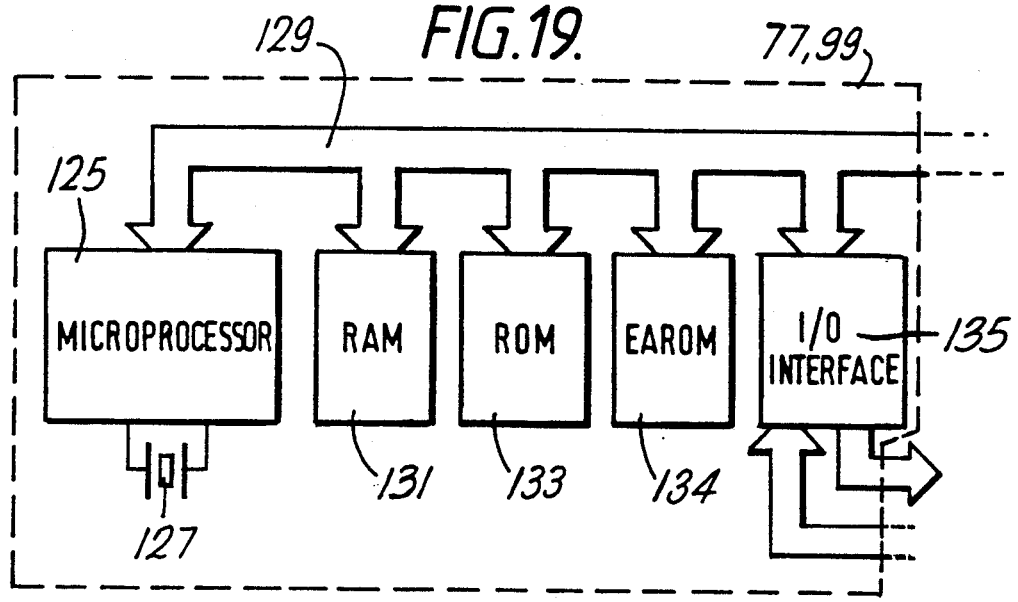
FIG. 19 is a schematic block diagram of the system controller of FIGS. 15 and 16.

FIG. 19 is a schematic diagram of the system controller 79, 99. The system controller comprises a microprocessor 125, having a clock device 127 connected to it in the conventional manner. A bus 129 for address, data and control signals connects the microprocessor 125 to a random access memory 131 and a read only memory 133. The random access memory 131 provides working memory for the microprocessor 125, and the read only memory 133 contains the program for the microprocessor 125.

It will normally be necessary for handsets 11, at least, to perform a registration operation before use, in order to acquire a code word which permits access to a base station 3 or a group of base stations 3, or to one of a plurality of facilities offered by a base station 3. In order to permit such a code word to be stored safely, and retained even if power is removed from the device (e.g. when changing the batteries in a handset 11), it is preferred that an electrically alterable read only memory (EAROM) 134 is provided in which such a code word may be stored. In an alternative, either the random access memory 131 or the read only memory 133 is an EAROM, and no separate EAROM 134 is provided, but this will normally be a more expensive implementation.

Other parts of the device are connected to the system controller as shown in FIGS. 15 and 16. As will be well known to those skilled in the microprocessor art, these other devices can either be connected as peripheral devices, or as memory mapped devices. Memory mapped devices are connected directly to the bus 129. Peripheral devices are connected to an input/output interface 135, which is in turn connected to the bus 129.

While the handset 11 or the base station 3 is active but not connected in a radio link, it will be scanning the radio channels to determine whether another device is seeking to initiate a radio link. At the same time, the system controller 79, 99 must respond if a user presses a button requesting that a radio link is set up, in the case of a handset 11, or a telephone ringing signal is received from the telecommunications network 1, in the case of a base station 3. This may be done by programming the system controller so that it polls the keypad/display unit 39, in the case of a handset 11, or the line interface 103 in the case of a base station 3, to determine whether a signal has been received which the system controller must respond to. Alternatively, the keypad/display unit 39 and the link interface 103 may be connected through control lines of the bus 129 to interrupt inputs to the microprocessor 125, so that the channel scanning operation of the system controller 79, 99 is interrupted if a signal is received requiring the device to initiate a link itself. These alternatives in the construction and programming of microprocessor controlled devices will be well understood by those skilled in the art.

Figure 20:
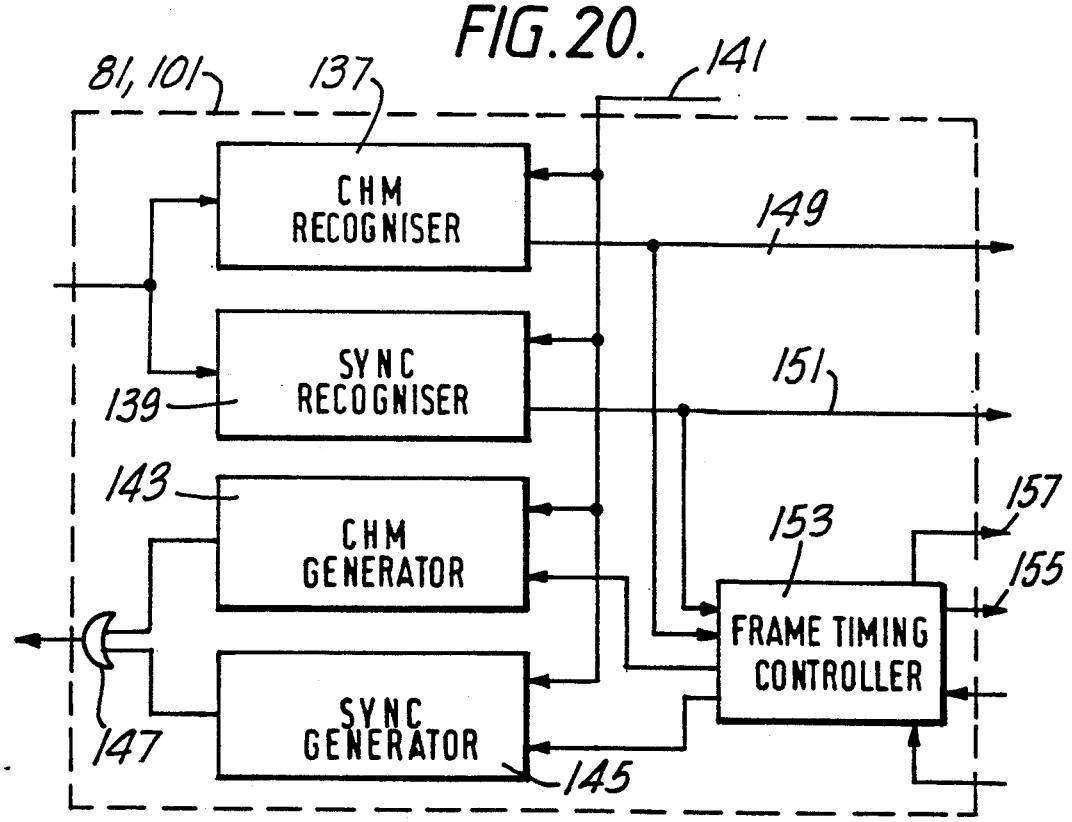
FIG. 20 is a schematic block diagram of the S channel controller of FIGS. 15 and 16.

FIG. 20 is a schematic block diagram of the S channel controller 81, 101. The S channel controller has a CHM synchronisation word recogniser 137 and a SYNC synchronisation recogniser 139. These continuously compare the 24 most recently received bits of data provided to the S channel controller from the programmable demultiplexer 75, 95 with stored representations of the synchronisation words, and provide respective "CHM recognised" and "SYNC recognised" signals whenever a match between the S channel input and the stored synchronisation words is obtained. The recognisers 137, 139 may each be implemented by a 24 bit serial input shift register, having parallel outputs to first inputs of respective bit recognisers, the second inputs of which are connected to hard-wired representations of the bits of the synchronisation word.

For each synchronisation word, the version for the handset 11 is the bit inverse of the version for the base station 3, and the synchronisation word recognisers 137, 139 can be switched between recognising the handset words and recognising the base station words by inverting one of the two inputs to each bit comparator, or by inverting the input to the shift register. Thus, the recognisers are built so that they can recognise either the handset words or the base station words, and in use which word is recognised is determined by a signal on line 141, which indicates whether the S channel controller has been mounted in a handset 11 or a base station 3.

The S channel controller 81, 101 also includes a CHM synchronisation word generator 143 and a SYNC synchronisation word generator 145. These may each be constructed by providing a parallel input, serial output 24 bit shift register, with the parallel inputs hardwired to provide the appropriate synchronisation word. Each synchronisation word generator 143, 145 is designed to be able to generate either the handset words or the base station words, by inverting the inputs or the output of the shift register, and the signal on line 141 determines which words will be generated in operation of the generators.

As has previously been explained, the S channel controller 81, 101 of a handset 11 will recognise the base station words and generate the handset words, while the S channel controller 81, 101 of a base station 3 will recognise the handset words and generate the base station words. The outputs of the synchronisation word generators 143, 145 are combined by an OR gate 147, and are provided as the S channel input to the programmable multiplexer 65, 85.

The "CHM recognised" signal and the "SYNC recognised" signal are provided, when the respective synchronisation word is recognised, directly to the system controller 79, 99 on respective lines 149, 151, and are also provided to a frame timing controller 153. The frame timing controller 153 also receives from the system controller information about which multiplex structure the received data is assumed to have, and also information about the state of the radio link. By combining the timing of the "CHM recognised" or "SYNC recognised" signal with the information about the multiplex structure, the frame timing controller 153 can generate a frame clock signal which provides burst timing information to the system controller 79, 99. Additionally, when the link state information indicates that the programmable demultiplexer 75, 95 has been instructed to demultiplex incoming data in accordance with the multiplex 2 or multiplex 3 data structure at an assumed burst timing, the frame timing controller also provides a frame lock signal 157 to the system controller 79, 99, indicating whether the timing of the received synchronisation word is in accordance with the assumed burst timing. The frame clock signal 155 and the frame lock signal 157 are used by the system controller 79, 99 for such things as controlling the burst timing of the programmable multiplexer 65, 85 and the programmable demultiplexer 75, 95, as has already been explained.

The frame timing controller 153 also provides control signals to the CHM generator 143 and the the SYNC generator 145, when either of these is required to output the respective S channel synchronisation word to the programmable multiplexer.

Link Initiation Procedure

Figure 21:
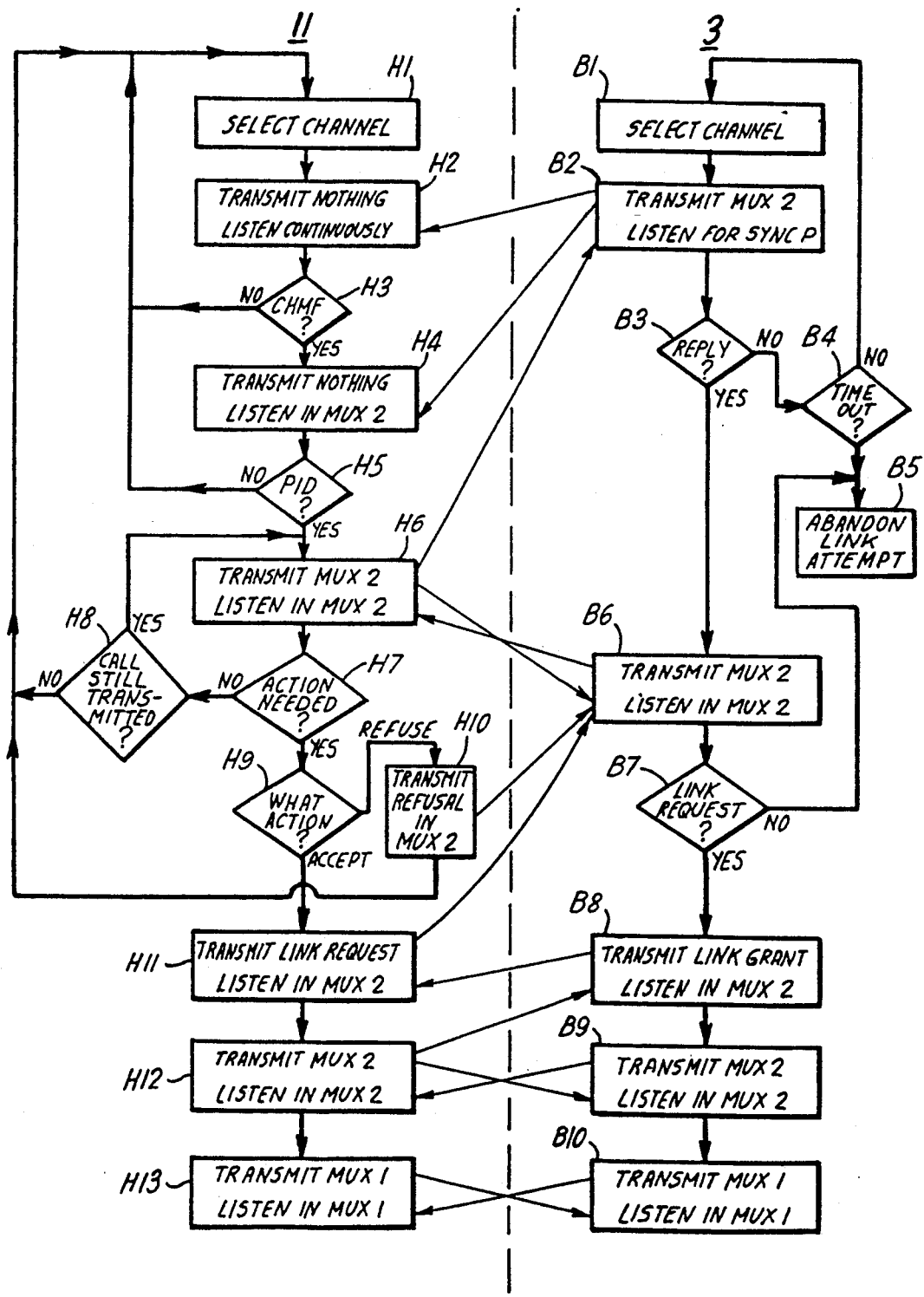
FIG. 21 is a flow diagram for the setting up of a link from a base station to a handset.
Figure 22:
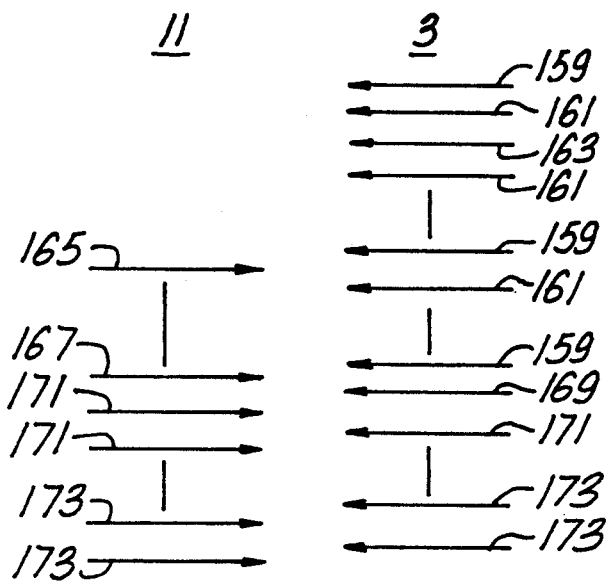
FIG. 22 is a schematic representation of the sequence of signals transmitted when a link is set up from a base station to a handset.
Figure 24:
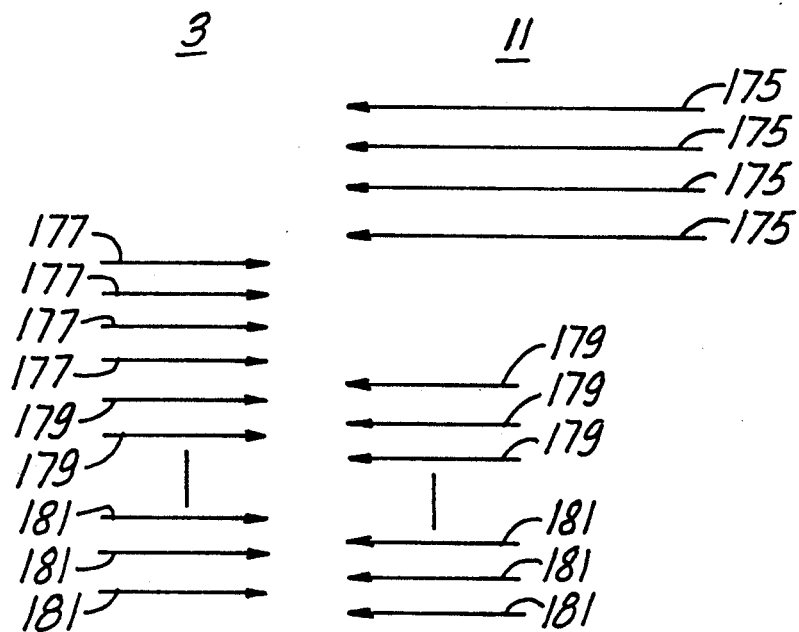
FIG. 24 is a schematic representation of the sequence of signals transmitted when a link is set up from a handset to a base station.
Figure 23:
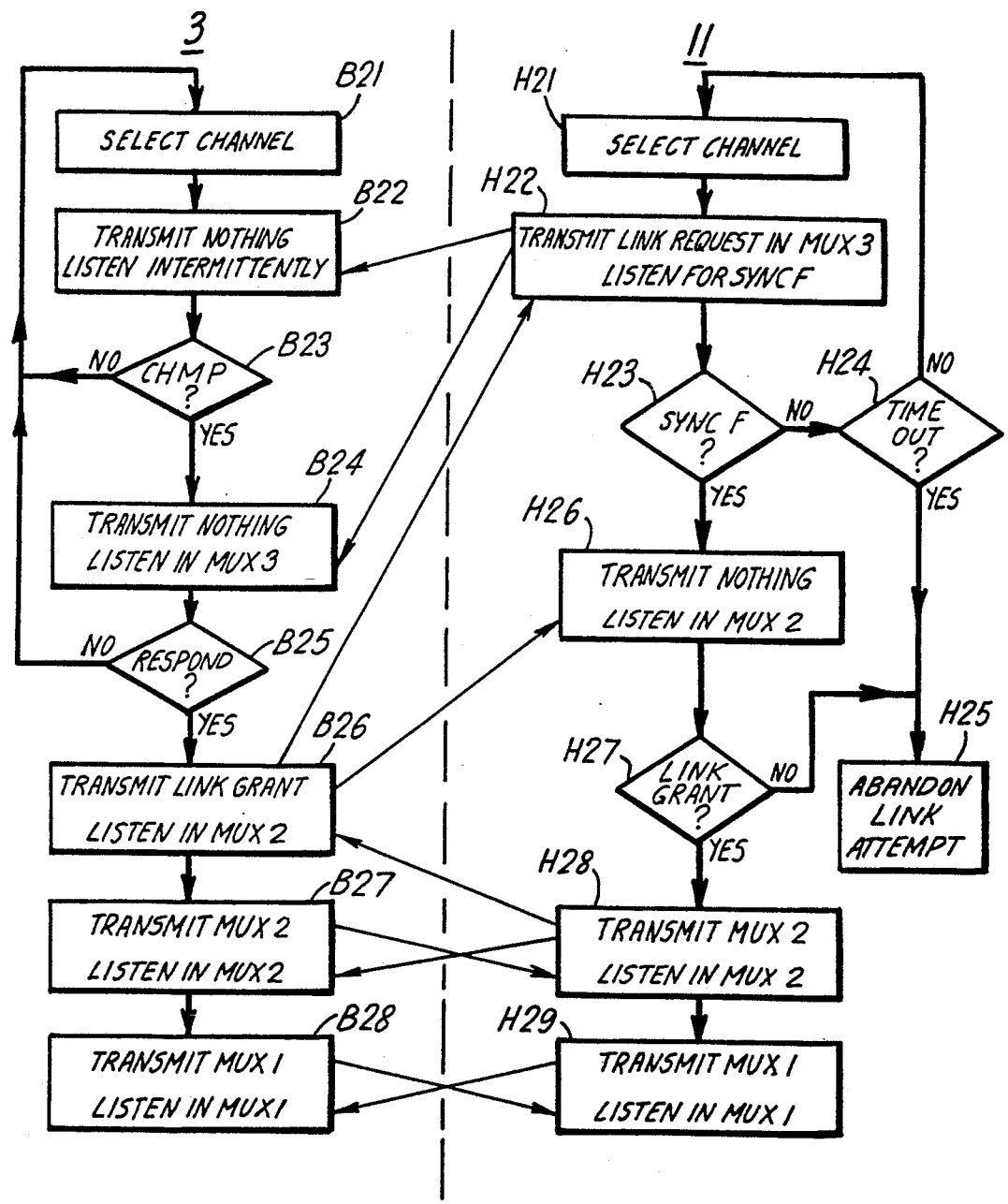
FIG. 23 is a flow diagram for the setting up of a link from a handset to a base station.

FIG. 21 shows in flow diagram form the actions taken by the handset 11 and the base station 3 when the base station 3 initiates a link with the handset 11. FIG. 22 shows the pattern of data burst transmissions during this process. FIGS. 23 and 24 are corresponding flow diagrams and data burst sequence diagrams for the case when a handset 11 initiates a link with a base station 3.

In each of FIGS. 21 and 23, two flow diagrams are shown:- one for the actions taken by the base station 3 and one for the actions taken by the handset 11. The flow of actions from step to step is shown in thick lines, and the passage of radio signals between the devices in various steps is shown in thin lines.

While the handset is turned on, but is not participating in a link, it performs a channel-scanning loop. In step H1 it selects the next channel to scan. In step H2 it transmits nothing on the selected channel, but connects its aerial 25 continuously to the receiver 23. The programmable demultiplexer 75 passes any input data to the S channel controller 81. If the S channel controller 81 fails to detect the fixed part channel marker S channel synchronisation word CHMF within a predetermined period, the handset 11 abandons the channel in step H3, and returns to step H1 to select the next channel. If all channels are scanned in turn without CHMF being detected, the handset 11 may cease operations for a period to conserve battery power, before scanning the channels again.

While a base station 3 is also not participating in a link, it will be performing a similar scanning operation, as is shown in FIG. 23. This scanning operation will be interrupted if the base station 3 receives a signal such as a telephone ringing signal on the telephone connection 45, indicating that it is required to set up a link with a handset 11. In this case, the base station will scan the available radio channels in step B1 to find an empty channel.

The base station 3 will then begin to transmit signals using multiplex 2, in step B2. Between multiplex 2 transmission bursts, the base station 3 will connect its aerial 43 to its receiver 93, to detect replies from handsets 11 using the multiplex 2 data structure with the SYNCP S channel synchronisation word.

In its multiplex 2 transmission in step B2, the base station 3 will transmit D channel data in a predetermined D channel code word format. A D channel code word will take several multiplex 2 data bursts to be transmitted. The structure of data transmissions on the D channel will be described later.

The D channel code word transmitted by the base station 3 includes a PID field in which a "portable part identification" code is placed by the base station 3 identifying the specific handset 11 it wishes to contact. The D channel code word also contains a LID field, in which the base station 3 places a "link identification" code. Various different link identification codes may be used under different circumstances. When the base station 3 is attempting to set up a link, the code placed in the LID field will be a base identification code (BID), identifying the base station 3.

Although the base station 3 will only set up a link with one handset 11 at a time, it may send out a call in step B2 to a plurality of handsets, and then establish the link with any one of them. In the multiplex 2 transmissions by the base station 3 in step B2, the D channel information which the base station 3 wishes to transmit is repeated continuously. If the base station 3 wishes to direct its signals to more than one handset 11, then it will change the PID code in successive transmissions of the D channel data so as to call each of the handsets in turn.

When the channel selected by the handset 11 in step H1 is the same channel as was selected by the base station 3 in step B1, the handset 11 will detect in step H2 the multiplex 2 transmissions by the base station 3 in step B2. Therefore, the handset 11 will find a CHMF code, and will move to H4. In this step, the handset 11 uses the received CHMF code to achieve burst synchronisation with the base station 3, and the system controller 79 instructs the programmable demultiplexer 75 to treat received data as being in multiplex 2. Accordingly, the multiplex 2 transmissions from the base station 3 are decoded and the D channel data is passed to the system controller 79.

The system controller 79 assembles the D channel code words being transmitted by the base station 3, and examines the PID and LID fields. If the system controller 79 does not detect its own PID code within a time-out period, then in step H5 the handset 11 will conclude that the received call from the base station 3 is not intended for it, and it will return to step H1. The system controller 79 may also determine when the sequence of PID codes, transmitted by the base station 3, is repeated. When this happens, the system controller 79 should have decoded every PID code being transmitted, and so if its own PID code has not been detected by this time, the handset 11 may return to step H1 from step H5 even if the time-out period has not expired.

If, in step H5, the handset 11 decides to respond to the call from the base station 3, because it has recognised its own PID code, it moves to step H6. In this step, it begins to transmit in multiplex 2 as well as listen for multiplex 2 transmissions from the base station 3. The handset 11 will place the SYNCP synchronisation word in the S channel, since it is responding to the base station 3 rather than initiating its own call. It will use the D channel to transmit a reply code word, in which it will place its own identification code in the PID field, and will place in the LID field the same code as was received in that field in the transmissions from the base station 3.

To avoid interference between two or more handsets 11 transmitting on the same channel simultaneously, in response to a series of call signals from the base station 3 identifying several handsets 11, the handset 11 will transmit its reply immediately after it has received a D channel message containing its own PID code, and not after receiving a D channel message containing another PID code.

If the base station 3 detects a reply to its transmissions in step B2, it will check that the received S channel synchronisation word is SYNCP, and decode the received D channel information to check that it recognises the returned PID code, and that the returned LID code is the same as it sent out. If the base station 3 does not receive a satisfactory reply within a predetermined period, it abandons its attempt to establish a radio link on that channel in step B3. The base station then passes to step B4, where it determines whether it has been trying to establish this radio link for more than a time-out period. If the time-out period has not expired, it will return to step B1, select another free channel, and make a fresh attempt to establish a radio link. If the time-out period in step B4 has expired, the base station 3 moves to step B5, and ceases all attempts to establish a link.

If the base station determines in step B3 that a satisfactory reply has been received, it proceeds to step B6. It continues to transmit its call to the handset or handsets, using multiplex 2. If satisfactory replies are received from all the hand sets which are being called, the base station 3 replaces CHMF in the S channel with SYNCF, to avoid alerting any further handsets 11 unnecessarily.

Once a handset 11 has identified that a base station 3 is transmitting a call to it, it can take action either to accept the call or to decline it. It may decline it either in response to some action by the user or it may have been pre-set to decline calls, for example through a function similar to the known "do not disturb" function on a conventional telephone. A call will not be accepted until the user presses one of the link control keys 33 on the handset keypad 31. Accordingly, in step H7 the handset 11 determines whether any action is required. If no action is needed, it passes to step H8 at which it determines whether the base station 3 is still transmitting the call. The base station 3 may cease to transmit the call either by entering a link with another of the handsets 11, and changing the transmitted multiplex 2 message accordingly, or by ceasing to transmit on the channel because no handset 11 has accepted the call within a pre-set period. If the call is no longer being transmitted, the handset 11 returns to step H1 and once again scans the channels for a fresh call to it.

If it is determined in step H7 that action is required, the handset passes to step H9 to determine what the required action is. If the required action is to refuse the call, it passes to step H10.

In step H10 the handset 11 continues to transmit in multiplex 2, but changes the code in the LID field to a special "link decline" code. It continues to transmit its own identity code in the PID field of the D channel. If the base station 3 receives a "link decline" message in step B6, it may remove the associated PID code from the list of PID codes which are being called in rotation by the base station 3. The handset 11 remains in step H10, and transmits the "link decline" code in response to detecting its PID, until a time-out period of e.g. 1 second has passed without its own PID being received. This confirms to the handset 11 that the base station 3 has received the "link decline" message and has stopped transmitting this PID code. The handset 11 then returns to step H1, and resumes scanning channels for further messages indicating that a base station 3 is attempting to set up a link. Because the base station 3 with which it was previously in communication is no longer transmitting the PID code of this particular handset 11, the hand set will not respond again to the base station 3 even when it scans the channel being used by the base station, as it will determine in step H5 that its PID is not being transmitted.

If the handset determines in step H9 that the required action is to accept the call, it passes to step H11. In this step, it continues to transmit in multiplex 2, sending the same PID and LID codes in the D channel as in step H6. However, instead of transmitting its normal handshake code, it transmits a special handshake code indicating "link request". It continues to decode the multiplex 2 transmissions from the base station 3, in order to receive the reply from the base station 3 to the link request.

In step B7, the base station 3 determines whether it has received a link request message from any of the handsets 11 it has been calling. If no link request is received within a pre-set period, the base station 3 passes to step B5, and abandons the attempt to set up a link. If a link request is received, the base station 3 moves to step B8.

Since the base station 3 is now entering a link, it will change the S channel synchronisation word in its multiplex 2 transmissions from CHMF to SYNCF, if this has not already been done in step B6. It will transmit a reply to the handset 11 in which it replaces its normal handshake code in the D channel with a "link grant" code. In the PID field of the D channel code word, the base station 3 will transmit the identification code for the handset 11 to which it is granting the link.

In the LID field, it will transmit a different link identity code from the code transmitted in steps B2 and B6. The new LID code is an arbitrarily chosen code which identifies this specific link between the base station 3 and the handset 11. If it ever becomes necessary to re-establish the link, as described below, the handset 11 will transmit link re-establishment messages using the new LID code. This enables the handset transmissions under these circumstances to be identified as an attempt at link re-establishment, and distinguished from a call from the handset to set up a new link. If the original base identification code was used as the LID code throughout an established link, this would increase the possibility that a link re-establishment message from a handset 11 would be misinterpreted by a base station 3 as a call to set up a new link.

When the handset 11 in step H11 receives the link grant message from the base station 3, it passes to step H12. It will stop transmitting the link request, and will change the code transmitted in the LID field of the D channel to the new code sent by the base station 3.

Once the base station 3, in step B8, has received a transmission from the handset 3 returning the new LID code, it knows the handset 3 returning the new LID code, it knows that the link grant message has been received. Accordingly, the base station 3 moves to step B9. Once the handset 11 has reached step H12 and the base station 3 has reached B9, the link between them is established, and they communicate with each other in multiplex 2. Subsequently, the base station 3 will instruct multiplex 1 communication to begin. In response, the handset 11 moves to step H13. Once the base station 3 receives multiplex 1 transmissions from the handset 11, it moves to step B10. B channel transmission may now begin.

The multiplex 2 transmissions between the handset 11 and the base station 3 include codes indicating whether each side can support multiplex 1.4, and following this exchange the two parts agree on whether to use multiplex 1.2 or multiplex 1.4 before moving to steps H13 and B10.

FIG. 22 shows schematically the exchange of signals between the handset 11 and the base station 3 when the base station 3 sends out a call which is accepted by the handset 11.

First, the base station 3 uses multiplex 2 to transmit a D channel message 159, sending a call to a first handset 11. Next, the base station 3 sends out a D channel message using multiplex 2 providing further D channel information, which any receiving handset may use. This may include data to be displayed on the display 35 of the handset to provide the user with information about the call, or may include a D channel instruction to the handsets to provide a call signal to the user corresponding to the normal ringing of the telephone. Next, the base station 3 sends out a D channel code word 163 using multiplex 2, calling a second handset. It then repeats the D channel message 161. The base station continues to alternate between calling handsets and sending the general D channel message 161, calling each handset of a group of handsets in turn.

At some point the first handset 11 receives these messages from the base station 3. Following the next transmission of the D channel word 159 calling the first handset, it replies by sending a D channel word 165.

The base station 3 continues to send out the D channel words 159, 163, calling all the handsets in turn, interleaved with the D channel message 161, and the first handset continues to send its reply message 165 in response to receiving each call message 159 directed to it, until the handset user indicates that the call should be accepted. Following the next transmission of the D channel word 159 calling the first handset, the handset 11 sends a link request message 167. The base station 3 replies with a link grant message 169, and the link is established.

The base station 3 and the handset 11 then exchange D channel words 171 using multiplex 2, until the base station 3 instructs the change to multiplex 1. They then exchange multiplex 1 transmissions 173, carrying the B channel and the telephone conversation begins.

FIG. 23 is a flow diagram corresponding to FIG. 21, but showing the actions taken by a handset 11 and a base station 3 when a link is set up in response to a call made by the handset 11.

If a base station 3 is active but not participating in a link, it will scan the channels to discover whether any handset 11 is attempting to call it. In step B21, it will select a channel, and then in step B22 it will listen for any transmissions on the selected channel. In step B22 the base station 23 will transmit nothing. However as described with reference to FIGS. 6 to 9, it might not listen on the selected channel continuously but might listen only during every other 1 ms period, synchronised to the burst timing of an associated base station 3.

During the listen periods in step B22, the programmable demultiplexer 95 will pass all received data to the S channel controller 101, in order to detect any CHMP channel marker synchronisation word transmitted by a handset 11. The base station 3 will only respond to the CHMP synchronisation word, and not the SYNCP synchronisation word, since reception of the SYNCP synchronisation word indicates transmission from a handset 11 which has already made contact with some other base station 3.

If the base station 3 determines in step B23 that the channel marker code word CHMP has not been received within a predetermined period, it returns to step B21, selects the next channel, and begins to listen on that channel. Once the base station 3 has scanned all the channels, it may turn off for a while to save power, but this is less important for the base station 3 than for the handset 11, as the base station 3 will normally be connected to mains electric power.

If the handset 11 is turned on but is not participating in any link, it will be performing a similar channel-scanning loop, as already described with reference to FIG. 21. However, this operation is interrupted if the user presses a key 33, indicating that a link to a base station should be established. In this case, the handset scans the channels in step H21, to select an empty channel.

In step H22, the handset 11 will begin transmitting on the channel it has selected using multiplex 3. In between the multiplex 3 transmissions, its programmable demultiplexer 75 will pass any received data to the S channel controller 81, in order to recognise the SYNCF synchronisation word which should be contained in any reply from a base station 3.

In the D channel of its multiplex 3 transmissions, the handset 11 will send a D channel code word having a PID field and a LID field. In the PID field it will place its own handset identification code. In the LID field, it may place one of a variety of codes, depending on the service required by the user.

If the handset is being used as an extension of a domestic telephone or as a numbered extension of a private branch exchange, the handset 11 will transmit a LID code indicating that it wishes to make contact with the specific domestic telephone or private exchange system with which it has been registered. If the handset 11 is being used with a public "telepoint" system (which is a system in which a user can make telephone calls through any one of various base stations in various geographical locations) the LID code may identify the telepoint company or system with which the handset is registered and through which the user wishes to make the telephone call.

In an environment where several competing telepoint systems are present, it is preferable to define one or more LID codes which the handset 11 can transmit to make contact with any base station within range, regardless of the system to which it belongs, and further LID codes which the handset 11 can transmit in order to make contact only with base stations of one specified system. A further, special, LID code may be used to enable a handset 11 to make contact with a base station 3 purely for the purposes of registration, so that the base station 3 may receive and store the PID code of the handset 11, enabling it to be called by the base station 3 in call set up sequences of the type illustrated in FIG. 21. The handset 11 may also acquire further LID codes from a base station 3 in such a registration radio link.

The various LID codes are stored in the system controller 79 of the handset 11 together with its PID code. These codes may be placed in one of the memories of the system controller 79 during manufacture of the handset 11 or may be entered subsequently through the keypad 31 in a registration process, or may be received in a registration radio link as mentioned above.

If the base station 3 determines in step B23 that the handset channel marker CHMP has been received, it will pass to step B24. In this step, it will still not transmit, but its programmable demultiplexer 95 will be instructed to decode received data using the multiplex 3 structure, having the burst timing derived from the received CHMP word. Accordingly, the D channel data transmitted by the handset 11 will now be passed to the system controller 99 of the base station 3, where it will be decoded. The system controller 99 will examine the PID and LID codes, and decide on the basis of these whether to respond to the handset 11.

If it is determined in step B25 that no PID and LID codes requiring a response have been received within a pre-set period, the base station 3 will return to step B21, select a new channel, and begin listening for further transmissions from handsets wishing to set up a link.

If the base station 3 determines in step B25 that it should respond to the handset 11, it will move to step B26, and begin to transmit in multiplex 2 with SYNCF in the S channel. The base station 3 will transmit a D channel data word containing the PID code received from the handset 11, and an arbitrary LID code to identify the link being set up. The base station 3 will expect the handset 11 now to switch to multiplex 2 transmissions, using the SYNCP S channel synchronisation word.

In the D channel code word transmitted in multiplex 3 by the handset 11 in step H22, the normal handshake code will be replaced by the "link request" code. In the D channel code word transmitted in multiplex 2 by the base station 3 in step B26, in reply to the hand set 11, the normal handshake code will be replaced by the "link grant" code.

In step H23, the handset 11 determines whether it has received the SYNCF synchronisation word from a base station 3 within a pre-set period. If not, it passes to step H24. In this step, it determines whether a time out period has expired since the handset 11 first began to request the link. If the time out period has not expired, the handset 11 returns to step H21, selects another free channel, and attempts to establish the link on that channel. If the time out period has expired, the handset passes to step H25, and abandons the attempt to set up the link.

If it is determined in step H23 that SYNCF has been received, the handset 11 passes to step H26. In this step, it temporarily ceases transmission, and decodes the received multiplex 2 transmissions from the base station 3, while using the received SYNCF synchronisation word to achieve burst synchronisation with the transmissions from the base station 3.

The handset 11 is now able to decode the D channel information transmitted by the base station 3. In step H27 it determines whether it has received within a pre-set period a D channel code word containing its PID and the "link grant" code. If such a D channel code word is not received within the pre-set period, the handset 11 moves to step H25, and abandons the attempt to set up the link. If the handset 11 does receive a link grant message accompanied by its own PID, it moves to step H28. In this step, it begins multiplex 2 transmissions, using SYNCP as the S channel synchronisation word. In its D channel message, it will continue to send its own PID code, but will change the LID code to the link identification code received from the base station 3. In this step, the handset 11 will continue to listen for multiplex 2 transmissions from the base station 3, and will maintain burst synchronisation with the base station 3.

Once the base station 3 has received a multiplex 2 transmission from the handset 11, using SYNCP as the S channel synchronisation word and returning the LID code sent out by the base station 3, it knows that the link grant message has been received.

The base station 3 now moves to step B27, in which it ceases to transmit the link grant message, and exchanges D channel information with the handset 11 using the multiplex 2 data structure. Once the hand set 11 has reached step H28 and the base station 3 has reached step B27, the radio link has been established. Subsequently, the base station 3 will instruct the beginning of multiplex 1 communication. The handset 11 will move to step H29 and the base station 3 will move to step B28. B channel communication may now begin.

FIG. 24 shows schematically the pattern of signals transmitted when a handset 11 successfully initiates a link with a base station 3. First, the handset 11 transmits a series of link request messages 175, in multiplex 3. When the base station 3 receives these messages, and decides to grant the link, it replies with link grant messages 177 in multiplex 2. On receipt of the link grant messages 177, the handset 11 ceases multiplex 3 transmission, synchronises its burst timing with the signal from the base station 3, and begins to decode the received multiplex 2 bursts. When it has decoded a link grant message 177, the handset 11 begins transmitting messages 179 using multiplex 2. The two parts continue to exchange messages 179 in multiplex 2, until the base station 3 instructs the change to multiplex 1 messages 181.

As explained above, in some circumstances the handset 11 may transmit a link request message in multiplex 3 using a LID code identifying several base stations 3, any of which the handset 11 can establish the link with. If more than one such base station 3 is within range of the handset 11, the base station 3 which first scans the channel on which the handset 11 is transmitting will normally be the first to grant the link, and the link will successfully be set up with that base station. However, two base stations 3 may, by chance, transmit link grant messages to a handset 11 simultaneously. In this case, the handset 11 will most probably fail to decode either message successfully. Accordingly, in step H23 the handset 11 will determine that it has not received SYNCF, and will pass through step H24 to step H21. It will select another empty channel and repeat its multiplex 3 transmissions on that channel. Since the handset 11 will not reply to the link grant messages from the base stations 3 in this case, both base stations will conclude that the link has failed, and will return to step B21. Each base station will select a new channel and begin listening for the transmission of CHMP from a handset 11.

In this case, if both base stations 2 select the next channel, they will continue to scan each channel at the same time as each other, and attempts to grant links to handsets 11 will continue to fail for the same reason. In order to prevent this, the channel selected in step B21 under these circumstances is not the next channel. Instead, the base stations 3 follow rules designed to reduce the probability that they will continue to scan the same channel at the same time. This may be done by providing a channel selection algorithm which operates randomly, so that the channel selected in step B21 under the circumstances is chosen randomly. Alternatively, each base station 3 may be programmed to return to a particular channel under these circumstances, and nearby stations are programmed to return to different channels. The random channel selection algorithm is preferred. If the base stations are programmed to return to a specific channel, there is the possibility that incorrect programming may direct two nearby base stations to return to the same channel each time, in which case conflict between them will not be resolved.

D Channel Structure

As mentioned above, messages in the D channel are transmitted using code words. Each code word is 64 bits long. A string of code words may be sent in succession, as a D channel data packet. In this case, the first code word must have a first particular format, and is known as an address code word (ACW), and the remaining code words of the packet must have a different specified format and are known as data code words (DCW). In a packet, an address code word may be followed by up to five data code words. When only one code word is sent, not followed by any others, it must be an address code word.

The rate at which D channel bits are sent is determined by the multiplex data structure being used in the radio link. It will always take several bursts to send a single D channel code word. The maximum speed is provided by multiplex 2, in which 32 bits of the D channel are sent in each burst, so that two bursts are required for a code word. The slowest transmission of D channel is with multiplex 1.2, in which only two bits of D channel are sent per burst. In this case, 32 bursts are required to carry a code word.

If at any time, there is no D channel information to be sent, the multiplex structures nevertheless require D channel bits to be transmitted. In this case, a signal called "IDLE D" may be sent to fill the D channel. When IDLE D is being sent, the D channel bits alternate between 1 and 0.

In order to alert the receiving part that useful D channel information is about to be transmitted, every address code word is preceded by a standard 16 bit D channel synchronisation pattern called SYNC D. As well as informing the receiving part that an address code word follows, the SYNC D pattern ensures that the D channel decoding operation of the system controller 79, 99 is synchronised with the boundaries of the code words, so that each code word is decoded correctly.

Figure 25:
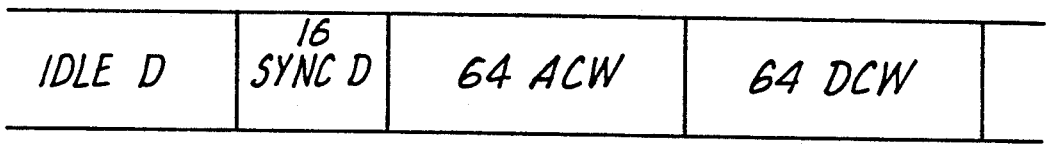
FIG. 25 is an overall view of the structure of data in the D channel.

Thus, a typical sequence of D channel transmissions, assembled from a plurality of data bursts, might be as shown in FIG. 25. A period during which IDLE D is transmitted ends with the transmission of the 16 bit SYNC D pattern. This is immediately followed by a 64 bit address code word, and then one or more 64 bit data code words.

In multiplex 1, the first bit of the SYNC D pattern must always be transmitted as the first bit of a multiplex 1 burst. In multiplex 2, the 16 bit SYNC D pattern must always be transmitted as the final 16 bits of a burst, and in multiplex 3 the first bit of the 16 bit SYNC D pattern must always be the first bit of useful D channel information transmitted after the initial 6 bit D channel preamble in each repetition period of the first submultiplex. When multiplex 2 or 3 is being used, this places the SYNC D pattern as soon as possible after the S channel synchronisation word, and therefore maximises the likelihood that the SYNC D pattern will be detected promptly following burst synchronisation.

Figure 26:
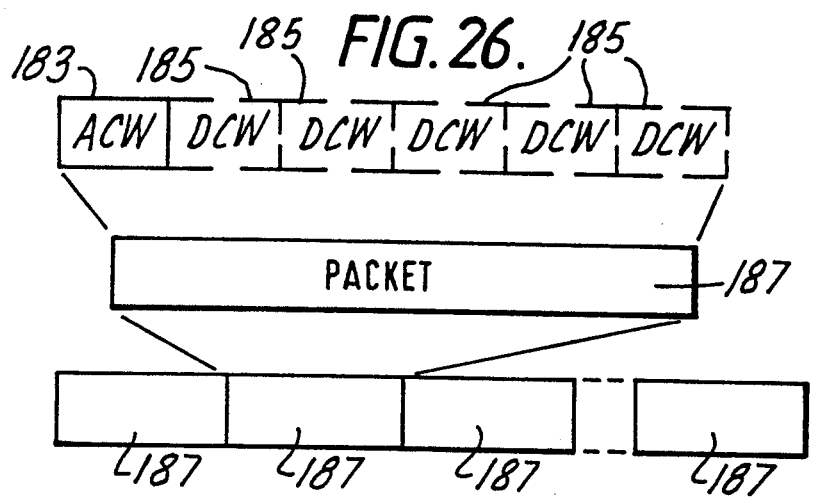
FIG. 26 shows schematically how D channel code words may be assembled into packets and packets into messages.

FIG. 26 shows the structure of a message in the D channel. An address code word 183, optionally followed by up to five data code words 185 transmitted in a continuous string, as shown in the first line of FIG. 26, forms a D channel packet 187, shown in the second line of FIG. 26. Several packets 187 may be combined to create a D channel message of any length, as shown in the bottom line of FIG. 26.

In order to maintain at least a minimum rate at which handshake signals are exchanged, successive packets of a D channel message are not necessarily transmitted immediately one after another. Instead, a special address code word, not followed by any data code words, may be transmitted between successive packets of a message. The special address code word carries handshake and identification signals.

Figure 27:
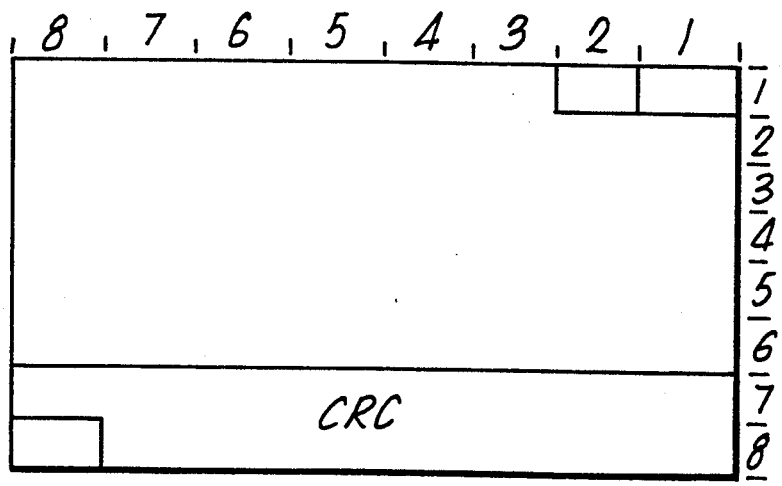
FIG. 27 illustrates schematically the general format of a D channel code word.

FIG. 27 shows the general format of a D channel code word. The code word is made up of eight octets, each illustrated as one line in FIG. 27, and each octet is in turn made up of eight data bits.

When the code word is transmitted over the D channel, bit 1 of octet 1 is transmitted first. This is the top right hand bit in FIG. 27. Next, bit 2 of octet 2 is transmitted. This is the bit second from the right in the top line of FIG. 27. The remaining bits of octet 1 are then transmitted in order. Then octet 2 is transmitted in order from bit 1 to bit 8. The remaining octets are transmitted in order in the same manner, so that the last bit of the code word to be transmitted is bit 8 of octet 8, which is the bottom left hand bit in FIG. 27.

Bit 1 of octet 1 is used to indicate the type of code word. For an address code word, the bit is set to "1" For a data code word, the bit is set to "0". Bit 2 of octet 1 determines the code word format. An address code word can either be in fixed format or variable length format. A fixed format address code word is used for transmitting handshake and identity messages, and will be described in more detail with reference to FIG. 28. A fixed format address code word is not followed by any data code words. In an address code word, bit 2 of octet 1 is set to "0" to define a fixed format address code word. Bit 2 of octet 1 is set to "1" to indicate a variable length format code word. Variable length format indicates that the length of the packet may vary, i.e. data code words may be present. Data code words are always in variable length format, and therefore this bit should always be set to 1 for a data code word. All normal D channel messages are carried by variable length format code words. A variable length format address code word may be followed by up to five data code words, but may also form a packet without being followed by any data code words.

The significance of the remaining bits of octet 1, and all bits of octets 2 to 6, depends on whether the code word is a fixed format address code word, a variable format address code word or a data code word.

Octets 7 and 8 always carry a check code. The first fifteen bits of the check code, from bit 1 of octet 7 to bit 7 of octet 8, provide a cyclic redundancy check (CRC) code. Such codes, and methods of generating them, are well known. Bit 8 of octet 8 is a parity bit, which is chosen so as to give the whole 64 bit code word even parity.

Figure 28:
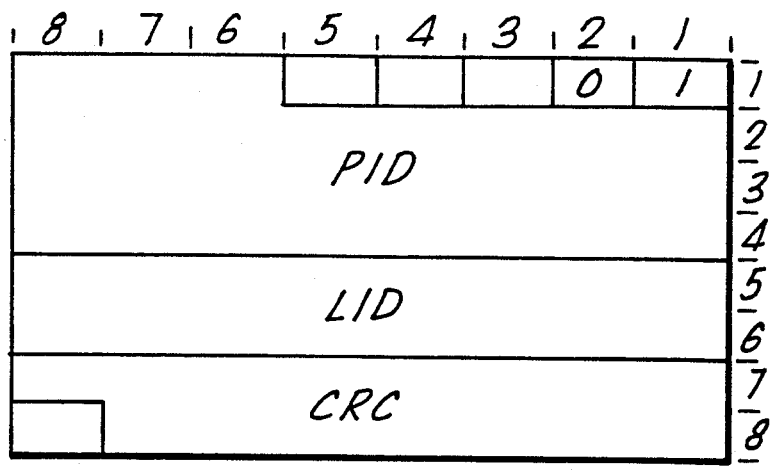
FIG. 28 illustrates schematically the format of a fixed format type address code word of the D channel.

The structure of a fixed format address code word is shown in FIG. 28. Bit 1 of octet 1 is set to "1" to indicate that it is an address code word, and bit 2 of octet 1 is set to "0". to indicate that it is a fixed format word. Bits 3 and 4 of octet 1 carry the hand shake code. Bit 5 of octet 1 encodes the multiplex 1 signalling rate. It is set to "1". to indicate multiplex 1.4, and is set to "0" to indicate multiplex 1.2.

The remainder of octet 1, and octets 2, 3 and 4 carry the PID code. Preferably, this is divided into two sections. Octet 4 alone carries a manufacturer identity code, which can be allocated to a manufacturer by a regulatory authority. The remainder of the PID code is allocated by the manufacturer, and indicates one specific handset 11 produced by the manufacturer. Octets 5 and 6 carry the LID code, and octets 7 and 8 carry the cyclic redundancy check and the parity bit.

The fixed format address code word is transmitted during link set up, to carry the PID and LID codes and the "link request" and "link grant" messages, as described with reference to FIGS. 21 to 24. "Link request" is transmitted by setting the handshake bits 4 and 3 of octet 1 to "00". "Link grant" is transmitted by setting the handshake bits 4 and 3 of octet 1 to "01".

When the handset 11 transmits "link request", it sets the signalling rate bit (bit 5 of octet 1) to "1" if the handset can support multiplex 1.4, and to "0" if it can only support multiplex 1.2. When the base station 3 sends the "link grant" message, it will set bit 5 of octet 1 to "1" only if the base station 3 can support multiplex 1.4 and additionally it has received a bit "1" at this position from the handset 11, indicating that the handset can also support multiplex 1.4. If either device can only support multiplex 1.2, the base station 3 sets bit 5 of octet 1 to "0" in the "link grant" message, informing the handset 11 that multiplex 1 transmission will take place using multiplex 1.2. This concludes the "negotiation" operation between the two devices concerning which version of multiplex 1 to use.

Figure 29:
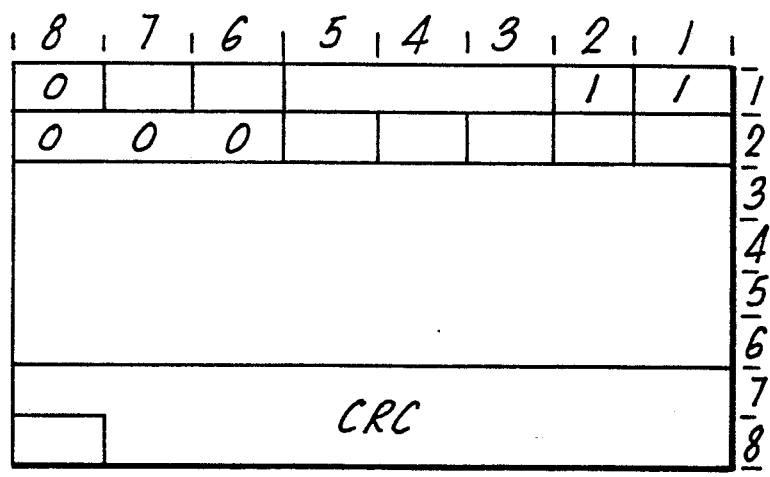
FIG. 29 illustrates schematically the format of a variable format type address code word of the D channel.

FIG. 29 shows the structure of a variable format address code word. In this code word, bit 1 of octet 1 is set to "1" to indicate that it is an address code word, and bit 2 of octet 1 is set to "1" to indicate that it is in variable format. The significance of bits 3, 4 and 5 of octet 1 depends of bit 6 of octet 1. If further code words follow in the D channel packet, bit 6 of octet 1 is set to "0". In this case, bits 3, 4 and 5 give in binary the number of further D channel code words in the packet following the code word in which these bits appear. Thus, if the packet contains three code words in total, bits 3, 4 and 5 of octet 1 of the address code word (which will be the first code word of the packet) will be set to "2" or "010" in binary, to indicate that two further code words follow.

If bit 6 of octet 1 is set to "1", this indicates that the code word is the final code word of the packet. In this case, it is possible that only some of the data carrying octets of the code word carry useful data. Therefore, in this case bits 3, 4 and 5 of octet 1 give the number of data carrying octets of the code word which carry useful data. When the code word is interpreted by the receiving system controller 79, 99, it will use this information to ignore any remaining octets, which do not carry useful data, in the final code word of a packet.

Bit 7 of octet 1 is set to 1 to indicate that the current packet is followed by further packets of D channel information, and is set to "0" for the last packet of a D channel message.

Bit 8 of octet 1 is set to "0", to indicate that octet 2 has its normal significance as a control message. In the illustrated embodiment, this is always the value of this bit, but it provides the facility of redefining the meaning of octet 2 of a variable format address code word, if this is desired. Through this redefinition of the meaning of octet 2, this bit enables the interpretation of the entire packet to be changed.

Octet 2 of the variable format control word is a control octet. Bit 3 of octet 2 is set to "1" to indicate that the receiving device must acknowledge successful reception of the D channel packet. In this case, bit 4 of octet 2 will be the packet number, and alternates between "0" and "1" for successive packets. Bit 2 of octet 2 is used to acknowledge received D channel packets from the device at the other end of the link, when this is required. This bit is set to the expected value of bit 4 of octet 2 of the address code word for the next packet to be received from the other device. When bit 3 of octet 2 is set to "0", acknowledgement of the packets is not required, and bit 4 of octet 2 has no significance. Whether bit 2 of octet 2 has significance will depend on whether the device at the other end of the radio link has requested acknowledgement of its packets.

Bit 3 of octet 2 must be set to "1", requiring that packets are acknowledged, whenever a D channel message contains more than 1 packet.

Bit 1 of octet 2 is set to "0" if the last D channel packet received by the transmitting devide was accepted. If a received D channel packet is rejected, e.g. because the CRC check fails for one of the code words, bit 1 of octet 2 in the next transmitted variable format address code word is set to "1", and bit 2 of octet 2 is set to the value of bit 4 of octet 2 in the address code word of the received, but rejected, packet.

Bit 5 of octet 2 specifies whether the D channel packet is "information type" or "supervisory type". The contents of "supervisory type" packets (bit 5 is set to "0") relate to operations controlling and maintaining the radio link. Such packets may include instructions asking the other device to increase or decrease the power at which it is transmitting, to re-establish the link on the same channel, or to re-establish the link on another, specified, channel. Another supervisory message is the FILL-IN message, which serves a special purpose which will be described later.

All other D channel messages are carried by "information type" packets (bit 5 is set to "1"). These will include messages sent by a base station 3 to instruct a handset 11 to emit a ringing tone to alert a user of an incoming call, or to send messages to be displayed on the display of the handset 11. "Information type" messages sent by a handset 11 to a base station 3 typically inform the base station 3 that certain keys of the keypad 31 have been pressed. The messages for changing multiplex structure between multiplex 1 and multiplex 2 are also carried by "information type" packets.

D channel messages are only permitted to be constructed from more than one packet, as shown in the bottom line of FIG. 26, if the packets are "information type" packets. "Supervisory type" packets must each be independent, with bit 7 of octet 1 of the address code word set to "0".

Octets 3, 4, 5 and 6 of the address code word carry the D channel message contents. Octets 7 and 8 carry the CRC code and the parity bit.

Figure 30:
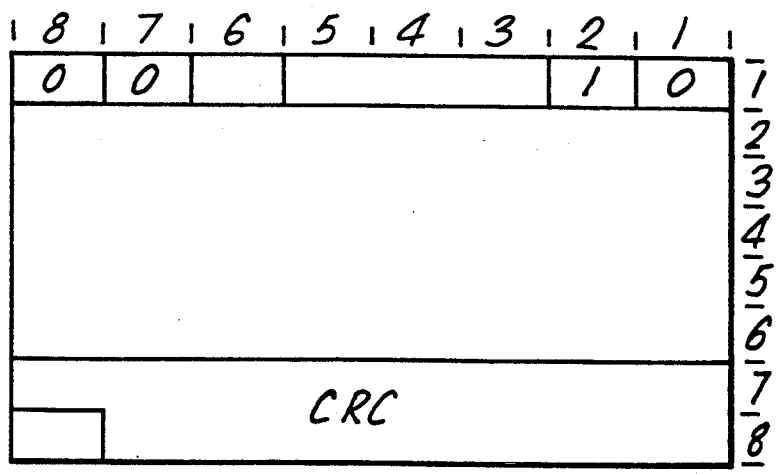
FIG. 30 illustrates schematically the format of a data code word of the D channel.

FIG. 30 shows the structure of a data code word. Bit 1 of octet 1 is set to "0", to indicate that it is a data code word, and bit 2 of octet 1 is set to "1", as data code words are only permitted in variable format. Bits 3, 4, 5 and 6 of octet 1 have the same meaning as for the variable format address code word shown in FIG. 29. Bits 7 and 8 of octet 1 have no significance, and are set to "0".

The data code word does not include a control octet, and accordingly the D channel message contents are carried by octet 2, octet 3, octet 4, octet 5 and octet 6. Octets 7 and 8 carry the CRC code and the parity bit.

In "information type" packets, the D channel messages in the message content portions of the code words are provided in "identifier, length, contents" format, in a fashion similar to that already known for ISDN data. In this format, bit 8 of the first octet of the message is set to "1" to indicate a fixed length message, and is set to "0" to indicate a variable length message. A fixed length message consists of only one octet. Unless it is known that a packet continues a message started in a previous packet, it is always assumed that the first message contents octet of the address code word in an "information type" packet (i.e. octet 3 of the address code word) is the first octet of a D channel message.

Figure 31:
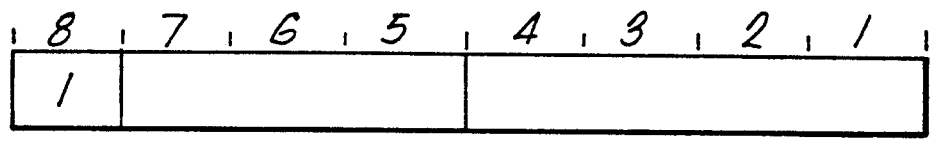
FIG. 31 illustrates schematically the structure of a fixed length message in the D channel.

FIG. 31 shows the format of a fixed length message. Bit 8 is set to "1" to identify that it is a fixed length message. Bits 7, 6 and 5 provide a code identifying the type of message being carried. Since the message is in fixed length format, no length information is required, and bits 4, 3, 2 and 1 provide the message contents.

This message format is used only to carry very simple messages, such as messages controlling the manner in which variable length format messages should be interpreted.

Figure 32:
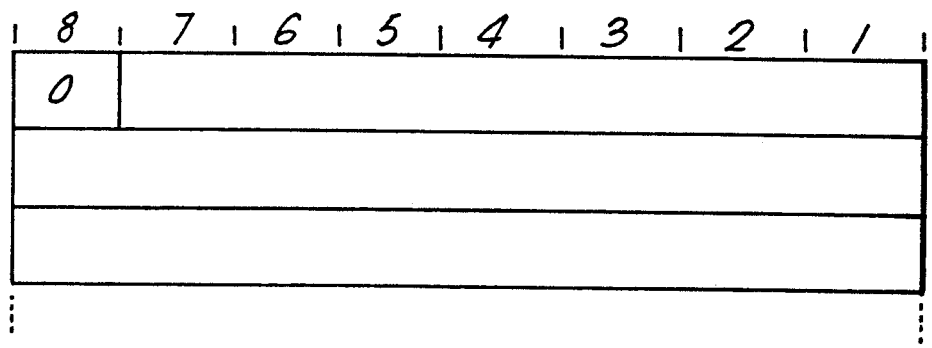
FIG. 32 illustrates schematically the structure of a variable length message in the D channel.

FIG. 32 shows the format of a variable length D channel message. This consists of at least three octets, and maybe more.

In the variable length format, bit 8 of the first octet is set to "0", to indicate that it is a variable length format message. The other seven bits of the first octet provides the identifier code, identifying the type of message being sent. The second octet is the length code. This is the number of remaining octets in the message, following this length code octet. Thus, if the total message is four octets long, an identifier and format type octet, a length code octet and two further octets, the length code octet will indicate that two further octets follow.

All remaining octets of the variable length message carry the message contents.

Handshake Codes and Link Re-establishment

As has already been described, the fixed format address code word of FIG. 28 is used during link set up to carry the "link request" and "link grant" messages, to carry the negotiations for selecting between multiplex 1.2 and multiplex 1.4, and to carry the PID and LID codes. After the link has been established, this D channel code word is also transmitted from time to time to carry handshake signals. The PID and LID codes can be used during the link to confirm that the link continues to be established between the same two devices.

In order to maintain continuity of the link, handshake words must be exchanged with at least a certain minimum frequency. The separation of D channel messages into packets allows this to be done. Between successive packets of the same message, the fixed format address code word can be transmitted, to maintain the handshake rate. This does not disrupt the transmission of D channel messages, as every variable format address code word indicates whether further packets (and therefore further variable format address code words) will follow in the same message. The fixed format address code word will be recognised as not being a packet of the message, and the assembly of the D channel message will resume when the next variable format address code word is received.

In the fixed format address code word, bits 3 and 4 of octet 1 carry the handshake message. Therefore, four handshake messages are possible. "00" means "link request". "01" means "link grant". "10" means "ID OK". "11" means "ID LOST". The use of "link request" and "link grant" during link set up has already been described with reference to FIGS. 21 to 24. These handshake messages are only sent for the purposes described. At all other times, the normal handshake message in the fixed format address code word is "ID OK". This code serves as a handshake code, and also confirms to the receiving device that the transmitting device has received a handshake code from the receiving device within a pre-set period. The "ID LOST" code also serves as a handshake code, but indicates to the receiving device that the transmitting device has not received a valid handshake code from the transmitting device within the pre-set period. The use of "ID LOST" enables failure of a link to be determined promptly, so that it can be re-established with the minimum delay.

When two parts, a handset 11 and a base station 3, are connected in a radio link, each part will transmit a handshake code, using the fixed format address code word, at a rate not greater than once every 400 ms, and not less than once every second. The timing of the transmission of a handshake code word is not dependent on the timing of the reception of a handshake code word from the other part. If either part determines that it has not received a valid code word for more than 1 second, it concludes that handshake has been lost. If either side has not received a valid code word for at least 3 seconds, the parts are permitted to re-establish the link on another channel. However, if either part has not received a valid handshake code for 10 seconds, attempts to re-establish the link must cease, and the link must be treated as having been terminated.

The prohibition on re-establishing on another channel after less than 3 seconds prevents undesirable rapid channel switching, which might interfere with the operation of other devices trying to use other channels, and prevents unnecessary channel switching in response to a brief burst of radio frequency noise or interference. The requirement to close down the link 10 seconds after the loss of handshake prevents attempts to re-establish the link from continuing indefinitely.

If two parts are exchanging handshake signals very rapidly, which would be possible using multiplex 2, there is a chance that each side could receive a valid handshake signal once every 3 seconds, even though the quality of the link was very poor. Under these circumstances, the parts would be forbidden to change channel regardless of the poor quality of the link. Therefore, handshake signals are not transmitted more frequently than once every 400 ms, even if there is spare D channel capacity to carry more frequent handshake codes.

Every time a part transmits a handshake code, it resets a transmit timer. Every time it receives any of the four possible handshake codes, it resets a receive timer. If the received handshake code is "ID OK", it also resets a link timer, but the link timer is not reset if the received handshake code is any of the other handshake codes.

When the transmit timer indicates that 400 ms have passed since the last time the part transmitted a handshake code, it prepares to transmit a handshake code as soon as the structure of data being transmitted on the D channel permits. Just before it transmits its handshake code, it checks the receive timer. Provided that the receive timer indicates that one of the handshake code words has been received within the past second, the part transmits the "ID OK" handshake code. Otherwise, it transmits the "ID LOST" handshake code. If the part subsequently receives any valid handshake code, it will reset its receive timer, and return to sending "ID OK" handshake codes.

If no handshake codes are received, or if only handshake codes other than "ID OK" are received, the link timer is not reset. Once the link timer indicates that 3 seconds have passed since the last "ID OK" was received, the part will automatically begin link re-establishment. If the part is a handset 11, it will begin to transmit in multiplex 3, and if the part is a base station 3 it will begin listening for the CHMP S channel synchronisation word transmitted in multiplex 3 by the handset 11. Link re-establishment follows the same procedure as the procedure described with reference to FIGS. 23 and 24 used to set up a link when the call is initiated by the handset, except that in the multiplex 3 transmissions by the handset, the code transmitted in the LID field of the D channel is the most recent link identification code which was used by the parts in the link which they are trying to re-establish, and not the code normally used by the handset to establish a new link.

When the link is re-established, reception of the "ID OK" handshake code will reset the link timer. If the link timer shows that this code has not been received within 10 seconds of the last time it was received, the part will abandon attempts to re-establish the link.

Because each part does not reset its link timer when the "ID LOST" handshake code is received, the link timers of the two parts will always show times within 1 second of each other, and normally less than 500 ms of each other. This ensures that the two parts begin to attempt link re-establishment, and if necessary abandon attempts at link re-establishment, at almost the same time, even if the nature of the problem with the link is such that signals in one direction continue to be received successfully while signals in the other direction are not.

Figure 33:
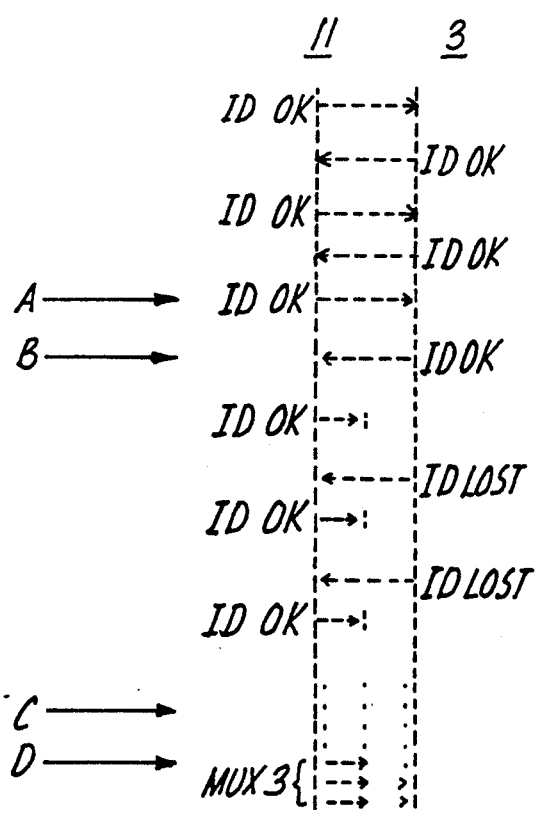
FIG. 33 illustrates schematically the sequence of handshake signals leading to link re-establishment when handshake is lost only from a handset to a base station.
Figure 34:
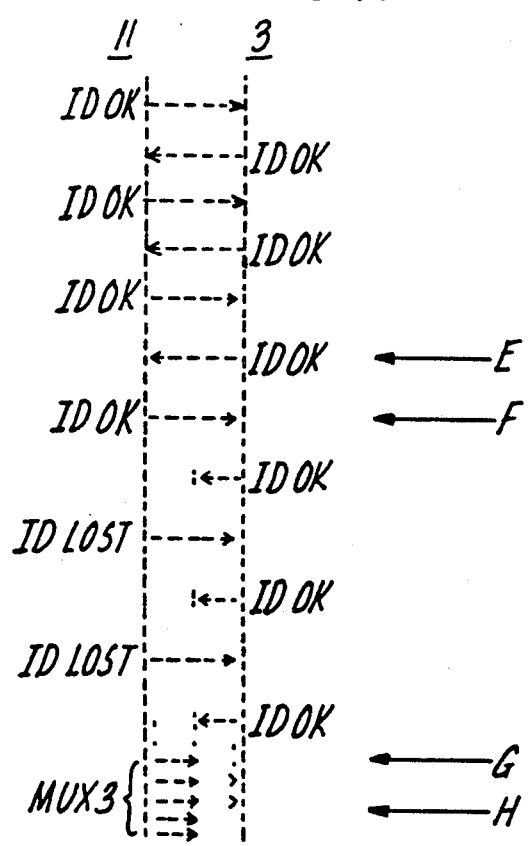
FIG. 34 illustrates schematically the sequence of handshake signals leading to link re-establishment when handshake is lost only from a base station to a handset.

The effect of the "ID LOST" handshake code on the link timers, when a link breaks down in one direction only, is illustrated in FIGS. 33 and 34. FIG. 33 illustrates the case where signals from the handset 11 fail to reach the base station 3, although signals from the base station 3 continue to reach the handset 11.

Initially in FIG. 33, the quality of the link is good and "ID OK" handshake codes are transmitted by both parts. However, interference then prevents the base station 3 from receiving handshake codes from the handset 11, and the last handshake code received by the base station 3 occurs at time A. At time B, the base station 3 transmits its next handshake code. As this is less than 1 second from time A, it transmits "ID OK". However, next time it transmits a handshake code, it transmits "ID LOST", as it is now more than 1 second since time A. Additionally, since no further handshake codes are received by the base station 3, its link timer is not reset after time A.

Since the handset 11 is continuing to receive valid handshake codes from the base station 3 at less than 1 second intervals, it continues to transmit "ID OK" as its handshake code. However, since it is receiving "ID LOST" instead of "ID OK", the handset 11 does not reset its link timer after time B.

At time C, which is 3 seconds from time A, the base station 3 prepares for link re-establishment. It stops transmitting over the radio frequency channel, and begins to scan for multiplex 3 transmissions from the handset 11. At time D, which is 3 seconds after time B, the handset 11 stops its previous transmissions over the link, and begins transmitting in multiplex 3, over the same or different channel, to initiate link re-establishment.

The period between times C and D is the same as the period between times A and B. Since "ID OK" was transmitted by the base station 3 at time B because this time was less than 1 second after time A, it can be guaranteed that these two times are less than 1 second apart. Typically, they will be less than half a second apart. Therefore times C and D, when the respective parts move to link re-establishment, will be similarly close together.

FIG. 34 shows the case where, due to interference, the handset 11 ceases to receive handshake signals from the base station 3, but the base station 3 continues to receive handshake signals from the handset 11. Initially, the link quality is good, and the parts both transmit "ID OK" handshake codes. Subsequently, the handset 11 ceases to receive the handshake codes transmitted by the base station 3, and the last handshake code received by the handset 11 is sent at time E. From this time onwards, the handset 11 receives no handshake codes at all, and so it does not reset either its receive or its link timers.

The next time the handset 11 sends a handshake code, it is still less than 1 second since it received the "ID OK" code at time E. Therefore the base station 11 transmits an "ID OK" code, at time F. However, when the handset 11 comes again to transmit a handshake code, it is more than 1 second after time E, and accordingly it transmits "ID LOST".

Since the base station 3 continues to receive handshake codes from the handset 11, it continues to reset its receive timer and transmits "ID OK". However, it is now receiving "ID LOST" signals. The last "ID OK" signal received by the base station 3 is sent at time F, and this is the last time that the link timer at the base station 3 is reset.

At time G, the handset 11 is informed by its link timer that it is 3 seconds from time E. The handset 11 therefore stops its previous transmission of signals over the radio link, and begins to try to re-establish a link by transmitting in multiplex 3. Shortly afterwards, at time H, the link timer at the base station 3 informs the base station that it is 3 seconds after time F, and the base station 3 also moves to link re-establishment, and begins to scan for the multiplex 3 transmissions by the handset 11.

Since times E and F must be less than 1 second apart, times G and H are also less than 1 second apart.

Regardless of the direction in which the link breaks down, it is always re-established from the handset 11 to the base station 3, and not vice versa. In some situations, the link may be established between the handset 11 and any one of several base stations 3 at different locations. This may be the case if the base stations 3 are part of a public telepoint system, and may also be the case if the base stations 3 are all connected to the same private branch exchange, e.g. for a large industrial site where base stations at various different locations are required to cover the whole area of the site.

In one of these situations, the base stations 3 will all be connected to a central controller, e.g. a computer, and a link may fail because a handset 11 moves too far away from the base station 3 it was in communication with. The handset 11 may now be in range of another base station 3 of the same system, so that the link could be re-established with this other base station 3 instead of the previous one. Since the telepoint or exchange system cannot track the movement of the handset, it does not know which base station 3 should be used to re-establish the link. Therefore, the base station 3 cannot begin transmission.

When a handset 11 begins multiplex 3 transmissions to re-establish a link, these will be received by any base station 3 within range. The base station 3 decodes the PID and the LID, and passes these to the central controller. This is able to recognise from the PID and LID that the handset 11 is trying to re-establish a link it had previously established with a different base station 3. The central controller can then instruct the base station 3 now receiving signals from the handset 11 to grant the link, and re-connect the handset 11 to the destination with which it was previously in communication over a link with the other base station 3.

In cases such as small area intercoms and telephone extensions where the handset 11 is only ever in communication with one particular base station 3, it is possible for the base station 3 to transmit the first radio signals to initiate link re-establishment, since there is no need to decide which of several base stations 3 should transmit the signals. However, even in this case there is a benefit in requiring the first radio signals to be transmitted by the handset 11 and not the base station 3.

First, the base station 3 will typically be a more powerful transmitter than the handset 11, and if the base station 3 transmits the first radio signals these may be received by the handset 11 but the reply from the handset 11 may not be received by the base station 3. Both the handset 11 and the base station 3 will then be active in attempting to re-establish the link in circumstances which prevent re-establishment from actually taking place. If the base station does not transmit until it has received a signal from the handset, it is more likely that the signal strengths in both directions are adequate for link re-establishment.

Second, if the base station 3 transmits the first signals, it will have to use CHMF, and all idle handsets 11 within range will have to synchronise and decode the transmissions before discovering from the PID whether the signals are intended for the particular handset 11 concerned. If the first signals in link re-establishment are transmitted by the handset 11, using CHMP, and the base station 3 replies using SYNCF, no other handsets 11 will react to the signals.

Link Quality Checking

The only encoding in the B channel takes place in the encoders 63, 83 of the handset 11 and the base 3. As described above, the encoders 63, 83 use an adaptive differential pulse code modulation algorithm to perform data compression. They may also reverse the values of selected bits of the B channel data according to a predetermined pattern (which will be reversed by the decoders 77, 97), in order to maximise the number of bit reversals in the serial data string. However, the B channel will typically not include any error detecting or correcting codes. In particular, error detecting or correcting codes require the transmission of code bits, reducing the number of transmitted data bits available to carry information. The B channel has an average transmitted bit rate of 32 kbit per second in each direction, and it is preferable to use all of these bits for speech information in order to maximise the quality of the transmitted speech.

Therefore, if there are errors in the B channel, the system cannot detect this fact directly. However, all multiplex data structures carry D channel bits, and errors in the D channel can be detected using the CRC code of the D channel code words. Therefore, the presence of errors in the B channel during multiplex 1 transmissions can be inferred from the detection of errors in the D channel.

Typically, signal errors arise in two ways. First, noise, interference and other problems with the radio link and the transmitting and receiving systems may cause random errors at any average bit error rate. Since these errors are random, each bit position of a multiplex structure is as likely to suffer such an error as any other. Second, errors may arise from the misinterpretation of the received signal if the parts of the radio link lose bit or burst synchronisation. Although all bits of a burst are prone to errors due to loss of synchronisation, the first and the last bits of each burst are especially vulnerable. For this reason, the D channel bits in multiplex 1.2 and multiplex 1.4 are placed at either end of the data burst, sandwiching the B channel bits. This ensures that the D channel, in which errors can be detected, is preferentially vulnerable to errors as compared with the B channel, in which errors cannot be detected.

Individual CRC failures in D channel code words are used by the system controller 79, 99 to detect D channel errors so that it can avoid acting on false D channel messages. This may lead to the rejection of D channel packets and requests for retransmission, using the control octet of the variable format address code word as described with reference to FIG. 29. Additionally, the system controller 79, 99 uses the pattern in which D channel CRC failures accumulate over time to provide a measure of the quality of the radio link, and if the quality fails to meet a pre-set criterion, either side can initiate link re-establishment, by sending a message in the D channel to the other part. In all cases, link re-establishment is actually carried out by the hand set 11 transmitting in the multiplex 3 data structure.

Serious permanent loss of synchronisation between the parts will lead to continuous errors in the D channel and the system controller 79, 99 will rapidly decide that the link quality fails to meet the criterion, whatever criterion is adopted. Accordingly, the link quality criterion should be chosen in order to provide desired performance when radio link problems or slight synchronisation loss cause only some bits to be received in error whilst most bits are received correctly.

The effect on the B channel of any average bit error rate can be simulated, and a subjective decision can be taken on what quality of received speech is acceptable. The pattern of CRC failures in the D channel for a given bit error rate can also be simulated, and the patterns for bit error rates leading to acceptable and unacceptable speech qualities can be compared. On the basis of this comparison, a pattern of CRC failures in the D channel can be selected as the link quality criterion to be used by the system controller 79, 99 in deciding whether or not to request link re-establishment. Any type of pattern of CRC errors may be chosen as the link quality criterion, but it has been found conveniently simple and effective to specify the criterion as a given number of successive CRC failures uninterrupted by a D channel code word in which the CRC check is successful.

Assuming that errors occur in the D channel at random, any given bit error rate will eventually result in an error pattern failing to meet the quality criterion, and causing link re-establishment. Using well known statistical methods, it is possible to calculate the period, for any given bit error rate, during which there is a 50% probability that an error pattern will occur which fails to meet the quality criterion.

For an ideal criterion, this period should be very short (e.g. a fraction of a second) for any bit error rate leading to B channel speech quality which is judged to be unacceptable, so that the link is rapidly re-established under these circumstances with the minimum disruption to the telephone conversation being conducted.

On the other hand, for bit error rates permitting excellent speech quality over the B channel, this period should be long compared with the predicted average length of a call between a handset 11 and a base station 3, so that unnecessary link re-establishment is unlikely to occur during calls in which the B channel quality is good. In addition to minimising unnecessary link re-establishments, this reduces the likelihood that a good quality link will be lost, since there is always a chance that an attempt at link re-establishment will result in loss of the link, especially at busy times when most other available channels are being used for links between other devices.

For intermediate bit error rates, representing B channel speech quality which is less than perfect but which is acceptable at least for short periods, the length of time for a 50% probability that link re-establishment will be attempted will also be intermediate the short period for unacceptable quality and the long period for excellent quality.

Figures 35, 36:
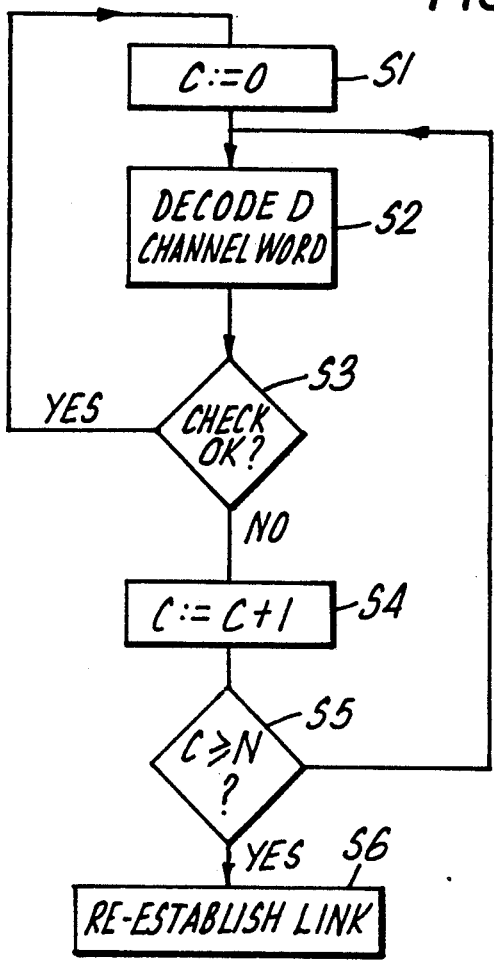
FIG. 35 is a flow diagram of the link quality monitoring process carried out in a handset or a base station.
FIG. 36 illustrates schematically the structure of a FILL-IN word in the D channel.

FIG. 35 shows a flow diagram of the link quality checking operations of the system controller 79, 99. In this case, the quality criterion is that the number of uninterrupted D channel CRC failures in succession must not reach N.

When a link is first established, the system controller 79, 99 sets a counter C to 0 in step S1. In step S2 it receives and decodes a D channel code word. In step S3 it determines whether the check code and the parity bit of the D channel code word have the correct values. If the values are correct, the error check succeeds and the system controller returns to S1. Counter C is set to 0, and the quality monitoring procedure waits until the next D channel code word is received and decoded.

If the CRC code or the parity bit indicate the presence of an error, the check in step S3 fails, and the procedure moves to step S4. In this step, the value of the counter C is increased by 1. Next, the value of counter C is tested in step S5. If the value of C has not yet reached N, the quality monitoring process returns to step S2, and waits for the next D channel code word to be received and decoded. In this case, the procedure does not pass through step S1 in returning to step S2, and therefore the value of C is not reset to 0. If successive D channel code words contain errors, the link quality monitoring procedure will pass round the loop made up by steps S2, S3, S4 and S5, and the value of counter C will continue to increase. If at any time a D channel code word is received without errors, the procedure returns to step S1 and counter C is reset to 0.

After N successive D channel code words have been received all containing errors, the value of counter C will reach N. This will be detected by the test of the value of C in step S5, and the procedure will pass to step S6. In this step, it is determined that the link has failed to meet the quality criterion, and link re-establishment is initiated.

If the handset 11 or base station 3 concerned has not received an "ID OK" handshake code during the previous 3 seconds at the time when it reaches step S6 in FIG. 35, it is permitted to attempt to re-establish the link on a different radio channel. Otherwise, the attempt to re-establish the link must be made on the same radio channel as was being used previously. However, if the errors have arisen through loss of synchronisation between the parts, rather than difficulties with radio transmission and reception, re-establishing the link on the same channel will normally restore link quality. Additionally, a condition is applied that link re-establishment on the same channel as was previously used is not permitted unless at least 300 ms of transmissions in multiplex 1.4, or at least 600 ms of transmissions in multiplex 1.2 have taken place over the link since the link was established or since the most recent link re-establishment.

In an alternative embodiment, the failure of the D channel CRC and parity errors to meet a quality criterion is used as an indication that the B channel quality is unacceptably low, but the action taken in response to this is not (or not necessarily) to initiate link re-establishment.

In one alternative, the device (handset 11 or base station 3) detecting the errors reacts by muting the B channel, so that the user hears nothing instead of hearing the poor quality B channel, but link re-establishment is not attempted until there is a loss of handshake (i.e. "ID OK" has not been received) for three seconds, as described above.

In another alternative, the device reacts by initiating a change from multiplex 1 to multiplex 2. Because of the increased amount of D channel and the presence of the S channel, it is easier to maintain contact over a low quality link in multiplex 2 than in multiplex 1.

In both cases, a temporary reduction in link quality will result in a corresponding temporary cessation of B channel communication, but the link is maintained and B channel communication may be restored when the link quality recovers. In both cases, it is possible as a further option to initiate link re-establishment if it is not possible to restore B channel communication within a time-out period.

D Channel Fill In

In the fixed format address code word shown in FIG. 28, the PID and LID codes may have any values, in accordance with the identity codes which have been given to particular devices or types of service. Similarly, the message contents octets of the variable format address code word of FIG. 29 and the data code word of FIG. 30 may adopt any value, depending of the D channel message being sent. Therefore, there is the possibility that the contents of a D channel word may, by chance, resemble the SYNC D pattern. If this happens, the system controller 79, 99 may believe that it has received SYNC D when it has really received part of a D channel code word. Therefore the D channel decoding by the system controller will not be properly synchronised with the received D channel data, and the D channel data will be misinterpreted.

In most cases, this error is self-limiting. Every address code word in the D channel must be immediately preceded by SYNC D. If the system controller 79, 99 is out of synchronisation with the D channel, it will probably not find the SYNC D pattern when it expects this pattern to appear again. When this happens, the system controller 79, 99 will abandon its incorrect synchronisation with the D channel, and will search the D channel for the SYNC D pattern, which will enable it to re-establish correct synchronisation.

However, a problem can arise if successive address code words in the D channel contain patterns which resemble SYNC D, at the same relative positions in the code words. In this case, the system controller 79,99 can become locked into the incorrect D channel synchronisation. In order to avoid this, successive address code words must be spaced by 48 bits of IDLE D, unless it is guaranteed that the address code words do not contain a pattern resembling SYNC D or the two successive address code words are sufficiently different that they cannot carry patterns resembling SYNC D at the same relative position.

D channel code words must be transmitted with sufficient frequency to permit satisfactory channel quality monitoring using the CRC code and the parity bit in each code word. If there are a large number of D channel messages to be sent, this requirement is met by the almost continuous stream of code words required to carry the messages, interleaved with fixed format address code words to carry handshake signals as required. However, if the same D channel message is to be sent repeatedly, so that the same variable address code word is sent repeatedly, or if no D channel messages are to be sent so that only the fixed format address code word (which will be the same every time) is to be sent, the address code words must be spaced by 48 bits of IDLE D to avoid the possibility of locking onto false D channel synchronisation, as discussed above. IDLE D is not a D channel code word, but simply a pattern of alternating "1" and "0" bit values and it does not include a CRC code. In view of the slow rate at which D channel data is transmitted in multiplex 1, this requirement to send 48 bits of IDLE D may mean that the rate at which D channel code words is sent is insufficient for satisfactory channel quality monitoring.

To solve this problem, a special "FILL-IN" D channel code word is defined. This code word is a "supervisory type" variable length format address code word, not followed by any data words and carrying a special message in all "contents" octets (i.e. octets 3, 4, 5 and 6) which is defined to have no meaning. The FILL-IN code word is designed so that no part of it, including the check code in octets 7 and 8, resembles the SYNC D sequence. Therefore, the FILL-IN word can be sent continuously, to maintain the D channel error check rate, when there are no D channel messages to be transmitted. Because it is known not to contain a false representation of SYNC D, there is no need to precede repeats of this word by 48 bits of IDLE D. Additionally, if it is desired for any reason to transmit another address code word repeatedly, the FILL-IN word may be interleaved with the other address code word, in place of the 48 bits of IDLE D, to provide a guarantee that the receiving system controller cannot lock into a false D channel synchronisation, while at the same time the FILL-IN word maintains the rate of D channel code words for use in channel quality monitoring.

FIG. 36 shows the bit pattern of octets 1 to 6 for a D channel word which is suitable for use in a system with a SYNC D pattern of "0010001111101011". The "X" given at bits 1, 2 and 4 of octet 2 indicate that these bits may be either "1" or "0". The pattern "11110000" in octets 3 to 6 is effectively a "supervisory type" message of no meaning. This same bit pattern is used in the last code word of an "information type" packet to fill up octets not used by the message being transmitted.

S Channel Word Structure

The S channel synchronisation words, SYNCP, SYNCF, CHMP and CHMF are used during multiplex 3 and multiplex 2 transmissions to enable the receiving device to obtain burst synchronisation with the transmitting device. Until the relevant synchronisation word has been detected, the programmable demultiplexer 75,95 cannot achieve burst synchronisation with the incoming data, and it is not possible to interpret the D channel.

Since the S channel synchronisation word must be detected before burst synchronisation can be achieved, it must be possible to detect the word asynchronously. For this reason, once bit synchronisation has been achieved, each bit of the incoming data is passed to the S channel controller 81,101, and in each bit period the S channel controller compares the pattern of the 24 most recently received bits (assuming that the S channel synchronisation words are 24 bits long) with the stored target word patterns. In order to allow the S channel synchronisation words to be detected in the presence of a small amount of noise, the S channel controller provides a "word found" output if the input bits match the target pattern for at least 22 of the 24 input bits.

In order to avoid the possibility that the receiving device will incorrectly identify the presence of an S channel synchronisation word, and therefore obtain incorrect burst synchronisation, it should ideally not be possible to obtain in multiplex 2 or multiplex 3 a pattern of data which, if correctly received, provides a match to 22 of the 24 bits of any synchronisation word, except when the synchronisation word itself appears in the data and is compared with the stored synchronisation word in precisely the correct alignment. Thus, if the received S channel synchronisation word is compared with the stored version of itself, but misaligned by one or more bit periods, or if any other part of the multiplex 2 or multiplex 3 transmissions are compared with the stored S channel synchronisation word, there should be no recognition that the synchronisation word is present, or else incorrect burst synchronisation will result.

These requirements may be considered in general terms for a synchronisation word of length L, used in a system in which recognition of the presence of the synchronisation word is deemed to have occurred if a comparison between the bit pattern of the word and the bit pattern of incoming data gives no more than K errors for any string of L data bits in the incoming signal. In this generalised case, the following conditions are each individually helpful, and are preferably both present.

A) Each data burst has fixed and variable portions, and each possible string of L consecutive bits contains fewer than L−K variable bits. It is assumed that the variable portions can assume any values, and so there is the possibility that by chance L successive bits of variable data will provide precisely the same pattern as the S channel synchronisation word. By splitting the variable data so that L consecutive bits contain less than L−K variable bits, the possibility is avoided that L−K bits of such a pattern of variable data may occur as an unbroken bit stream in the data burst, leading to false recognition of the S channel synchronisation word.

In the multiplex 2 structure, the D channel portions are variable portions and the S channel portion (preamble plus S channel synchronisation word) is a fixed portion. Although the multiplex 2 burst carries 32 bits of D channel data, this is split into two 16-bit portions separated by 34 bits of the S channel, so that the D channel alone can never mimic 22 or more bits of the 24-bit S channel synchronisation word. The amount by which the maximum number of variable bits in any string of L consecutive bits is less than L−K can be regarded as a protection factor. Thus, if the number of variable bits is one bit less than L−K bits, it provides a protection factor of one bit. If it is two bits less, it provides a protection factor of two bits. In view of the possibility that errors in the received data may cause the fixed data burst portion next to the variable data burst portion to mimic the extra bits of the S channel synchronisation word which cannot be contained in the variable bits because of their fewer number, a higher protection factor gives better protection against the possibility that chance resemblance of variable data to the S channel synchronisation word may lead to incorrect burst synchronisation. In the case of multiplex 2, L−K is 22 whereas any string of 24 consecutive bits can only include a maximum of 16 variable bits, providing a protection factor of 6 bits.

B) Any string of L bits made up wholly of a fixed data portion of a burst must give more than K errors when compared with any of the synchronisation word patterns. This applies to all strings of L bits of fixed data, including strings containing part of a synchronisation word itself, except for the string made up precisely of the correct synchronisation word in its correct position. Additionally, any string of L bits made partially of fixed data and partially of variable data, must also give more than K errors when compared with any of the synchronisation word patterns, while assuming that the variable data bits give no errors. Again, it is possible to define a protection factor. In this case, the protection factor is the number of errors in excess of K provided on this basis by the string of L bits of fixed data or part fixed and part variable data which gives the least number of errors in comparison with any of the synchronisation word patterns.

Theoretically, it is possible to discover the patterns of L bits which meet condition B) for any given burst structure or, if there are no such patterns, to discover the patterns which come closest to meeting condition B), by comparing all possible patterns of L bits with the burst structure at all possible bit offset positions. In practice, for any reasonably large value of L, there are so many possible L-bit patterns that such a comparison cannot be carried out in a reasonable amount of time. However, since the synchronisation word itself forms all or part of the fixed portion of the data burst, the degree of self-correlation between each synchronisation word pattern and itself offset by one or more bits, and the cross-correlation, with or without offset, between different synchronisation word patterns, are both relevant to condition B) above.

In the worst case, it can be assumed that the S channel synchronisation word is embedded in the multiplex structure in variable data. Under these circumstances, if M is the number of matches of the synchronisation word with itself offset by S bits, then for all values of S, M+S must be less than L−K, to meet condition B) above. The amount of the offset S is added to the number of matches M, to take account of the possibility that all bits of the variable data may by chance match precisely with the bits of the synchronisation word they are compared with. As S approaches L, so that the synchronisation word is offset to such a high degree that it only overlaps itself by a very few bits, this condition becomes harder to meet. However, condition A) above prevents S from reaching L−K, as it prohibits the presence of this much variable data in L successive bits.

For any reasonably high value of L (i.e. for any reasonably long synchronisation word) it can be extremely arduous to find all possible patterns of length L which meet this condition, or to find the patterns of length L for which the highest value of M+S remains below L−K by the greatest amount. Nor is it necessarily appropriate to do so, as it is possible to use burst structures such as multiplex 2 and multiplex 3 in which the S channel synchronisation word is not embedded in variable data. In multiplex 3 the S channel synchronisation word is provided with 12 bits of preamble on either side and in multiplex 2 it has 10 bits of preamble in front of it and the variable data behind it is restricted to 16 bits. As a practical matter, it is reasonable to assume that bit patterns having low self-correlation and cross-correlation side lobes will tend to be suitable for condition B) above, as they will tend to have low values of M.

The value of a self-correlation side lobe in the comparison of a pattern with itself at an offset of S bits is defined, for the purposes of this patent application, as being the number of matches in the comparison of the pattern with itself at this offset, minus the number of mismatches. If the value of the self-correlation side lobe is calculated for all values of S (except S=0: correct alignment), the maximum of all the values of the self-correlation side lobes found for all the values of S can be taken as a measure of the degree of self-correlation of the bit pattern. The lower this value, the more promising the pattern is as a candidate for an S channel synchronisation word.

The cross-correlation side lobes are defined in the same way, for the comparison of one synchronisation word pattern with another, except that in this case the value at S=0 must also be taken into consideration.

In the design of the illustrated embodiment, condition A) was met by the design of the multiplex 2 and multiplex 3 burst structures. In this case, L, the length of the S channel synchronisation word, is 24 and K, the number of permitted errors in recognising the S channel synchronisation word, is 2. In any continuous string of 24 bits transmitted in multiplex 2 or multiplex 3, the maximum number of D channel bits which can be present is 16, giving a protection factor of 6 bits for condition A).

It was decided to seek to meet condition B) by appropriate choice of bit patterns for the S channel synchronisation words. The preamble bits in the S channel in multiplex 2 and multiplex 3 are present to enable the receiving device to obtain bit synchronisation, and it might interfere with this objective if this bit pattern was altered to improve performance on condition B) with an arbitrarily chosen S channel synchronisation word pattern. The preamble bits in the D channel in multiplex 3 are also useful for enabling bit synchronisation, and additionlly the pattern is the same as the pattern for IDLE D, so that it is unlikely to result in misinterpretation of D channel data. Therefore, it was also considered to be undesirable to attempt to manipulate these bit patterns to improve performance on condition B).

In order to simplify calculations, it was decided first to identify good candidate patterns for the synchronisation words, by selecting those with good self-correlation properties, i.e. those with low values for the highest value self-correlation side lobe. All possible 24 bit binary patterns were examined to identify those with good self-correlation properties by this definition.

Because of the large number of calculations involved, the candidate patterns were not tested to ensure that condition B) was met for every possible string of 24 bits in multiplex 2 and multiplex 3. Instead, a multiplex 3 test and an S channel test were used.

In the multiplex 3 test, a 24 bit candidate pattern was compared with the 8 preamble, 10 data, arrangement of bits used in the D channel in multiplex 3, at each of the 18 possible different bit offsets. After 18 bit positions of offset, the arrangement of bits repeats, so that comparison at further offsets is unnecessary. The result of the test was the maximum number of matches obtained with any comparison bit pattern. To satisfy condition B) on this test, the maximum number of matches had to be less than L−K, i.e. less than 22. In accordance with condition B), it was assumed that every bit in the D channel provided a perfect match to the corresponding bits in the 24 bit candidate pattern.

The candidate pattern is aligned with the maximum number of variable data bits when it is aligned with one 8 bit preamble portion and part of each of the 10 bit data portions on either side of the preamble portion. In this case, the 24 bit pattern is aligned with 16 variable bits. This is the same as the maximum number of variable data bits a pattern can be aligned with in multiplex 2, and it is believed that the separation of the variable bits in multiplex 3 into two portions of up to 10 bits, rather than one portion of 16 bits as in multiplex 2, provides a more stringent test for the 24 bit candidate pattern.

Additionally, in multiplex 2 it takes two bursts to transmit a D channel code word, and as has been described above with reference to the FILL-IN word, there are rules which prevent the continuous unbroken repetition of the same D channel code word. Therefore the variable data portions of multiplex 2 bursts will be different from burst to burst, and will not repeat for several bursts. Thus any variable data pattern in a multiplex 2 burst leading to incorrect recognition of the S channel synchronisation word will not be repeated, and a recovery from incorrect recognition to correct recognition should occur rapidly. In multiplex 3 the variable (D channel) portions tend to be the same from burst to burst, making recovery from incorrect recognition of the S channel synchronisation word more difficult. Therefore the avoidance of incorrect recognition is more important in multiplex 3 than in multiplex 2.

For these reasons, it was not considered necessary to carry out a corresponding test using the multiplex 2 pattern of variable data bits.

The best self-correlation performance found amongst all possible 24 bit binary patterns provided a value of +1 as the highest self-correlation side lobe value. Some of these values also met condition B) in the multiplex 3 test. However, all of these provided at least one position in the multiplex 3 test where 21 matches were possible. That is to say, these patterns provided a protection factor for condition B) of only one bit in the multiplex 3 test.

It was considered that this was not satisfactory, as this meant that a false recognition of an S channel synchronisation word would be possible with some particular pattern of D channel data in multiplex 3 if a single error arose in the reception of the data. Since the D channel data transmitted in multiplex 3 is the PID and LID codes, this meant that a handset 11 with a particularly unfortunate PID code might suffer an excessive rate of failure when attempting to initiate a link, because the base station would be prone to mis-identify part of the D channel as the S channel synchronisation word in the presence of a small degree of noise, and therefore fail to decode the multiplex 3 transmissions correctly. Therefore all candidate patterns having a maximum self-correlation side lobe value of +1 were rejected, and candidate patterns having a maximum self-correlation side lobe value of +2 were considered. Several such codes were found which provided a protection factor of 2 bits for condition B) in the multiplex 3 test.

By accepting candidate bit patterns with self-correlation side lobes of up to +2, the chance is increased that incorrect burst timing will be obtained in a noisy environment, by misinterpreting S channel data offset from the correct S channel synchronisation word timing. However, it was considered that this situation was preferable to the possibility that some particular devices would suffer the problems which might flow from a protection factor of only 1 bit in the multiplex 3 test.

Pairs of bit patterns were identified which gave a bit protection factor of 2 for condition B) in the multiplex 3 test, such that each member of a pair was the bit inverse of the other. The use of bit inverse pairs means that it is unnecessary to consider the effect of the polarity of the D channel and S channel preamble portions. Seven such codes, fourteen such patterns, were found. Each of these patterns was compared with each of the others, including its bit inverse, to determine cross-correlation values. The 2 bit inverse pairs of patterns having the lowest maximum value of cross-correlation lobes for the 6 cross-correlations between them were selected.

The S channel test was carried out on the selected patterns. In this test, each of the four codes was compared at all offsets with each of four comparison patterns. The comparison patterns were 36 bits long, and consisted of 12 preamble bits and then a respective one of the four candidate patterns. The comparison pattern is the same as the structure of one repeat in the S channel submultiplex of multiplex 3. It also includes within it the pattern of the S channel in multiplex 2. Therefore this test provides an indication of the probability that S channel data in multiplex 2 or multiplex 3 will be incorrectly identified as the wrong S channel synchronisation word, or as the right word with the wrong timing.

In the S channel test, when each candidate pattern is compared with the test pattern containing itself, there will be a complete 24 bit match when the candidate pattern is aligned with itself in the test pattern. This data is irrelevant, since it represents a correct decoding of the S channel, rather than an incorrect decoding, and therefore it was discarded. After this irrelevant data had been discarded, the results for each bit inverse pair were studied to determine the alignment with any of the test patterns giving the greatest number of matches. For one bit inverse pair, this greatest number was 15 matches and for the other the greatest number was 14 matches. Thus, the S channel test gave protection factors of 7 bits and 8 bits respectively for condition B).

The bit inverse pair giving a maximum of 14 matches, and a protection factor of 8 bits, were selected as the channel marker codes CHMF and CHMP, and the other pair were selected as the ordinary S channel synchronisation words SYNCF and SYNCP.

It should be noted that the protection factors for condition B) given by the multiplex 3 test and the S channel test only apply to the particular group of alignments between the synchronisation word and the burst structure for which the tests are carried out, and do not necessarily guarantee that these protection factors are provided for all possible alignments between the synchronisation word and the burst structure.

However, the multiplex 3 test replicates the arrangement of bits throughout the first four submultiplexes of multiplex 3, and the S channel test replicates the arrangement of bits in the fifth submultiplex of multiplex 3. At the transition between the fourth and fifth submultiplexes, ten bits of variable D channel data are followed by fourteen preamble bits (two from the D channel in the fourth submultiplex and twelve from the S channel in the fifth submultiplex) before the twenty four W bits making up the S channel synchronisation word. It is valid to treat preamble and W bits (which are fixed) as particular values for variable bits in order to fit this arrangement to the arrangement used in the multiplex 3 test. Therefore, the results of the multiplex 3 test and the S channel test between them provide a guarantee that a protection factor of at least two bits is available for condition B) at all possible alignments of the synchronisation word and the multiplex 3 burst structure.

The values chosen for the S channel synchronisation words, expressed in hexadecimal and binary notation, are as follows:

CHMF: BE4E50 hexadecimal;
101111100100111001010000 binary
CHMP: 41B1AF hexadecimal;
010000011011000110101111 binary SYNCF: EB1B05 hexadecimal;
   111010110001101100000101 binary
SYNCP: 14E4FA hexadecimal;
   000101001110010011111010 binary As will be appreciated by those skilled in the art similar performance could be obtained with a set of 4 bit patterns for the S channel synchronisation words which were the same patterns as given above in reverse bit order. These patterns would be 0A727D, F58D82, A0D8D7 and 5F2728 in hexadecimal notation.

As a further test for the bit patterns selected as the synchronisation words, their performance when embedded in variable data was examined. It was found that for each of the selected bit patterns, there was at least one number S of bit positions by which the pattern is offset from its correct position at which M+S is equal to or greater than L−K. That is to say, assumed that all of the bits of variable data provide a perfect match, there is at least one offset value S at which the total number of matches to the 24 bit synchronisation pattern is at least 22. As mentioned above, this is in fact inevitable once S reaches 22.

The bit patterns selected for the synchronisation words are nevertheless suitable in practice. In the multiplex 3 data structure, the synchronisation word is never embedded in variable data, but is always preceded by 12 bits of preamble, and is either followed by 12 bits of preamble or, in the case of the last repeat in the fifth submultiplex, is followed by the end of transmission. As noted above, there is a guarantee that false recognition cannot occur in multiplex 3 unless at least two bits are wrongly received (e.g. due to noise). In multiplex 2, the S channel synchronisation word is always preceded by 10 bits of preamble, and is followed by only 16 bits of variable D channel data before the end of transmission. Therefore, even allowing for the two permitted errors in recognition, offset values of greater than 18 for which the synchronisation word is embedded entirely in variable data, which lead to the greatest probability of false recognition, cannot occur.

Furthermore since the 10 preamble bits in multiplex 2 come before the synchronisation word, and the 16 D channel bits adjacent to the synchronisation word come after it, the adjacent 16 D channel bits can only lead to false recognition of the S channel synchronisation word if the S channel controller 81, 101 has failed to detect the synchronisation word when it actually occured. If the S channel controller 81, 101 recognises the presence of the synchronisations word when it does occur, the frame timing controller 153 will use the timing of this recognition to set the frame clock 155, and will ignore a further recognition signal from the synchronisation word recognisers 137, 139 should such a further, erroneous, output be provided a few bit periods later.

Finally, occasional incorrect recognition in multiplex 2 does not matter, provided that its frequency is low, since recovery from incorrect recognition tends to happen anyway in multiplex 2 as explained above.

In order to determine that the likelihood of such an erroneous recognition was acceptably low, it was assumed that the synchronisation word was embedded in randomly variable data. In this case, the probability that false recognition will occur at an offset of any particular number S of bit periods is the probability that S bits of random data will provide at least (N−K−M) matches, where M is a number of matches which the synchronisation word has with itself at an offset of S bits, N is the total length of the synchronisation word (i.e. 24), and K is the number of errors permitted in successful recognition (i.e. 2).

For any given value of S, this probability is:

$$2^{-S} \sum_{j=0}^{j=K} \binom{S}{[N-j-M]} \quad \text{where} \quad \binom{S}{[N-j-M]}$$

is a binomial coefficient.

The sum of these probability values for all values of S, i.e. from S=1 to S=23, provides a figure for the probability or frequency of a false detection output if the synchronisation word is embedded in random data. Cross correlation values, i.e. figures for the false recognition of one synchronisation word when another is embedded in random data, may be provided using the same formula, but the probability for zero offset, i.e. S=0, should also be included.

Tables 1, 2 and 3 below give the peak side lobe value, peak number of matches and false detection value for each of the synchronisation words when compared with itself and when compared with each of the other synchronisation words and also the "0101 ..." preamble pattern.

TABLE 1

| | Side Lobes | | | | |
|---|---|---|---|---|---|
| | CHMF | SYNCF | CHMP | SYNCP | 0101... |
| CHMF | 2 | 10 | 6 | 7 | 4 |
| SYNCF | | 2 | 7 | 6 | 5 |
| CHMP | | | 2 | 10 | 4 |
| SYNCP | | | | 2 | 5 |

TABLE 2

| | Matches | | | | |
|---|---|---|---|---|---|
| | CHMF | SYNCF | CHMP | SYNCP | 0101... |
| CHMF | 12 | 16 | 11 | 13 | 12 |
| SYNCF | | 11 | 13 | 12 | 12 |
| CHMP | | | 12 | 16 | 12 |
| SYNCP | | | | 11 | 12 |

TABLE 3

| | False Detection Values | | | | |
|---|---|---|---|---|---|
| | CHMF | SYNCF | CHMP | SYNCP | 0101... |
| CHMF | 2.7E-5 | 2.89E-4 | 1.50E-3 | 4.80E-4 | 2.77E-4 |
| SYNCF | | 6.9E-5 | 4.80E-4 | 1.42E-3 | 5.95E-4 |
| CHMP | | | 2.7E-5 | 2.89E-4 | 1.40E-4 |
| SYNCP | | | | 6.9E-5 | 3.55E-4 |

When comparing tables 1 and 2, it should be noted that the peak side lobe value and the peak number of matches for any comparison do not necessarily occur at same amount S of offset. In table 3 "E" stands for "exponential", and means that the first number should be multiplied by 10 to the power of the second number. Thus 1.42E-3 means 0.00142.

For comparison, it may be noted that the 24 bit pattern 111100001111000011110000 has a peak self correlation side lobe value of 16, its greatest number of matches at any offset is 18, and its false detection value is 1.47E-1 or 0.147 (i.e. assuming that it was embedded in random data, it would cause an incorrect recognition output for itself having a wrong timing on 14.7 percent of occasions in which the pattern appeared).

Modifications and Alternatives

Figure 37:
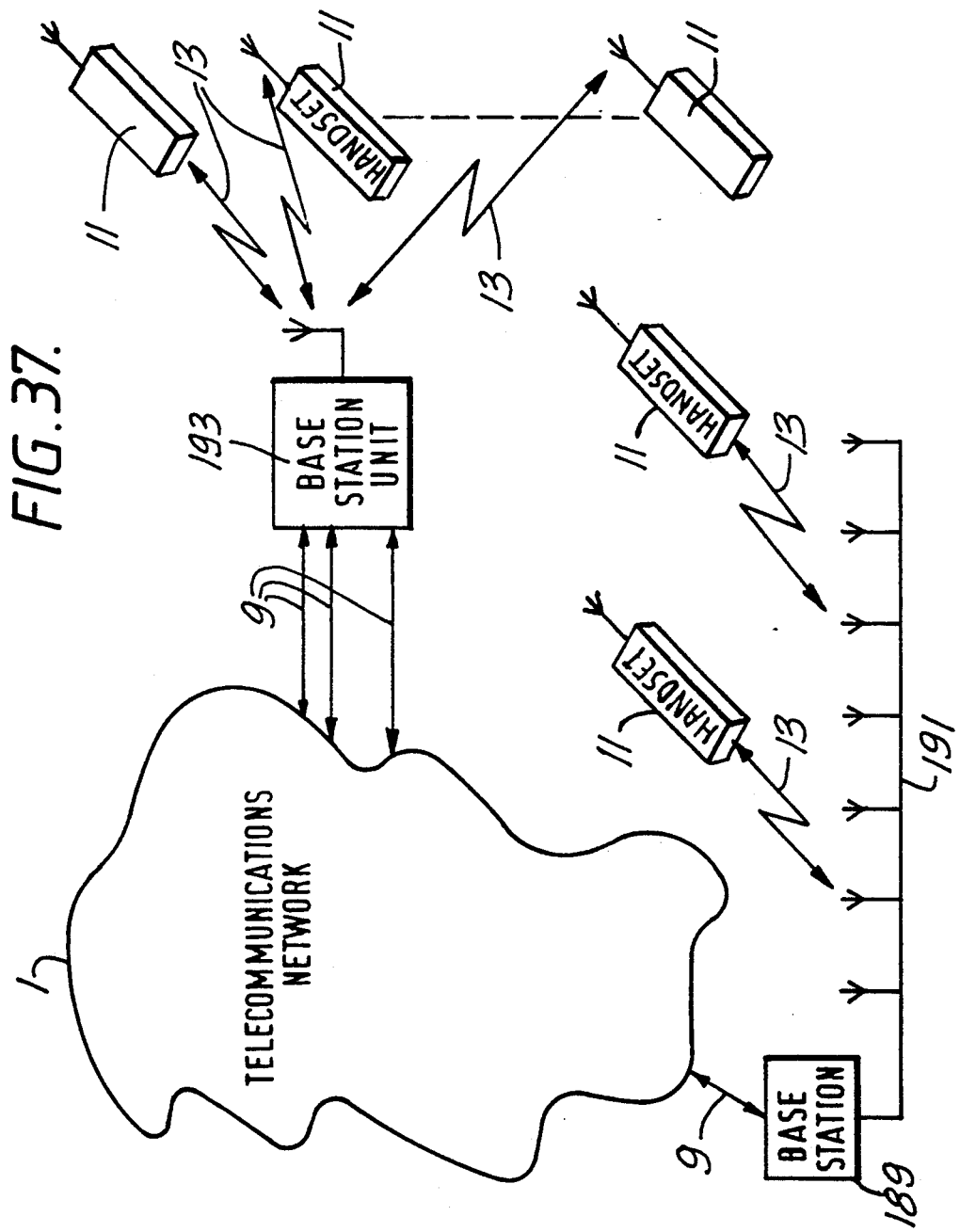
FIG. 37 is a view similar to FIG. 1, illustrating alternative types of base station for use in embodiments of the present invention.

FIG. 37 is a schematic diagram, similar to FIG. 1, showing a telecommunications network 1 having network links 9 to modified base stations. Base station 189 has a single network link 9 to the communications network 1, and resembles the base stations 3 of FIG. 1 in this respect. However, it has a distributed antenna 191, e.g. a "leaky feeder", in place of the conventional aerial 43 of the base station 3. This may permit improved geographical coverage by the base station 189, with relatively low power radio transmissions.

Base station unit 193 has a plurality of network links 9 to the telecommunications network 1, and can therefore connect a plurality of handsets 11 to the telecommunications network 1 over respective network links 9 and respective radio links 13, on different radio channels. The base station unit 193 may be constructed as shown schematically in FIG. 38. A plurality of base station control circuits 55, each similar to the circuit described with respect to FIG. 16, are connected to respective network links 9 by respective telephone connections 45. The transmit/receive switches 91 are connected to a radio signal combiner 195, instead of to respective aerials 43. Through the action of the combiner 195, each individual control circuit 55 can transmit and receive using a common aerial 197. In order to prevent the transmissions by one control circuit 55 disrupting receiving operations of another control circuit 55, the burst timing for all of the base station control circuits 55 of the base station unit 193 is controlled centrally, so that they transmit and receive synchronously.

The arrangement of FIG. 39 provides a similar operation to the arrangement of FIG. 38, but in this case each base station control circuit 55 has a separate respective aerial 43, in place of the combiner 195 and common aerial 197. Thus, the arrangement of FIG. 39 closely resembles a collection of base stations 3, each having a single network link 9, in close proximity. However, in view of the close proximity of the units, and in particular the close proximity of their aerials 43, it will normally be necessary to ensure burst synchronisation between the respective base station control circuits 55, so that transmissions from one circuit do not swamp an attempt by another circuit to receive a signal from a handset 11.

FIG. 40 shows a further modification, which permits a base station unit to connect a plurality of handsets 11 for intercom communication, or to connect a plurality of handsets 11 to a single network link 9 to provide a conference call. A plurality of base station control circuits 199 are provided. In FIG. 40, they are shown as each having a respective base station aerial 43, as in FIG. 39, but a combiner 195 and common aerial 197 could be provided instead. Each base station control circuit 199 is connected to a switching circuit 201, which is in turn connected to one or more network links 9 by respective telephone connections 45. The number of network links 9 to which the switching circuit 201 is connected may be fewer than the number of base station control circuits 199. The switching circuit 201 operates under the control of signals received from the base station control circuits 199, to connect respective base station control circuits 199 together and/or connect them to a telephone connection 45, so as to provide intercom/conference facilities in addition to normal telephone call facilities.

Each base station control circuit 199 may be the same as the base station control circuit 55 described with respect to FIG. 16. In this case, the switching circuit 201 would receive signals from, and send signals to, the respective line interfaces 103 of the control circuits. However, it is preferable to provide the base station control circuits 199 as modifications of the structure shown in FIG. 16, in which the encoder 83, the decoder 97 and the line interface 103 are not present. Instead, the switching circuit 201 contains an encoder, a decoder and a line interface for each of its telephone connections 45.

In this case, the switching circuit 201 receives the B channel data direct from the programmable demultiplexer 95, and provides this data to the decoder 97 of the respective telephone connection 45 if the signals are to be sent over a network link 9, and provides the B channel signals from the programmable demultiplexer 95 of one base station control circuit 199 to the programmable multiplexer 85 of another base station control circuit 199 if they are to be transmitted to a further handset 11. The signals from the system controller 99, normally sent to the line interface 103, may be used to control a switching control unit which controls the operations of the switching circuit 201, or may be passed on to a line interface 103 associated with a telephone connection 45 or to the system controller 99 of a further base station control circuit 199, as appropriate. As in the arrangement of FIGS. 38 and 39, the burst timing of the operations of the base station control circuits 199 should be synchronised by providing a common burst timing signal.

In any of the base station arrangements, the aerials 43,197 may be replaced by a distributed antenna 191 as shown in FIG. 37.

The preferred embodiments of the present invention have been described largely on the assumption that a radio link is set up between a base station and a handset in order to permit speech conversation over the B channel. However, as mentioned with reference to FIG. 15, the handset 11 may be incorporated in a personal computer or portable computer terminal, to enable the radio link to carry computer data signals. In this case, the computer data signals may be carried by the B channel in multiplex 1, or alternatively the radio link may never move to multiplex 1 and the computer data may be carried as special messages in the D channel using multiplex 2. Data communications using the B channel and multiplex 1 will be considerably faster, as each multiplex 1 transmission burst carries 64 bits of B channel, all of which are available to carry the data. In multiplex 2, only 32 bits of D channel are carried per burst, and additionally the code word structure used for carrying D channel messages means that only about half of the D channel bits are available for carrying the computer data. However, the use of the D channel to carry computer data may be advantageous in some circumstances, since the D channel transmissions are encoded for error detection. If a radio link is used to communicate computer data via the D channel, the two parts may communicate only in multiplex 2 once the link has been set up, and link transmissions may never switch to multiplex 1.

In another modification, a handset 11 may be provided without a keypad 31, or with only a few keys, so that a telephone number cannot be dialled from the handset 11. Such a handset may be used only to receive calls, or may be permitted to make calls only to one or a few preselected numbers. The numbers may be stored in the handset and transmitted automatically to the base station. Alternatively, especially if there is only one number, it may be stored by the base station and selected in response to the PID of the handset.

The embodiments described above are provided by way of example, and various modifications and alternatives will be apparent to those skilled in the art.

We claim:

1. A telecommunication system for establishing synchronous time-division two-way communication between first and second devices over a radio channel by exchanging radio signals in alternating bursts carrying digital data such that, during the time-division two-way communication, transmission of one of said alternating bursts from one of the first and second devices is completed before transmission of the next of said alternating bursts by the other of the first and second devices is begun, each of said first and second devices comprising:

burst format means for (a) arranging digital data into bursts for transmission and (b) obtaining digital data from received bursts in accordance with a format of digital data selected from a plurality of predetermined formats including first and second formats, wherein a burst in said first format includes information for a first logical communication channel (D) which carries signalling data such as device identification codes and instructions between said first and second devices, and also includes information for a second logical communication channel (B) which carries data, such as digitally encoded speech, which is to be communicated between the first and second devices, information for said first logical communication channel being present both before and after information for the second logical communication channel, and wherein a burst in said second format includes information for said first logical communication channel and also includes a synchronization pattern not included in the first format, the synchronization pattern enabling the one of said first and second devices which receives it to determine the timing of the bursts received by it from the other of said first and second devices; and control means for setting said selected format.

2. A method of telecommunication for establishing synchronous time-division two-way communication between first and second devices over a radio channel by exchanging radio signals in alternating bursts carrying digital data such that, during the time-division two-way communication, transmission of one of said alternating bursts from one of the first and second devices is completed before transmission of the next of said alternating bursts by the other of the first and second devices is begun, said method comprising the steps of:

(a) providing a plurality of predetermined formats for digital data which compose a burst, including first and second formats, wherein a burst in said first format includes information for a first logical communication channel (D) which carries signalling data such as device identification codes and instructions between said first and second devices, and also includes information for a second logical communication channel (B) which carries data, such as digitally encoded speech, which is to be communicated between the first and second devices, information for said first logical communication channel being present both before and after information for the second logical communication channel, and wherein a burst in said second format includes information for said first logical communication channel, and also includes a synchronization pattern not included in the first format, the synchronization pattern enabling the one of said first and second devices which receives it to determine the timing of the bursts received by it from the other of said first and second devices;

(b) selecting a burst format from said plurality of predetermined formats; and (c) exchanging said radio signals in alternating bursts carrying digital data in said selected format.

3. A system according to claim 1 wherein more bits of information for the first channel are transmitted in a burst of the second format than in a burst of the first format.

4. A system according to claim 1 wherein more bits of information for the second channel (B) are transmitted in a burst of the first format than the number of bits of information for the first channel (D) in a burst of either the first or the second format.

5. A telecommunication system for establishing synchronous time-division two-way communication between first and second devices over a radio channel by exchanging radio signals in alternating bursts carrying digital data such that, during the time-division two-way communication, transmission of one of said alternating bursts from one of the first and second devices is completed before transmission of the next of said alternating bursts by the other of the first and second devices is begun, said second device comprising:

burst transmission means for transmitting bursts of digital data; and control means for controlling the burst transmission means to operate in a first mode in which the burst transmission means transmits a burst of said alternating bursts and then ceases transmission to allow a burst of said alternating bursts to be received from the first device, and a second mode in which the burst transmission means transmits asynchronously a burst other than said alternating bursts, said asynchronously transmitted burst comprising one or more first portions of digital data for a logical communication (D), which carries signalling data such as device identification codes, followed by one or more further portions of digital data, and then ceases transmission for a period to allow a reply from the first device to be received, each respective said first portion and said further portion of digital data comprising a respective digital data sequence, the respective digital data sequences being repeated within said first portion or said further portion, respectively, and the digital data sequence for each said further portion of digital data providing a preamble of alternating '1's and '0's in a repeating pattern followed by a synchronization pattern to enable the first device to determine timing information about the burst when it receives it.

6. A method of telecommunication for establishing time-division two-way communication between first and second devices over a radio channel by exchanging radio signals in alternating bursts carrying digital data such that, during the time-division two-way communication, transmission of one of said alternating bursts from one of the first and second devices is completed before transmission of the next of said alternating bursts by the other of the first and second devices is begun, said method comprising the steps of:

(a) asynchronously transmitting a particular burst other than said alternating bursts with the second device, at a time when the first and second devices are not performing the time-division two-way communication, said particular burst comprising one or more first portions of digital data for a logical communication channel (D), which carries signalling data such as device identification codes, followed by one or more further portions of digital data, each respective said first portion and said further portion of digital data comprising a respective digital data sequence, the respective digital data sequences being repeated within said first portion or said further portion, respectively, and the digital data sequence for each said further portion of digital data providing a preamble of alternating '1's and 1 0's in a repeating pattern followed by a synchronization pattern to enable the first device to determine timing information about the burst when it receives it; and subsequently (b) ceasing said transmission by the second device for a period to enable it to receive a reply from the first device.

7. A system according to claim 5 wherein the said alternating bursts exchanged in the said time division two-way communication are exchanged in a succession of burst periods all of the same length, a burst being transmitted from the first device to the second device and a burst being transmitted from the second device to the first device at different times in a burst period, and each said first portion or said further portion of digital data in a said asynchronously transmitted burst lasting for at least the length of one of said burst periods, and each said digital data sequence lasting for no more than half the length of a part of one of said burst periods in which part the first device does not transmit a burst.

8. A telecommunication system for establishing time-division two-way communication between first and second devices over a radio channel by exchanging radio signals in alternating bursts carrying digital data such that, during the time-division two-way communication, transmission of one of said alternating bursts from one of the first and second devices is completed before transmission of the next of said alternating bursts by the other of the first and second devices is begun, each of said first and second devices comprising:

burst format means for (a) arranging digital data into bursts for transmission and (b) obtaining digital data from received bursts in accordance with a format of digital data selected from a plurality of predetermined formats including a two-channel format which specifies that a burst includes information both for a first logical communication channel (D), which carries signalling data such as device identification codes and instructions from one of said first and second devices to the other, and for a second logical communication channel (B), which carries data to be communicated between the first and second devices, such as digitally encoded speech, said two channel format being chosen from a predefined group of alternative formats of said two-channel format, said predefined group comprising first and second formats which differ from each other in the amount of information for the first logical communication channel carried in each burst; and control means for choosing which of said predefined group of alternative formats of said two-channel format shall be included in said plurality of predetermined formats, said control means choosing said two-channel format from said predefined group of alternative formats of said two-channel format following transmission of data to the other of said first and second devices relating to the choosing of said two-channel format and reception of data from the other of said first and second devices relating to the choosing of said two-channel format, the control means determining said data to be transmitted taking into account the performance capabilities of the one of the first and second devices in which it is comprised and choosing said two-channel format taking into account said data received from the other of said first and second devices.

9. A method of telecommunication for establishing time-division two-way communication between first and second devices over a radio channel by exchanging radio signals in alternating bursts carrying digital data such that, during the time-division two-way communication, transmission of one of said alternating bursts from one of the first and second devices is completed before transmission of the next of said alternating bursts by the other of the first and second devices is begun, said method comprising the steps of:

(a) providing a predetermined plurality of formats; and (b) identifying, in accordance with performance capabilities of said first and second devices, one of a predefined group of formats each of which specifies that a burst includes information both for a first logical communication channel (D), which carries signalling data such as device identification codes and instructions between said first and second devices, and for a second logical communication channel (B), which carries data to be communicated between the first and second devices such as digitally encoded speech, said predefined group of formats comprising first and second formats which differ in the amount of information for the first logical communication channel carried in each burst; and (c) selecting said one identified format for the time-division two-way communication transmission.

10. A system according to claim 8 wherein the said alternating bursts are transmitted in burst periods, one burst being transmitted in each direction at different times in a burst period, and the said first and second formats require different lengths of time for transmission of a burst but the same length of time of a burst period.

11. A system according to claim 8 wherein each of the said first and second formats carry the same amount of the second logical communication channel (B) per burst as the other.

12. A method according to claim 2 wherein more bits of information for the first channel are transmitted in a burst of the second format than in a burst of the first format.

13. A method according to claim 12, wherein more bits of information for the second channel (B) are transmitted in a burst of the first format than the number of bits of information for the first channel (D) in a burst of either the first or the second format.

14. A method according to claim 2, wherein more bits of information for the second channel (B) are transmitted in a burst of the first format than the number of bits of information for the first channel (D) in a burst of either the first or the second format.

15. A system according to claim 1, wherein more bits of information for the second channel (B) are transmitted in a burst of the first format than the number of bits of information for the first channel (D) in a burst of either the first or the second format.

16. A method according to claim 6, wherein the said alternating bursts exchanged in the said time division two-way communication are exchanged in a succession of burst periods all of the same length, a burst being transmitted from the first device to the second device and a burst being transmitted from the second device to the first device at different times in a burst period, and each said first portion or said further portion of digital data in a said asynchronously transmitted particular burst lasting for at least the length of one of said burst periods, and each of said digital data sequence lasting for no more than half the length of a part of one of said burst periods in which part the first device does not transmit a burst.

17. A method according to claim 9, wherein the said alternating bursts are transmitted in burst periods, one burst being transmitted in each direction at different times in a burst period, and the said first and second formats require different lengths of time for transmission of a burst but the same length of time for a burst period.

18. A method according to claim 17, wherein the each of the said first and second formats carry the same amount of the second logical communication channel (B) per burst as the other.

19. A method according to claim 9, wherein each of the said first and second formats carry the same amount of the second logical communication channel (B) per burst as the other.

20. A method according to claim 8 wherein each of the said first and second formats carry the same amount of the second logical communication channel (B) per burst as the other.

21. A telecommunication device for establishing synchronous time-division two-way communication with another device over a radio channel by exchanging radio signals with said other device in alternating bursts carrying digital data such that, during the time-division two-way communication, reception of one of said alternating bursts from said other devices is completed before transmission of the next of said alternating bursts by said telecommunication device is begun, said telecommunication device comprising:

burst format means for (a) arranging digital data into bursts for transmission and (b) obtaining digital data from received bursts in accordance with a format of digital data selected from a plurality of predetermined formats including a first format and a second format, wherein a burst in said first format includes information for a first logical channel (D) which carries signalling data such as device identification codes and instructions between the telecommunication device and said other device, and also includes information for a second logical communication channel (B) which carries data such as digitally encoded speech, which is to be communicated between the telecommunication device and said other device, information for said first logical communication channel being present both before and after information for the second logical communication channel, and wherein a burst in said second format includes information for said first logical communication channel and also includes a synchronization pattern not included in the first format, the synchronization pattern in a burst transmitted by said telecommunication device in said second format enabling said other device to determine the timing of the bursts received by it from the telecommunication device, and the synchronization pattern in a burst received by the telecommunication device in said second format is used by it to determine the timing of bursts received by it from said other device; and control means for setting said selected format.

22. A telecommunication device for establishing synchronous time-division two way communication with another device over a radio channel by exchanging radio signals in alternating bursts carrying digital data such that, during the time-division two-way communication, reception of one of said alternating bursts from said other devices is completed before transmission of the next of said alternating bursts by said telecommunication device is begun, said telecommunication device comprising:

burst communication means having alternating transmit and receive periods and operable in a first mode to transmit a burst of said alternating bursts in one of said transmits periods and then cease transmission to allow a burst of said alternating bursts to be received from said other device in one of said receive periods so as to participate in said time-division two-way communication, and operable in a second mode for detecting bursts other than said alternating bursts, which other bursts are transmitted by said other device asynchronously with respect to said alternating transmit and receive periods and comprising one or more first portions of digital data for a logical communication channel (D), which carries signalling data such as device identification codes, followed by one or more further portions of digital data, each respective said first portion and said further portion comprising a respective digital data sequence, the respective digital data sequences being repeated within said first portion of said further portion, respectively, and the digital data sequence for each said further portion of digital data providing a preamble of alternating '1's and '0's in a repeating pattern followed by a synchronization pattern, the burst communication means operating in the second mode (i) to detect said synchronization pattern received during one of said receive periods and determine therefrom timing information about the asynchronously transmitted bursts, and then (ii) decode, by means of said timing information, the digital data sequence of said first portion of a subsequent asynchronously transmitted burst to obtain therefrom said digital data for the logical communication channel (D), with such digital data sequence being received in a subsequent receive period.

23. A telecommunication device for establishing synchronous time-division two-way communication with another device over a radio channel by exchanging radio signals with said other device in alternating bursts carrying digital data such that, during the time-division two-way communication, reception of one of said alternating bursts from said other devices is completed before transmission of the next of said alternating bursts by said telecommunication device is begun, said telecommunication device comprising:

burst transmission means for transmitting bursts of digital data; and control means for controlling the burst transmission means to operate in a first mode in which the burst transmission means transmits a burst of said alternating bursts and then ceases transmission to allow a burst of said alternating bursts to be received from said other device, and a second mode in which the burst transmission means transmits asynchronously a burst other than said alternating bursts, said asynchronously transmitted burst comprising one or more first portions of digital data for a logical communication channel (D), which carries signalling data such as device identification codes, followed by one or more further portions of digital data, and then ceases transmission for a period to allow a reply from said other device to be received, each respective said first portion and said further portion of digital data comprising a respective digital data sequence, the respective digital data sequences being repeated within said first portion or said further portion, respectively, and the digital data sequence for each said further portion of digital data providing a preamble of alternating '1's and '0's in a repeating pattern followed by a synchronization pattern to enable said other device to determine timing information about the burst when it receives it.

24. A telecommunication device for establishing time-division two-way communication with another device over a radio channel by exchanging radio signals in alternating bursts carrying digital data such that, during the time-division two-way communication, reception of one of said alternating bursts from said other device is completed before transmission of the next of said alternating bursts by said telecommunication device is begun, said telecommunication device comprising:

burst format means for (a) arranging digital data into bursts for transmission and (b) obtaining digital data from received bursts in accordance with a format of digital data selected from a plurality of predetermined formats including a two-channel format which specifies that a burst includes information both for a first logical communication channel (D), which carries signalling data, such as device identification codes and instructions between the telecommunication device and said other device, and for a second logical communication channel (B), which carries data to be communicated between the telecommunication device and said other device, such as digitally encoded speech, said two channel format being chosen from a predefined group of alternative formats of said two-channel format, said predefined group comprising first and second formats which differ from each other in the channel carried in each burst; and control means for choosing which of said predefined group of alternative formats of said two-channel format should be included in said plurality of predetermined formats, said control means choosing said two-channel format from said predefined group of alternative formats of said two-channel format following transmission of data to said other device relating to the choosing of the two-channel format and reception of data from said other device relating to the choosing of the two-channel format, the control means determining said data to be transmitted based on the performance capabilities of the telecommunication device and choosing said two-channel format based on said data received from said other device.

25. A telecommunication device according to claim 24 in which the control means determines said data to be transmitted based on both said received data and the performance capabilities of the telecommunication device, and chooses said two-channel format based on both said received data and the performance capabilities of the telecommunication device.

26. A system according to claim 1 wherein, in a burst of the first format, the same number of bits of information for the first logical communication channel are provided before the information for the second logical communication channel as are provided after the information for the second logical communication channel.

27. A system according to claim 1 wherein, in a burst of the second format, information for the first logical communication channel is provided both before and after said asynchronization pattern.

28. A system according to claim 27 wherein, in a burst of the second format, the same number of bits of information for the first logical communication channel are provided before said synchronization pattern as are provided after said synchronization pattern.

29. A method according to claim 2 wherein, in a burst of the first format, the same number of bits of information for the first logical communication channel are provided before the information for the second logical communication channel as are provided after the information for the second logical communication channel.

30. A method according to claim 2 wherein, in a burst of the second format, information for the first logical communication channel is provided both before and after said asynchronization pattern.

31. A method according to claim 30 wherein, in a burst of the second format, the same number of bits of information for the first logical communication channel are provided before said synchronization pattern as are provided after said synchronization pattern.

* * * * *

UNITED STATES PATENT AND TRADEMARK OFFICE
CERTIFICATE OF CORRECTION

PATENT NO. : 5,228,026
DATED : July 13, 1993
INVENTOR(S) : ALBROW, Richard et al It is certified that error appears in the above-indentified patent and that said Letters Patent is hereby corrected as shown below:

Col. 76, Line 4, before "channel" insert --amount of information for the first logical--..

Signed and Sealed this

Seventh Day of March, 1995

Attest:

BRUCE LEHMAN

Attesting Officer

Commissioner of Patents and Trademarks